US012645265B2

(12) United States Patent
Hong et al.

(10) Patent No.: US 12,645,265 B2
(45) Date of Patent: Jun. 2, 2026

(54) SUPPORT ASSEMBLY, PROTECTION MECHANISM, MOTOR ASSEMBLY, AND ELECTRONIC DEVICE

(71) Applicant: HUAWEI TECHNOLOGIES CO., LTD., Shenzhen (CN)

(72) Inventors: Yaqin Hong, Dongguan (CN); Biaoke Zhong, Dongguan (CN); Shengli Hu, Shenzhen (CN); Yangming Lin, Dongguan (CN); Shuqin Xie, Wuhan (CN); Yake Zou, Dongguan (CN); Yang Zhang, Dongguan (CN); Kenji Nagai, Kanagawa (JP); Yuji Hazama, Kanagawa (JP); Shiquan Yang, Dongguan (CN); Zhongliang Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 251 days.

(21) Appl. No.: 18/583,820

(22) Filed: Feb. 21, 2024

(65) Prior Publication Data

US 2024/0192736 A1     Jun. 13, 2024

Related U.S. Application Data

(63) Continuation of application No. PCT/CN2022/121386, filed on Sep. 26, 2022.

(30) Foreign Application Priority Data

Sep. 30, 2021   (CN) .......................... 202111165613.7

(51) Int. Cl.
  *G06F 1/16*      (2006.01)
  *F16C 11/04*     (2006.01)

(52) U.S. Cl.
  CPC ............ *G06F 1/1681* (2013.01); *F16C 11/04* (2013.01); *G06F 1/1624* (2013.01)

(58) Field of Classification Search
  CPC .... G06F 1/1613; G06F 1/1615; G06F 1/1624; G06F 1/1626
  See application file for complete search history.

(56)             References Cited

U.S. PATENT DOCUMENTS 8,908,364 B2 * 12/2014 Tseng ...................... G06F 1/162
                                                          345/905
9,529,384 B1 * 12/2016 Liang .................... G06F 1/1624
            (Continued)

FOREIGN PATENT DOCUMENTS

CN         201057246 Y      5/2008
CN         102595819 A      7/2012
            (Continued)

OTHER PUBLICATIONS

Xi Longfei et al:"Surprisingly, the Apple Store will now automatically open and close iPad cases", (Jan. 12, 2015), total 4 pages.

*Primary Examiner* — Anthony Q Edwards

(57)             ABSTRACT

A support assembly, includes a rotating shaft mechanism and a support portion. The rotating shaft mechanism includes a rotating assembly. The rotating assembly includes a first fastening piece, a second fastening piece, a connecting piece, and a connection rod assembly. The first fastening piece and the second fastening piece are located on a same side of the connecting piece. A first sliding slot is disposed on an end face that is of the first fastening piece and that faces the second fastening piece, and a second sliding slot is disposed on an end face that is of the second fastening piece and that faces the first fastening piece. The support portion includes a first support board, a second support board, and a third support board. The second support board is rotatively
            (Continued)

connected to the first support board and the third support board.

20 Claims, 30 Drawing Sheets

(56)                     References Cited

U.S. PATENT DOCUMENTS

| | | | | |
|---|---|---|---|---|
| 11,880,234 | B2 * | 1/2024 | Hsu | G06F 1/1669 |
| 2012/0170186 | A1 * | 7/2012 | Wu | G06F 1/1681 |
| | | | | 361/679.01 |
| 2019/0294212 | A1 * | 9/2019 | Ohishi | G06F 1/1669 |
| 2024/0061477 | A1 * | 2/2024 | Cheng | G06F 1/1669 |
| 2024/0103579 | A1 * | 3/2024 | Wang | G06F 1/1632 |
| 2025/0085747 | A1 * | 3/2025 | Li | G06F 3/0231 |

FOREIGN PATENT DOCUMENTS

| | | | |
|---|---|---|---|
| CN | 104345793 | A | 2/2015 |
| CN | 104765411 | A | 7/2015 |
| CN | 108062167 | A | 5/2018 |
| CN | 108415515 | A | 8/2018 |
| CN | 209100478 | U | 7/2019 |
| CN | 210466334 | U | 5/2020 |
| CN | 210605538 | U | 5/2020 |
| CN | 111738101 | A | 10/2020 |
| CN | 111828462 | A | 10/2020 |
| CN | 211951933 | U | 11/2020 |
| EP | 2942942 | A1 | 11/2015 |
| JP | 2011164819 | A | 8/2011 |
| JP | 2014026412 | A | 2/2014 |
| JP | 2014238764 | A | 12/2014 |
| JP | 2017021410 | A | 1/2017 |

* cited by examiner

301

3012

A

3011

3013

301

3012

3011

3013

_301_

301811

30181

3024     3013

_201_

2012

2013

3018     301     3

3024     2014

201

201

201531        2018

201221        20122

2012211

3042

30424

304241/3018

SUPPORT ASSEMBLY, PROTECTION MECHANISM, MOTOR ASSEMBLY, AND ELECTRONIC DEVICE

CROSS-REFERENCE TO RELATED APPLICATIONS

This application is a continuation of International Application No. PCT/CN2022/121386, filed on Sep. 26, 2022, which claims priority to Chinese Patent Application No. 202111165613.7, filed on Sep. 30, 2021. The disclosures of the aforementioned applications are hereby incorporated by reference in their entireties.

TECHNICAL FIELD

This application relates to the field of electronic device technologies, and in particular, to a support assembly, a protection mechanism, a motor assembly, and an electronic device.

BACKGROUND

Currently, a foldable electronic device such as a notebook computer or a two-in-one product usually needs to be manually opened. The foldable electronic device is turned on by turning on a power supply, and can be used only after login through keyboard input or a biometric fingerprint. This operation process involves a large quantity of steps and takes a long time, resulting in poor user experience.

With rapid development of foldable electronic devices, a user imposes an increasingly high requirement on use experience of the foldable electronic devices. In addition to the poor user experience caused by the foregoing complex operation process, in a process of manually opening or closing the foldable electronic device, an operation hand feel, operation safety, stable support of the foldable electronic device in an opened state, a thickness of the entire device in a closed state, and the like are all important factors that affect user experience.

On this basis, how to improve user experience of the foldable electronic device has become a difficult problem to be urgently resolved by a person skilled in the art.

SUMMARY

This application provides a support assembly, a protection mechanism, a motor assembly, and an electronic device, to improve use experience of a user.

According to a first aspect, a support assembly is provided. The support assembly may be used in a foldable electronic device. The support assembly may include a rotating shaft mechanism and a support portion. The rotating shaft mechanism may include a rotating assembly. The rotating assembly may be linked with the support portion. When the rotating assembly is disposed, the rotating assembly includes a first fastening piece, a second fastening piece, a connecting piece, and a connection rod assembly. The first fastening piece and the second fastening piece may serve as a support base of the entire rotating assembly. The first fastening piece and the second fastening piece are spaced. The first fastening piece and the second fastening piece are located on a same side of the connecting piece. In addition, a first sliding slot is disposed on an end face that is of the first fastening piece and that faces the second fastening piece, and a second sliding slot is disposed on an end face that is of the second fastening piece and that faces the first fastening piece. The connecting piece is rotatively connected to the connection rod assembly. The connection rod assembly may slide along the first sliding slot and the second sliding slot. When the support portion is disposed, the support portion includes a first support board, a second support board, and a third support board that are disposed around the rotating shaft mechanism, the second support board is located between the first support board and the third support board, and the second support board is rotatively connected to the first support board and the third support board. One end of the first support board is fixedly connected to the connecting piece. In this way, when the first support board rotates around the rotating shaft mechanism, the connection rod assembly may slide along the first sliding slot and the second sliding slot, and the connecting piece rotates around the connection rod assembly, so that the third support board can slide along a direction toward or away from the rotating shaft mechanism.

By using the support assembly provided in this application, a movement trajectory of the connection rod assembly may be set through designing specific forms of the first sliding slot and the second sliding slot. In addition, because the connecting piece is rotatively connected to the connection rod assembly, in a process in which the connection rod assembly moves along the specified movement trajectory, the connecting piece may move according to a specified movement trajectory. In addition, because the first support board is fixedly connected to the connecting piece, in a process in which a connecting rod moves according to the specified trajectory, the first support board may move along a specified trajectory, to drive the second support board to rotate and enable the third support board to slide along a specified trajectory in the direction toward or away from the rotating shaft mechanism. It should be noted that in a process in which the first support board moves and drives the third support board to slide along the direction toward or away from the rotating shaft mechanism, a triangular support structure surrounding the rotating shaft mechanism can be formed among the first support board, the second support board, and the third support board. This can help improve support stability of the support portion, thereby improving structural reliability of the support assembly.

In a possible implementation of this application, the rotating assembly may further include a main shaft. The main shaft penetrates the first fastening piece, the connection rod assembly, and the second fastening piece. The main shaft may be rotatively connected to the first fastening piece and the second fastening piece. In a process in which the main shaft rotates relative to the first fastening piece and the second fastening piece, the connection rod assembly may be driven to slide along the first sliding slot and the second sliding slot, to drive the connecting piece to rotate.

In addition, the rotating shaft mechanism may further include a cam and an auxiliary support mechanism. The cam and the main shaft are fastened relative to each other in a radial direction of the main shaft, so that the main shaft in a rotation process can drive the cam to rotate synchronously. A cam sliding slot may be further disposed on a surface of the cam. One end of the auxiliary support mechanism is accommodated in the cam sliding slot, and the other end of the auxiliary support mechanism may be connected to the third support board. In the rotation process of the main shaft, one end of the auxiliary support mechanism slides along the cam sliding slot, to drive the third support board to slide along the direction toward or away from the rotating shaft mechanism. In this way, sliding stability of the third support board can be improved, to help improve movement stability of the entire support portion.

In a possible implementation of this application, the rotating shaft mechanism may include two rotating assemblies. The two rotating assemblies are spaced. One cam is correspondingly disposed for each rotating assembly. In this implementation, the auxiliary support mechanism may be located between two rotating assemblies. When the auxiliary support mechanism is disposed, the auxiliary support mechanism may include a first support rod and a second support rod. The first support rod and the second support rod are disposed in a cross manner. Middle parts of the first support rod and the second support rod are hinged. In addition, one end of the first support rod is accommodated in one cam sliding slot, and the other end of the first support rod is hinged to the third support board. One end of the second support rod is accommodated in another cam sliding slot, and the other end of the second support rod is hinged to the third support board. The first support rod and the second support rod of the auxiliary support mechanism are disposed in the cross manner. Therefore, in a process in which the third support board slides along the direction away from the rotating shaft mechanism, the two support rods rotate around a hinge joint of the two support rods. In addition, movement trajectory s of the two support rods can be designed by properly designing the cam sliding slots, so that the two support rods can push the third support board to slide along the direction away from the rotating shaft mechanism, thereby improving sliding stability of the third support board.

In a possible implementation of this application, the support assembly may further include a keyboard body. The support portion may be rotatively connected to the keyboard body through a rotating shaft mechanism. That the third support board slides along the direction toward or away from the rotating shaft mechanism may also be understood as that the third support board slides along a direction toward or away from the keyboard body. In addition, a receptacle may be disposed in the keyboard body. At least a part of the third support board may be accommodated in the receptacle. The third support board can slide in the receptacle. In this way, when sliding stability of the third support board is improved, the third support board may be further hidden in the keyboard body, to improve appearance aesthetics of the support assembly.

In this application, when the third support board is disposed, the third support board includes an arc-shaped board segment and a straight board segment that are fixedly connected. The arc-shaped board segment is located between the second support board and the straight board segment. The second support board is rotatively connected to the arc-shaped board. When the third support board slides toward the keyboard body, the arc-shaped board segment may cover the rotating shaft mechanism, to prevent the rotating shaft mechanism from being exposed, thereby protecting the rotating shaft mechanism and improving appearance aesthetics of the support assembly. In addition, at least a part of the straight board segment of the third support board may be accommodated in the receptacle, to guide sliding of the third support board.

In a possible implementation of this application, the support assembly may further include a host support kit. The host support kit is fixedly connected to the connecting piece. The host support kit is located on a side that is of the first support board and that faces the keyboard body. The host support kit is fixedly connected to an end part that is of the first support board and that faces the connecting piece. The host support kit may be configured to support a host installed on the support assembly. In addition, a surface that is of the host support kit and that is in contact with the host may be set to an arc-shaped surface, to improve reliability of a connection between the host and the host support kit.

In this application, when the connection rod assembly is disposed, the connection rod assembly may include a first connection rod and a second connection rod. The first connection rod is located between the connecting piece and the second connection rod. The second connection rod is located between the first fastening piece and the second fastening piece. The main shaft penetrates the second connection rod. In the radial direction of the main shaft, the main shaft and the second connection rod are fastened relative to each other. Therefore, in the rotation process of the main shaft, the second connection rod can be driven to rotate synchronously. In addition, one end of the first connection rod is rotatively connected to the connecting piece, and the other end of the first connection rod is rotatively connected to the second connection rod. One end that is of a rotating shaft rotatively connected to the first connection rod and the second connection rod is located in the first sliding slot, and the other end of the rotating shaft is located in the second sliding slot. In this way, the rotating shaft rotatively connected to the first connection rod and the second connection rod slides in the first sliding slot and the second sliding slot, so that the connection rod assembly slides in the first sliding slot and the second sliding slot to drive the connecting piece to rotate.

When the connecting piece is disposed, the connecting piece may include a body portion. The body portion has a first edge and a second edge that are disposed opposite to each other. A first installation portion, a second installation portion, and a third installation portion are disposed on the first edge. The first installation portion and the second installation portion are spaced. The body portion includes a first face and a second face that are disposed opposite to each other. The first installation portion and the second installation portion extend in a direction away from the second face. The third installation portion is located on the second face. The third installation portion extends along a direction from the first edge to the second edge.

In this application, the rotating assembly further includes middle connection rods. There may be two middle connection rods. One end of one of the middle connection rods is rotatively connected to the first installation portion, and the other end of the middle connection rod is rotatively connected to the first fastening piece. One end of the other one of the middle connection rods is rotatively connected to the second installation portion, and the other end of the other middle connection rod is rotatively connected to the second fastening piece, so that a body of the rotating assembly can be rotatively connected to the two fastening pieces through the two middle connection rods. In addition, one end that is of the first connection rod and that faces the connecting piece is rotatively connected to an end part that is of the third installation portion and that is away from the first edge. In addition, because the rotating shaft rotatively connected to the first connection rod and the second connection rod slides in the first sliding slot and the second sliding slot, the first connection rod may move according to a specified movement trajectory through designing tracks of the first sliding slot and the second sliding slot, so that the connecting piece can rotate around the first connection rod according to a specified trajectory.

In a possible implementation of this application, the first support board may be fixedly connected to the first face of the connecting piece. In this way, the first support board and the connecting piece can rotate along a same movement trajectory.

When the support assembly provided in this application is used in an electronic device, different users have personalized requirements on an expansion angle of the electronic device. To meet use requirements of different users, in this application, the first support board can further hover in a specific rotation position under damping force without external force, so that an included angle between the first support board and the third support board meets the use requirements of the users. During specific implementation, the rotating assembly may further include a first elastic piece. The elastic piece is disposed on a side that is of the first fastening piece and that is away from the second fastening piece. Elastic force generated by the first elastic piece along an axis of the main shaft may be applied on the first fastening piece.

In addition, the rotating assembly further includes a first extrusion structure. The first extrusion structure may be located between the first fastening piece and the first elastic piece. The first extrusion structure may be sleeved on the main shaft. The first extrusion structure and the main shaft are fastened relative to each other in the radial direction of the main shaft. A deformation amount of the first elastic piece changes when the first extrusion structure rotates with the main shaft. Because the main shaft is rotatively connected to the first fastening piece, and the first extrusion mechanism and the main shaft can rotate synchronously, in the rotation process of the main shaft, the first extrusion mechanism and the first fastening piece may rotate relative to each other. However, the deformation amount of the first elastic piece changes, and the elastic force applied by the first elastic piece on the first extrusion structure changes. Therefore, extrusion force between the first extrusion mechanism and the first fastening piece changes, and damping force generated by sliding friction between the first extrusion mechanism and the first fastening piece changes. In this way, a hand feel of the user can be improved. In addition, when external force is removed, the first extrusion mechanism and the first fastening piece may stop relative rotation under damping force generated between the first extrusion mechanism and the first fastening piece, so that the support assembly hovers in a corresponding rotation position.

In this application, in order that the support assembly can stably stay in the specified rotation position, the rotating assembly may further include a second extrusion structure. The second extrusion structure is located between the first extrusion structure and the first fastening piece. The second extrusion structure is sleeved on the main shaft. The main shaft is rotatively connected to the second extrusion structure. In addition, the first elastic piece presses the first extrusion structure toward the second extrusion structure. A first slot is disposed on an end face that is of the first extrusion structure and that faces the first fastening piece. A first protrusion is disposed on an end face that is of the second extrusion structure and that faces the first extrusion structure. It may be understood that, when the first protrusion falls into the first slot, a total length of the first extrusion structure and the second extrusion structure is the smallest in an axial direction of the main shaft. In this case, the deformation amount of the first elastic piece is the smallest, and damping force generated between the first extrusion structure and the second extrusion structure is relatively small. When the first protrusion is located outside the first slot, a total length of the first extrusion structure and the second extrusion structure is the largest in an axial direction of the main shaft. In this case, the deformation amount of the first elastic piece is the largest, and damping force generated between the first extrusion structure and the second extrusion structure is relatively large. Therefore, the damping force generated between the first extrusion structure and the second extrusion structure can be adjusted through adjusting positions of disposing a first cam and a second slot, to adjust a position in which the support assembly can hover.

In a possible implementation of this application, the rotating assembly may further include a second elastic piece. The second elastic piece may be disposed on a side that is of the second fastening piece and that is away from the first fastening piece. Alternatively, a hollow region is disposed on the second connection rod, and the second elastic piece is disposed in the hollow region. In addition, the second elastic piece is sleeved on the main shaft. One end of the second elastic piece is fixedly connected to the main shaft, and the other end of the second elastic piece is fixedly connected to the second fastening piece. Because the main shaft can rotate around the second fastening piece, the second elastic piece can generate elastic force around the axial direction of the main shaft in the rotation process of the main shaft. By using the elastic force, a corresponding hand feel can be provided for the user in a process in which the user rotates the support assembly, thereby improving user experience.

In this application, the support assembly may further include a keyboard body. The support portion may be rotatively connected to the keyboard body through the rotating shaft assembly. In addition, the keyboard body includes a rotating shaft connecting piece, a frame assembly, and keys. The rotating shaft connecting piece can move with movement of the rotating shaft mechanism. Specifically, when the rotating shaft mechanism moves, the rotating shaft connecting piece can be driven to move along the direction toward or away from the rotating shaft mechanism. In this application, the keys may be in a plurality of rows disposed in parallel. Each row of the keys includes a plurality of keys. Quantities of keys in rows may be the same or different. This is not specifically limited in this application. Key slots are further disposed on the keyboard body. The keys may be accommodated in corresponding key slots. In addition, when the frame assembly is disposed, the frame assembly may include a first frame, a second frame, and horizontal rods. The first frame and the second frame may be disposed relative to each other. The first frame and the second frame are fixedly connected to the rotating shaft connecting piece. In this way, when the rotating shaft connecting piece moves, the first frame and the second frame can move with the rotating shaft connecting piece along the direction toward or away from the rotating shaft mechanism. The plurality of rows of the keys may be located between the first frame and the second frame. Each row of the keys may be arranged along a direction from the first frame to the second frame. One horizontal rod may be correspondingly disposed for each row of the keys. When the first frame and the second frame move with the rotating shaft connecting piece along the direction toward or away from the rotating shaft mechanism, the horizontal rods may be driven to move along the arrangement direction of each row of the keys. In addition, with movement of the horizontal rods, the keys may move toward the key slots or move in a direction of coming out of the key slots. On this basis, when the keyboard body is in a using state, the keys may move along specified trajectories in the direction of coming out of the key slots, to meet a use requirement of the user for input through hitting. In addition, when the keyboard body is not used, the keys may move toward the key slots. In this way, parts that are of the keys and that come out of the key slots are relatively small, so that a size of the entire keyboard body is relatively small in a thickness direction, to help implement a thin design of the support assembly.

In order that the rotating shaft mechanism can drive the rotating shaft connecting piece to rotate, in a possible implementation of this application, the rotating assembly may further include a third connection rod. The third connection rod is connected to the second fastening piece in a sliding manner. In the rotation process of the main shaft, the third connection rod may slide along a direction of approaching or leaving the keyboard body. On this basis, the rotating shaft connecting piece may be fixedly connected to the third connection rod. Therefore, the third connection rod slides to drive the rotating shaft connecting piece to slide along the direction of approaching or leaving the keyboard body.

In addition, to improve sliding stability of the third connection rod, in this application, a slide may be disposed on the second fastening piece, and the third connection rod may be accommodated in the slide and can slide along the slide. In this case, the slide may guide sliding of the third connection rod, to help improve sliding reliability of the third connection rod.

A fourth connection rod may be further disposed on the rotating assembly. The fourth connection rod is fixedly connected to the second fastening piece. A connection manner may be but is not limited to a tight connection by using a fastener such as a screw. In addition, the fourth connection rod may be disposed on an outer side of the slide, and the third connection rod is limited in the slide, so that the third connection rod can be prevented from falling off the slide, thereby improving reliability of a sliding connection between the third connection rod and the second fastening piece.

According to a second aspect, an electronic device is provided. The electronic device may include a host and the support assembly in the first aspect. The host is detachably connected to a first support board. By using the electronic device provided in this application, the host may move with the first support board along a specified trajectory. In addition, in a process in which the first support board moves and drives a third support board to slide along a direction toward or away from a rotating shaft mechanism, a triangular support structure surrounding the rotating shaft mechanism can be formed among the first support board, a second support board, and the third support board. This can help improve support stability of a support portion for the host, thereby improving structural reliability of the electronic device.

The host may be a user terminal including a display and a processor, for example, a tablet computer or a mobile phone. When the host and the support assembly are integrated, the electronic device is a user terminal that has functions such as a fold function and a support function that can be implemented by the support assembly.

According to a third aspect, a protection mechanism is provided. The protection mechanism includes a fastening frame, a first rotating shaft assembly, a second rotating shaft assembly, a first conversion bracket, and a motor connecting piece. The fastening frame may serve as a base of the entire protection mechanism, to support the entire protection mechanism. When the fastening frame is disposed, the fastening frame may include a first fastening plate and a second fastening plate. The first fastening plate and the second fastening plate are disposed relative to each other to form installation space between the first fastening plate and the second fastening plate.

The first rotating shaft assembly and the second rotating shaft assembly are both located in the installation space. The first rotating shaft assembly may include a first shaft and a first gear piece. One end of the first shaft is fastened to the first fastening plate, and the other end of the first shaft is fastened to the second fastening plate. The first gear piece is sleeved on the first shaft. The first gear piece can rotate around the first shaft. The second rotating shaft assembly includes a second shaft and a second gear piece. One end of the second shaft is fastened to the first fastening plate, and the other end of the second shaft extends toward the second fastening plate. The second gear piece is sleeved on the second shaft. The second gear piece can rotate around the second shaft. In addition, the first conversion bracket is located between the second gear piece and the second fastening plate, and the first conversion bracket is sleeved on the second shaft.

In this application, at least a part of the motor connecting piece is located on a side that is of the first conversion bracket and that is away from the first fastening plate. The motor connecting piece includes a rotation center per piece. An end part that is of the second shaft and that faces the second fastening plate is inserted into the rotation center piece. An end that is of the rotation center piece and that is away from the first conversion bracket penetrates the second fastening plate. The rotation center piece may be configured to connect to a motor.

By using the protection mechanism provided in this application, when the motor drives the rotation center piece to rotate, and torque applied on the first conversion bracket is less than connection force between the first conversion bracket and the rotation center piece, the first conversion bracket is connected to the motor connecting piece. In this case, the first conversion bracket and the rotation center piece may rotate synchronously. In addition, the first conversion bracket may drive the first gear piece to rotate around the first shaft. Rotation torque of the first gear piece may be transmitted to the second rotating shaft assembly. When torque applied on the second rotating shaft assembly is transmitted to the first conversion bracket through the first gear piece, and torque applied on the first conversion bracket is greater than connection force between the first conversion bracket and the rotation center piece, the first conversion bracket may be disconnected from the motor connecting piece. Therefore, the following case is avoided: The torque that is greater than the connection force between the first conversion bracket and the rotation center piece is applied on the rotation center piece. In this way, the motor connected to the rotation center piece can be protected.

When the first gear piece is disposed, along a direction from the first fastening plate to the second fastening plate, the first gear piece may include a first gear structure and a second gear structure, and the first gear structure and the second gear structure are spaced. When the second gear piece is disposed, the second gear piece may include a third gear structure, and the third gear structure can be engaged with the first gear structure. In addition, the first conversion bracket may include a fourth gear structure, and the fourth gear structure is engaged with the second gear structure. In this way, when the first conversion bracket drives the first gear piece to rotate around the first shaft, the first gear piece slides along a direction from the first fastening plate to the second fastening plate, so that the third gear structure is detached from the first gear structure. However, when the third gear structure is detached from the first gear structure, rotation torque of the first gear piece is no longer transmitted to the third gear structure. In this case, the second gear piece stops rotating. In this application, a state in which the third gear structure is detached from the first gear structure may be a state in which the motor drives the protection mechanism to be opened to the largest angle.

It can be learned from the foregoing description that the first conversion bracket and the rotation center piece may be connected or disconnected. To implement the connection or disconnection between the first conversion bracket and the rotation center piece, specific structures of the first conversion bracket and the rotation center piece may be disposed. During specific implementation, the first conversion bracket may be provided with an accommodating cavity. An opening of the accommodating cavity faces the motor connecting piece. The rotation center piece may be inserted into the accommodating cavity. The first conversion bracket may be further provided with a first elastic piece and a rolling piece. The first elastic piece and the rolling piece are accommodated in the accommodating cavity. One end of the first elastic piece abuts against the rotation center piece, and the other end of the first elastic piece presses the rolling piece toward a bottom wall of the accommodating cavity.

In addition, a slot may be further disposed on the bottom wall of the accommodating cavity of the first conversion bracket. In this way, when the rolling piece is accommodated in the slot, the first conversion bracket and the rotation center piece are in a connected state. In this state, the first conversion bracket may rotate synchronously with the rotation center piece. When the rolling piece is detached from the slot, the first conversion bracket is disconnected from the rotation center piece. In this state, the rotation torque of the first conversion bracket cannot be transmitted to the rotation center piece. In this case, the rotation center piece stops rotating.

In a possible implementation of this application, a first stopper may be further disposed on an end part that is of the second gear piece and that faces the first fastening plate, and a notch is disposed on the first stopper. The second rotating shaft assembly may further include a fast pin and a sliding pin. The fast pin and the sliding pin are located on a side that is of the second gear piece and that faces the first fastening plate. The fast pin is sleeved on the second shaft. The fast pin is rotatively connected to the second shaft. The sliding pin is disposed between the fast pin and the first stopper. One end that is of the sliding pin and that faces the fast pin is connected to the fast pin in a sliding manner. A second stopper is disposed on one end that is of the sliding pin and that is away from the fast pin. The second stopper can be inserted into the notch. When the second stopper of the sliding pin is inserted into the notch, rotation of the second gear piece may drive the sliding pin to rotate, thereby driving the fast pin to rotate.

In a possible implementation of this application, a gasket may be further disposed between the sliding pin and the second gear piece. The sliding pin and the second gear piece both abut against the gasket. In this way, when the sliding pin and the second gear piece may rotate relative to each other, damping force can be generated between the sliding pin and the second gear piece, to help improve user experience.

To implement sliding of the first gear piece along the first shaft, in this application, a guide slot structure may be further disposed on the first gear piece. The guide slot structure may be located between the first gear structure and the first fastening plate. A guide slot may be disposed on the guide slot structure. The guide slot may be disposed in a spiral shape. In addition, a guide structure may be disposed on the fast pin, and the guide structure may be inserted into the guide slot. In this way, when the fast pin rotates, the guide structure can slide in the guide slot. However, the guide slot may be disposed in a spiral shape. In a process in which the guide structure slides in the guide slot, the first gear piece may be driven to slide along an axial direction of the first shaft, so that the third gear is detached from the first gear. In addition, in a rotation process of the fast pin, the sliding pin may slide with sliding of the first gear piece. A sliding direction of the sliding pin may be opposite to a sliding direction of the first gear piece.

In a possible implementation of this application, the first rotating shaft assembly may further include an assisting mechanism. One end of the assisting mechanism may be fixedly connected to the first gear piece, and the other end of the assisting mechanism is fixedly connected to the first shaft. In this way, the assisting mechanism is properly designed, so that the assisting mechanism can be configured to provide assistance for sliding of the first gear piece along the first shaft, to improve sliding reliability of the first gear piece.

According to a fourth aspect, a motor assembly is provided. The motor assembly includes the protection mechanism in the third aspect.

According to a fifth aspect, an electronic device is provided. The electronic device includes a first housing, a second housing, a rotating assembly, and the motor assembly in the fourth aspect. The first housing and the second housing are located on two sides of the rotating assembly. When the motor rotates, the first housing and the second housing may be driven to rotate relative to the rotating assembly. By using the electronic device provided in this application, a motor may drive the first housing and the second housing to rotate relative to the rotating assembly, to implement electrical opening and closing of the electronic device. In this way, operation steps performed by a user to open or close the electronic device can be simplified, thereby improving user experience.

The electronic device may be a user terminal including a display and a processor, for example, a notebook computer, a tablet computer, or a mobile phone. The first housing may be configured to install the display of the electronic device or carry a host with a display. The second housing may be configured to carry a keyboard body. The keyboard body may be the keyboard subject mentioned in the foregoing first aspect. The rotating assembly may be the rotating assembly mentioned in the foregoing first aspect.

In a possible implementation of this application, the rotating assembly is located on a side that is of a first fastening plate and that is away from a second fastening plate, and the rotating assembly and a second rotating shaft assembly rotate synchronously.

In a possible implementation of this application, the electronic device further includes a second conversion bracket. The second conversion bracket is located between the first fastening plate and the rotating assembly. The rotating assembly is connected to the second rotating shaft assembly in a transmission manner through the second conversion bracket.

According to a sixth aspect, a keyboard assembly is provided. The keyboard assembly may include a keyboard body. The keyboard body includes a rotating shaft connecting piece, a frame assembly, and keys. The rotating shaft connecting piece is connected to a rotating shaft mechanism.

The rotating shaft connecting piece can move with movement of the rotating shaft mechanism. Specifically, when the rotating shaft mechanism moves, the rotating shaft connecting piece can be driven to move along a direction toward or away from the rotating shaft mechanism. In this application, the keys may be in a plurality of rows disposed in parallel. Each row of the keys includes a plurality of keys. Quantities of keys in rows may be the same or different. This is not specifically limited in this application. Key slots are further disposed on the keyboard body. The keys may be accommodated in corresponding key slots. In addition, when the frame assembly is disposed, the frame assembly may include a first frame, a second frame, and horizontal rods. The first frame and the second frame may be disposed relative to each other. The first frame and the second frame are fixedly connected to the rotating shaft connecting piece. In this way, when the rotating shaft connecting piece moves, the first frame and the second frame can move with the rotating shaft connecting piece along the direction toward or away from the rotating shaft mechanism. The plurality of rows of the keys may be located between the first frame and the second frame. Each row of the keys may be arranged along a direction from the first frame to the second frame. One horizontal rod may be correspondingly disposed for each row of the keys. When the first frame and the second frame move with the rotating shaft connecting piece along the direction toward or away from the rotating shaft mechanism, the horizontal rods may be driven to move along the arrangement direction of each row of the keys. In addition, with movement of the horizontal rods, the keys may move toward the key slots or move in a direction of coming out of the key slots. On this basis, when the keyboard assembly is in a using state, the keys may move along specified trajectories in the direction of coming out of the key slots, to meet a use requirement of the user for input through hitting. In addition, when the keyboard assembly is not used, the keys may move toward the key slots. In this way, parts that are of the keys and that come out of the key slots are relatively small, so that a size of the entire keyboard assembly is relatively small in a thickness direction, to help implement a thin design of the keyboard assembly.

In this application, when the first frame is disposed, the first frame may include a first inner frame and a first outer frame. The first outer frame is fixedly connected to the rotating shaft connecting piece. The first inner frame is located on a side that is of the first outer frame and that faces the keys. The first outer frame may be linked to the first inner frame. During specific implementation, a first connecting rod assembly is disposed between the first inner frame and the first outer frame. The first connecting rod assembly includes a first connecting rod and a second connecting rod. One end of the first connecting rod is hinged to the first inner frame, and the other end of the first connecting rod is hinged to the first outer frame. One end of the second connecting rod is hinged to a rod body of the first connecting rod, and the other end of the second connecting rod is hinged to a mechanical part that is in a fixed position on the keyboard body. In this way, in a process in which the rotating shaft connecting piece moves along the direction toward or away from the rotating shaft mechanism, the first outer frame may be driven to move along the direction toward or away from the rotating shaft mechanism, so that the first inner frame can be driven to move along the direction of approaching or leaving the first outer frame.

Similarly, when the second frame is disposed, the second frame may include a second inner frame and a second outer frame. The second outer frame is fixedly connected to the rotating shaft connecting piece. The second inner frame is located on a side that is of the second outer frame and that faces the keys. The second outer frame may be linked to the second inner frame. During specific implementation, a second connecting rod assembly is disposed between the second inner frame and the second outer frame. The second connecting rod assembly includes a third connecting rod and a fourth connecting rod. One end of the third connecting rod is hinged to the second inner frame, and the other end of the third connecting rod is hinged to the second outer frame. One end of the fourth connecting rod is hinged to a rod body of the third connecting rod, and the other end of the fourth connecting rod is hinged a mechanical part that is in a fixed position on the keyboard body. In this way, in a process in which the rotating shaft connecting piece moves along the direction toward or away from the rotating shaft mechanism, the second outer frame may be driven to move along the direction toward or away from the rotating shaft mechanism, so that the second inner frame can be driven to move along the direction of approaching or leaving the first outer frame.

In this application, in a process in which the first outer frame and the second outer frame move along the direction toward or away from the rotating shaft mechanism with rotation of the rotating mechanism, the first inner frame and the second inner frame may be driven to move in a same direction along the arrangement direction of each row of the keys. In this way, one end of the horizontal rod may be fixedly connected to the first inner frame, and the other end of the horizontal rod may be fixedly connected to the second inner frame, so that the horizontal rod can move along the arrangement direction of each row of the keys.

In addition, in a process in which the horizontal rod moves along the arrangement direction of each row of the keys, in order that the keys may move toward the key slots or move in the direction of coming out of the key slots with the movement of the horizontal rod, in a possible implementation of this application, the key may include a key cap and an up and down mechanism. The up and down mechanism may be located in the key slot. The key cap cover is disposed on the up and down mechanism. The up and down mechanism may be configured to drive the key cap to move back and forth in the direction toward or the direction of coming out of the key slot. In addition, first abutting structures are disposed on the horizontal rod, and second abutting structures are disposed on the up and down mechanism. In a process in which each horizontal rod moves along the arrangement direction of the keys, first abutting structures may be driven to press second abutting structures of a key in a corresponding row, to press an up and down mechanism to a key slot. The key slot driven by the up and down mechanism moves toward the key slot. It may be understood that, when extrusion force between the first abutting structure and the second abutting structure is removed, the up and down mechanism may go up in the direction of coming out of the key slot, to drive the key cap to move in the direction of coming out of the key slot.

In this application, a plurality of key slots may be disposed on the keyboard body, and a plurality of first abutting structures may be disposed on the horizontal rod. At least one abutting structure may be accommodated in each key slot. For example, two abutting structures may be accommodated in each key slot, to apply stable extrusion force on the up and down mechanism.

Force may be transmitted between the first abutting structure and the second abutting structure in a surface contact manner, to improve reliability of contact between the first abutting structure and the second abutting structure. For example, the first abutting structure may have a first inclined face, the second abutting structure may have a second inclined face, and the first inclined face and the second inclined face are disposed relative to each other. In this way, when the horizontal rod moves along the arrangement direction of each row of the keys, the first inclined face may be in contact with the second inclined face, so that the up and down mechanism can move toward the key slot.

In a possible implementation of this application, in order that the rotating shaft mechanism can drive the rotating shaft connecting piece to move, when the rotating shaft mechanism is disposed, the rotating shaft mechanism may include a rotating assembly. The rotating assembly may include a main shaft and a connection rod. As the main shaft rotates, the connection rod slides along a direction of approaching or leaving the keyboard body. In this way, the rotating shaft connecting piece may be fixedly connected to the connection rod. Therefore, the connection rod drives the rotating shaft connecting piece to slide along the direction of approaching or leaving the keyboard body.

In this application, to implement sliding of the connection rod, the rotating assembly may further include a fastening piece. The main shaft is rotatively connected to the fastening piece. The connection rod is connected to the fastening piece in a sliding manner. In addition, a stop portion is further disposed on the main shaft. A track slot is disposed on an end face that is of the stop portion and that faces the connection rod. Correspondingly, the connection rod has a connecting portion. The connecting portion is inserted into the track slot. In this way, in a rotation process of the main shaft, the connecting portion may be driven to slide in the track slot, to push the connection rod to slide in the direction of approaching or leaving the keyboard body.

In addition to the foregoing implementation, the sliding of the connection rod may be further implemented in another possible implementation. For example, the rotating assembly may further include a swing rod structure. The swing rod structure is sleeved on the main shaft. In a radial direction of the main shaft, the swing rod structure is fixedly connected to the main shaft, and the swing rod structure has a protruding portion. In addition, a connecting rod has a connecting portion. A track slot is disposed on the connecting portion. The track slot has a recessed portion. In this way, in a process in which the swing rod structure rotates with the main shaft, the protruding portion can be driven to slide along the track slot. When the protruding portion extends into the recessed portion, the connecting rod can be driven to slide in a sliding slot along the direction of approaching or leaving the keyboard body.

According to a seventh aspect, an electronic device is provided. The electronic device includes a host and the keyboard assembly in the sixth aspect. The host may be rotatively connected to a keyboard body through a rotating shaft mechanism. In this application, the rotating shaft mechanism may be fixedly connected to the keyboard body. By using the electronic device provided in this application, when the electronic device is opened, keys may move along specified trajectories in a direction of coming out of key slots, to meet a use requirement of a user for input through hitting keys. In addition, when the electronic device is closed, the keys may move toward the key slots. In this way, parts that are of the keys and that come out of the key slots are relatively small, so that a size of the entire keyboard assembly is relatively small in a thickness direction, to help implement a thin design of the keyboard assembly and implement a thin design of the electronic device in this state.

According to an eighth aspect, an electronic device is provided. The electronic device includes a display and the keyboard assembly in the sixth aspect. The display is rotatively connected to a keyboard body through a rotating shaft mechanism. In this application, the rotating shaft mechanism may be fixedly connected to the keyboard body, and the rotating shaft mechanism may be a part of the keyboard assembly. Alternatively, the rotating shaft mechanism does not belong to the keyboard assembly, but is a structure of the electronic device. By using the electronic device provided in this application, when the electronic device is opened, keys may move along specified trajectories in a direction of coming out of key slots, to meet a use requirement of a user for input through hitting keys. In addition, when the electronic device is closed, the keys may move toward the key slots. In this way, parts that are of the keys and that come out of the key slots are relatively small, so that a size of the entire keyboard assembly is relatively small in a thickness direction, to help implement a thin design of the keyboard assembly and implement a thin design of the electronic device in this state.

BRIEF DESCRIPTION OF DRAWINGS

FIG. 8a is a sectional view along A-A of the rotating assembly shown in FIG. 6a;

15

Figure 13A:
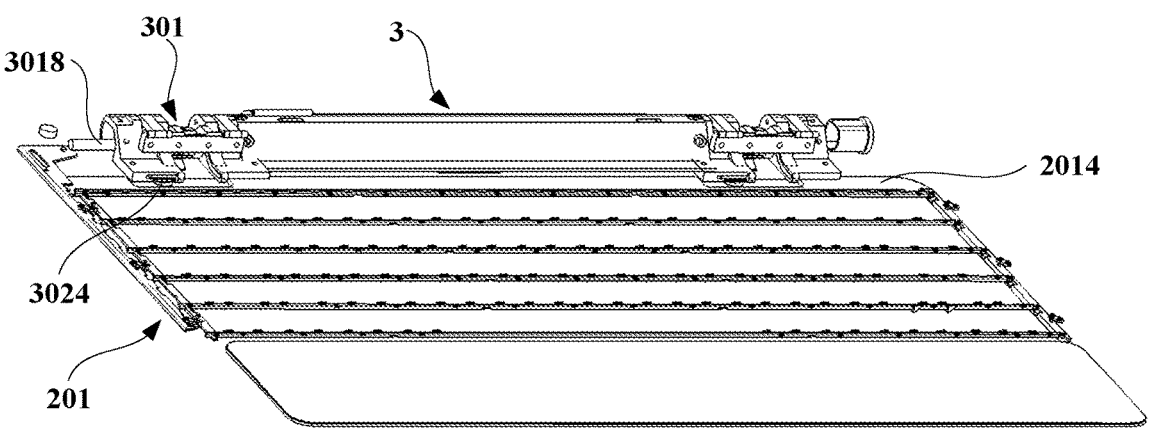
FIG. 13a is a schematic diagram of an entire structure of a keyboard body according to an embodiment of this application.
Figure 13B:
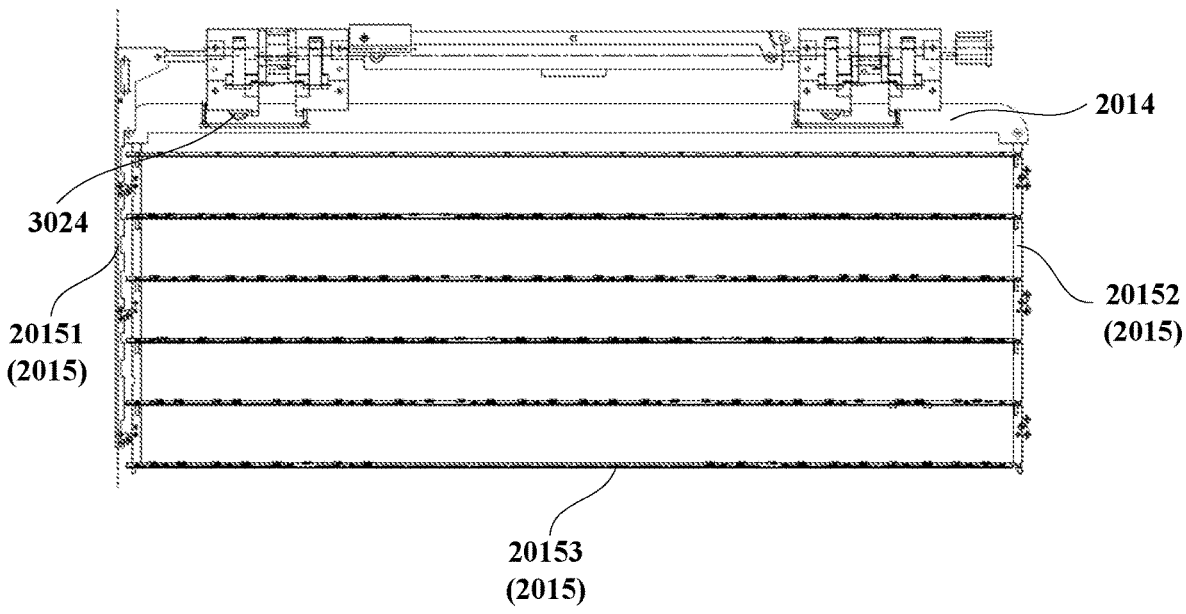

FIG. 13b is a schematic diagram of a structure of the keyboard body shown in FIG. 13a *from another angle;*

Figure 14:
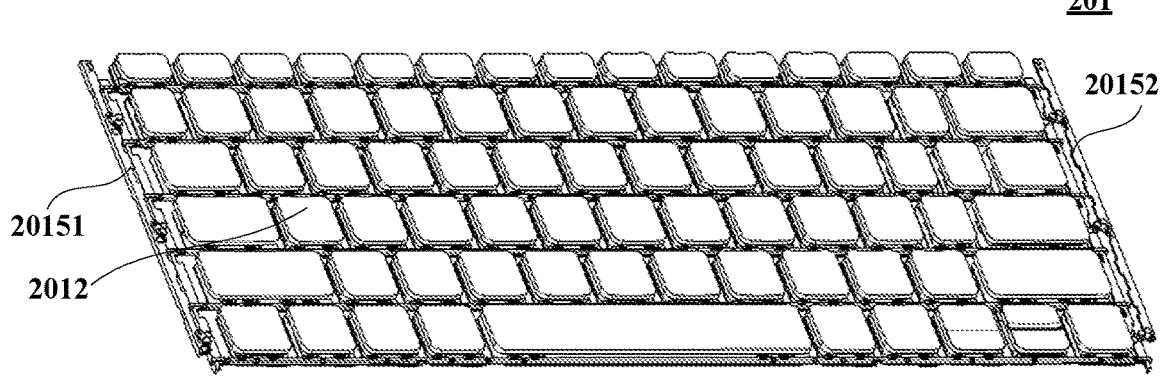
Figure 15:
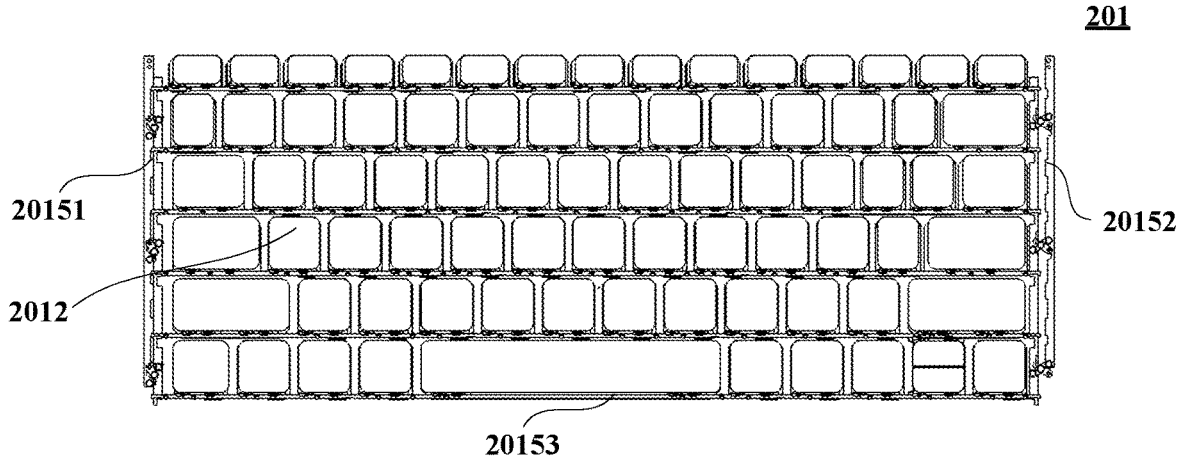
Figure 16:
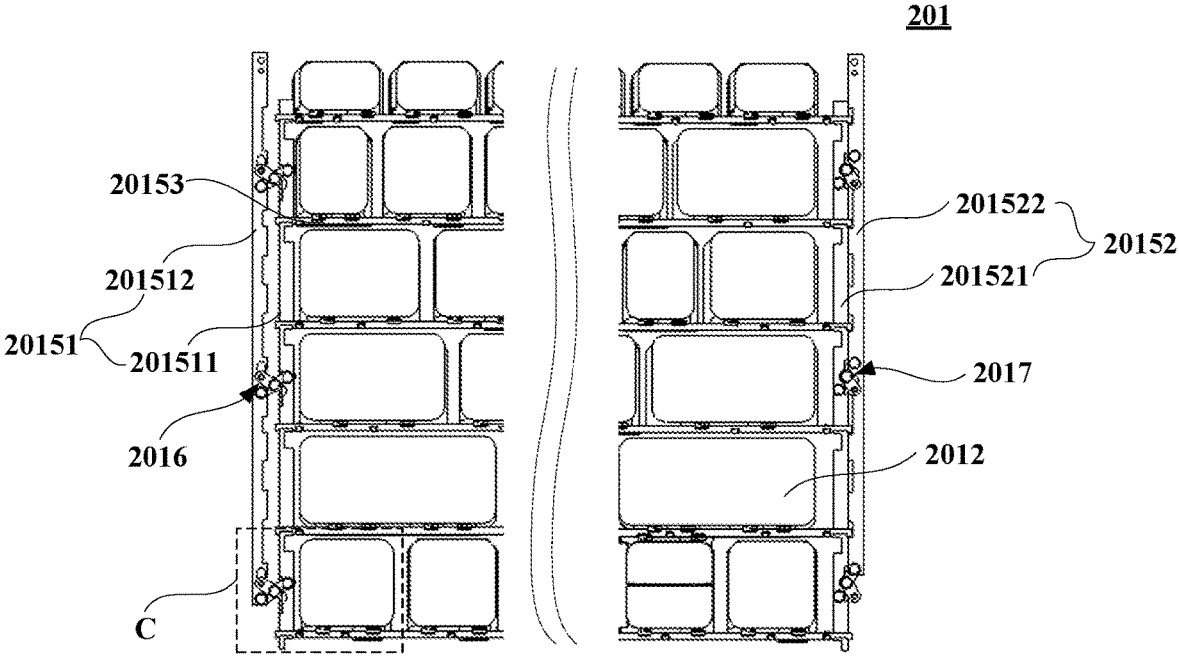
Figure 17:
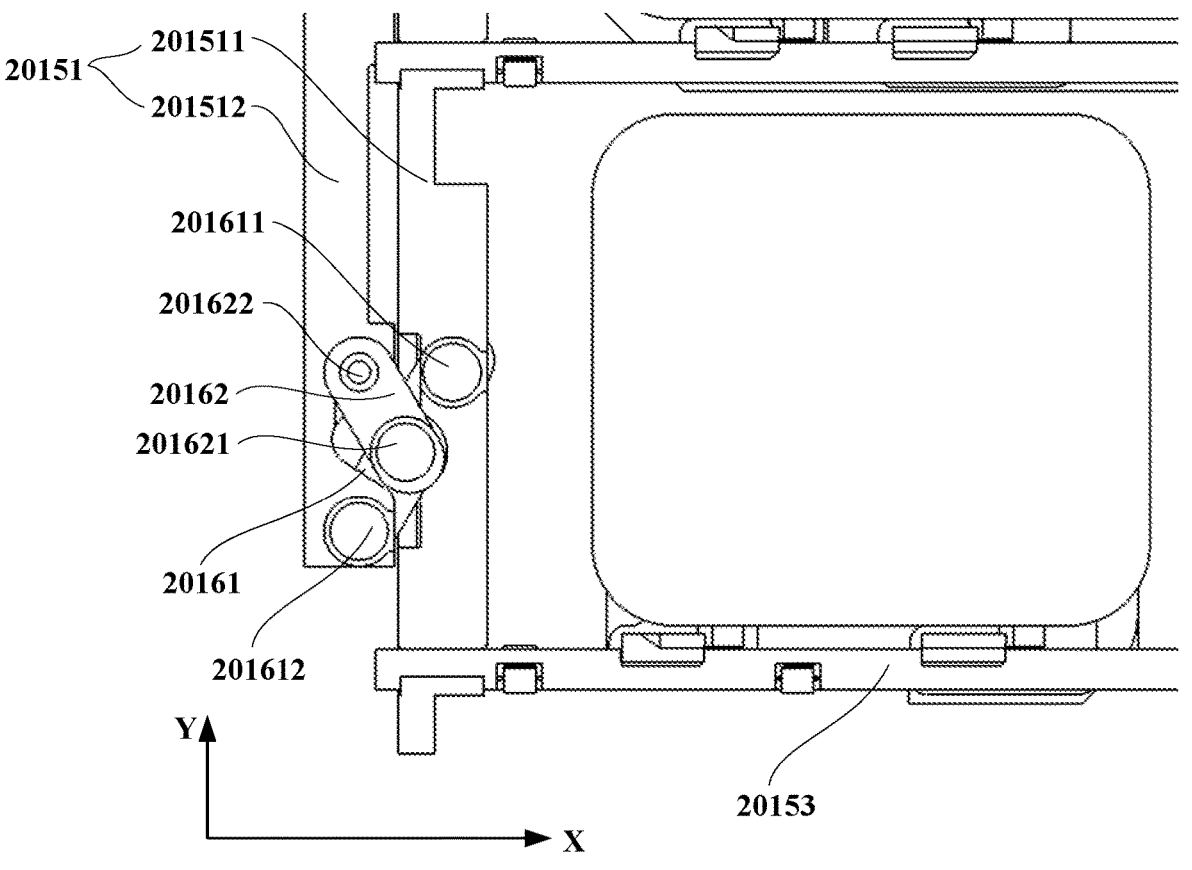
Figure 18:
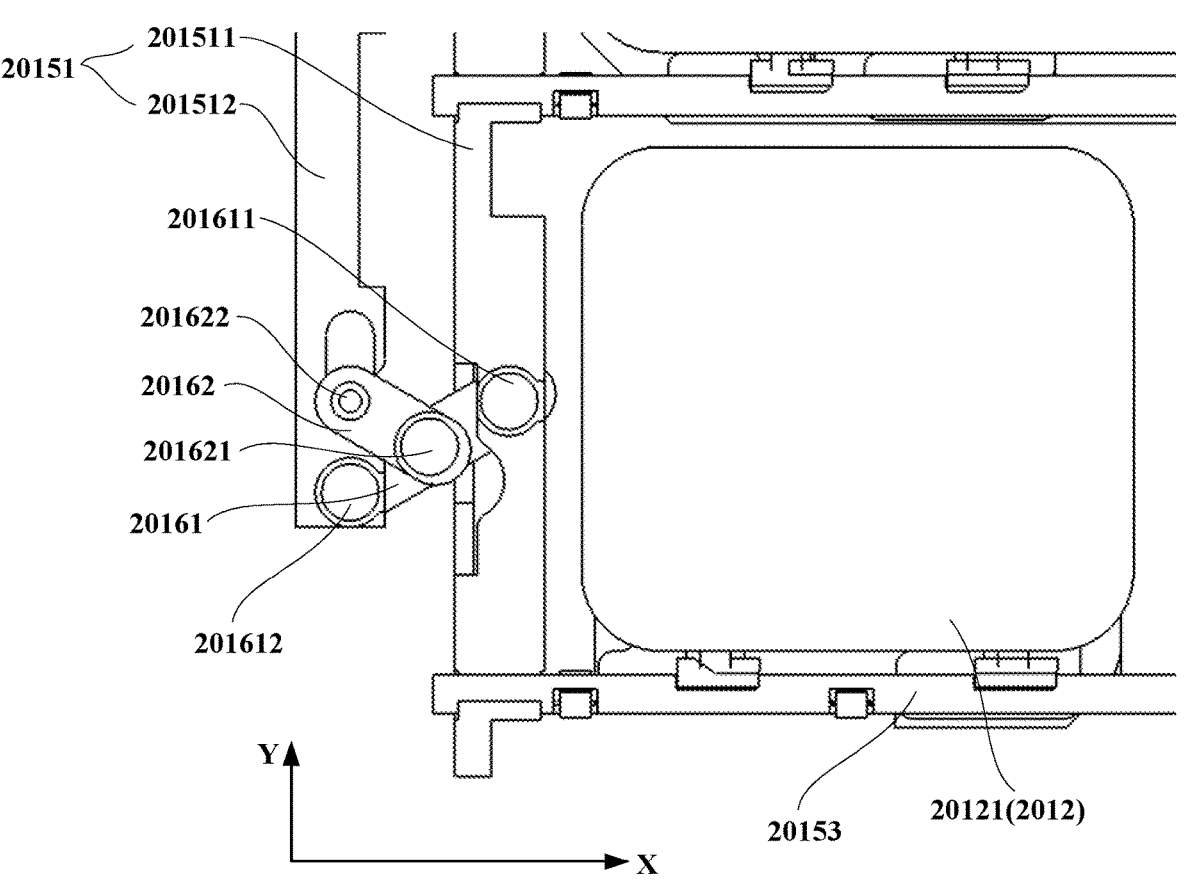
Figure 19:
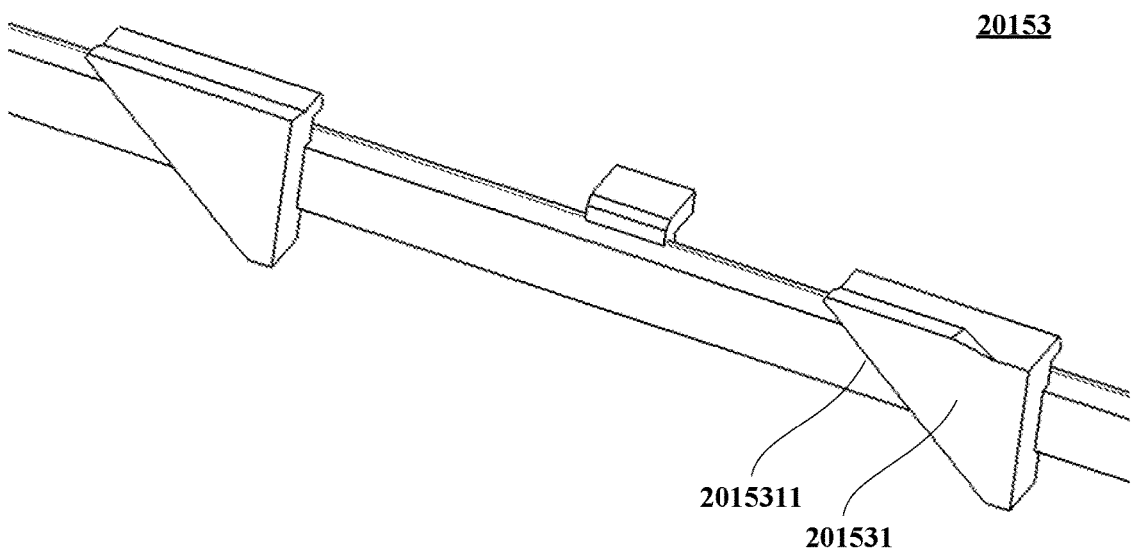
Figure 20:
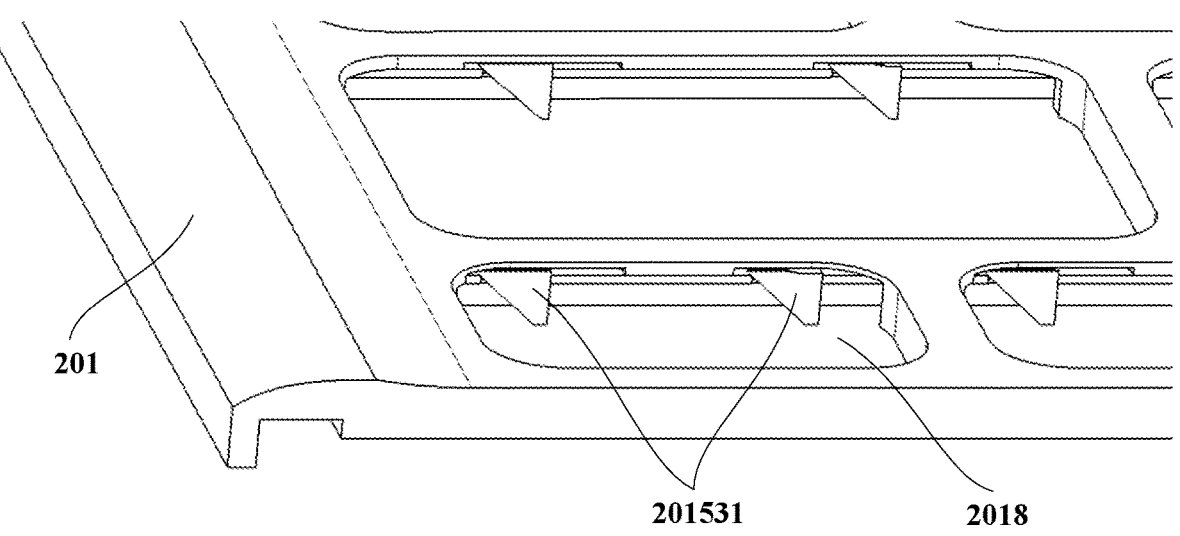
Figure 21:
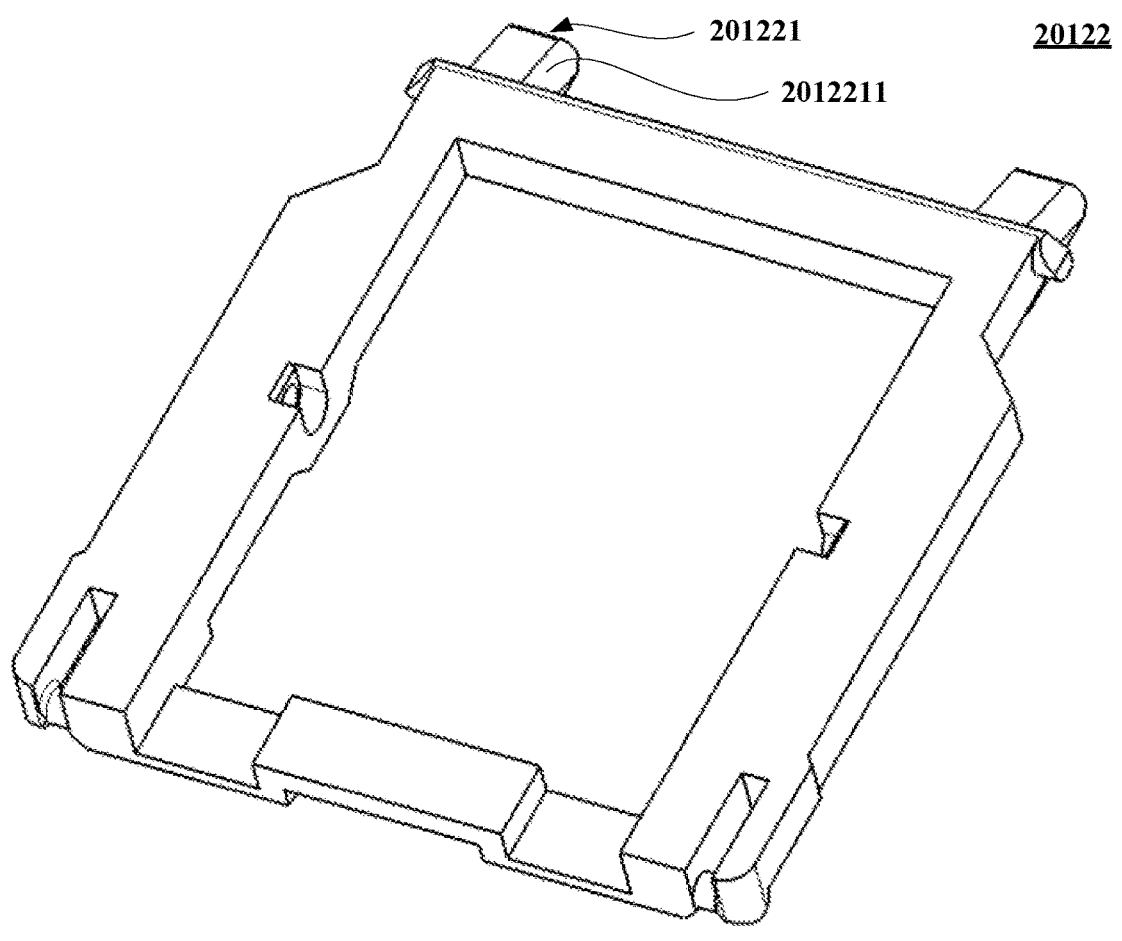
Figure 22:
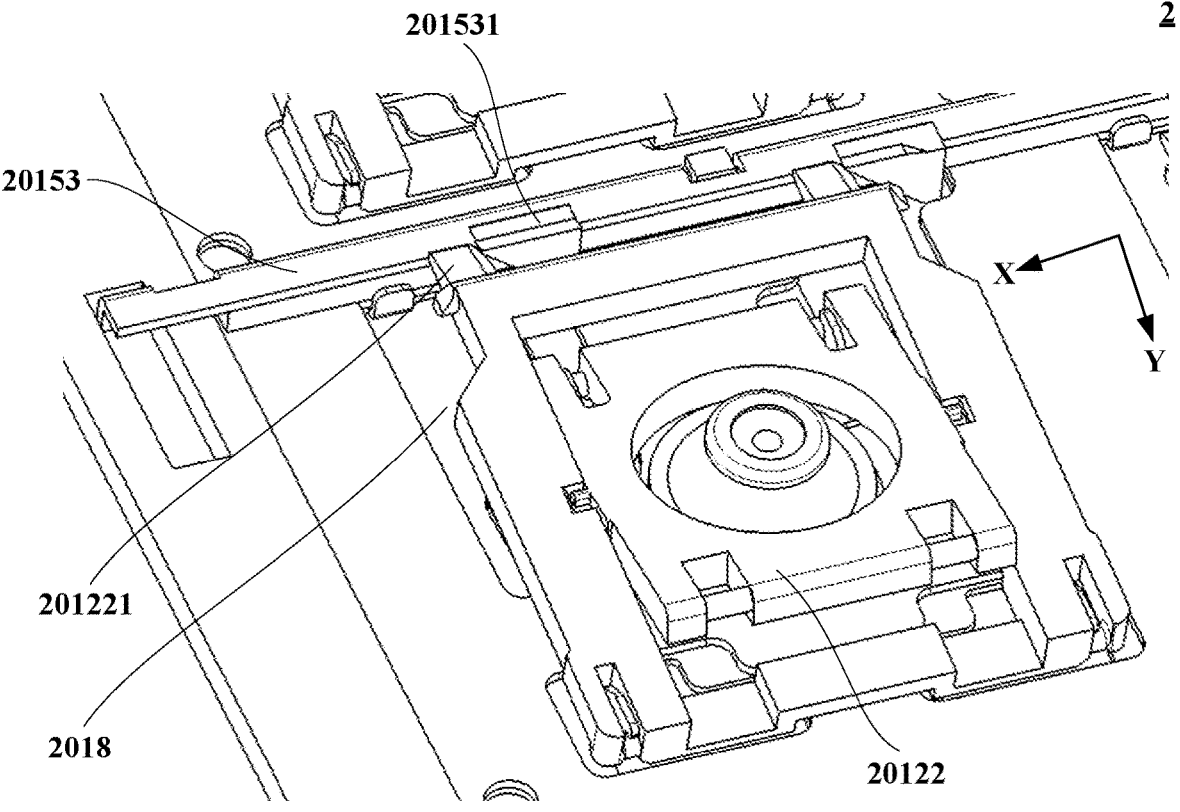
Figure 23:
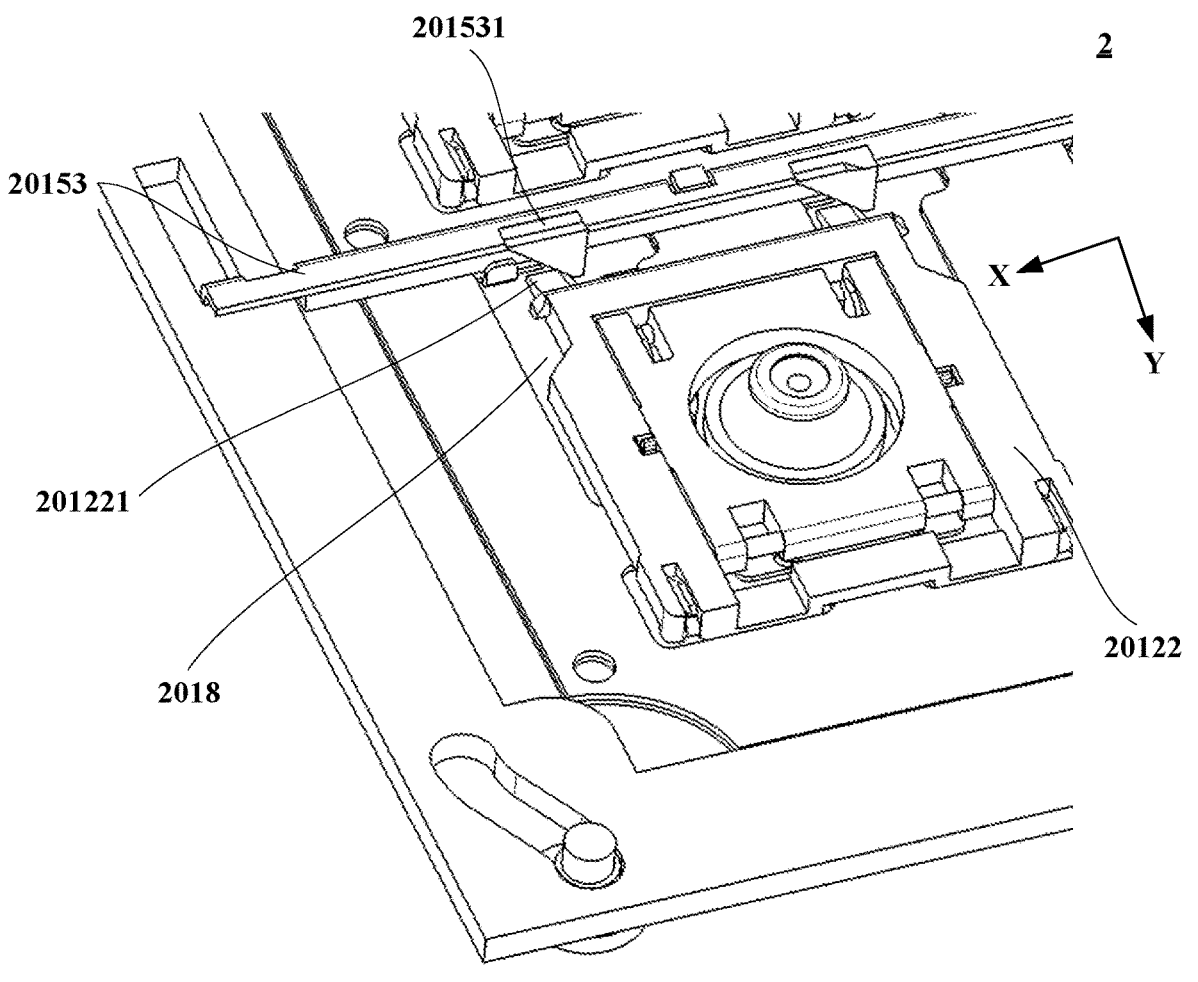
Figure 24:
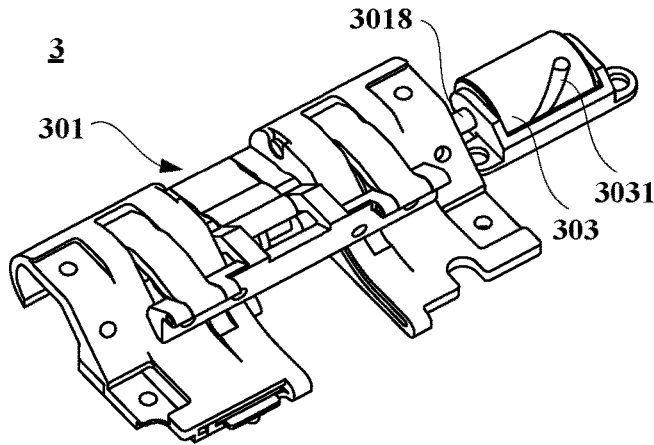
Figure 25A:
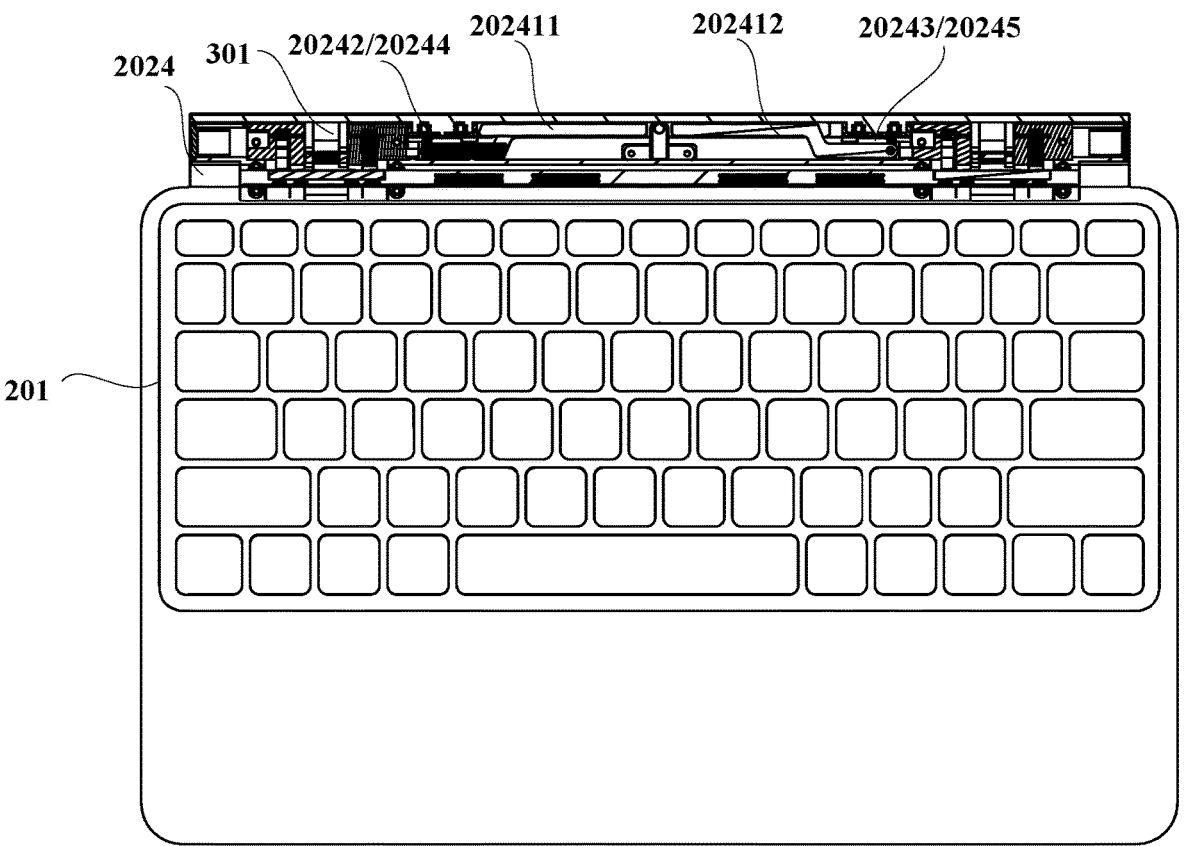
Figure 25B:
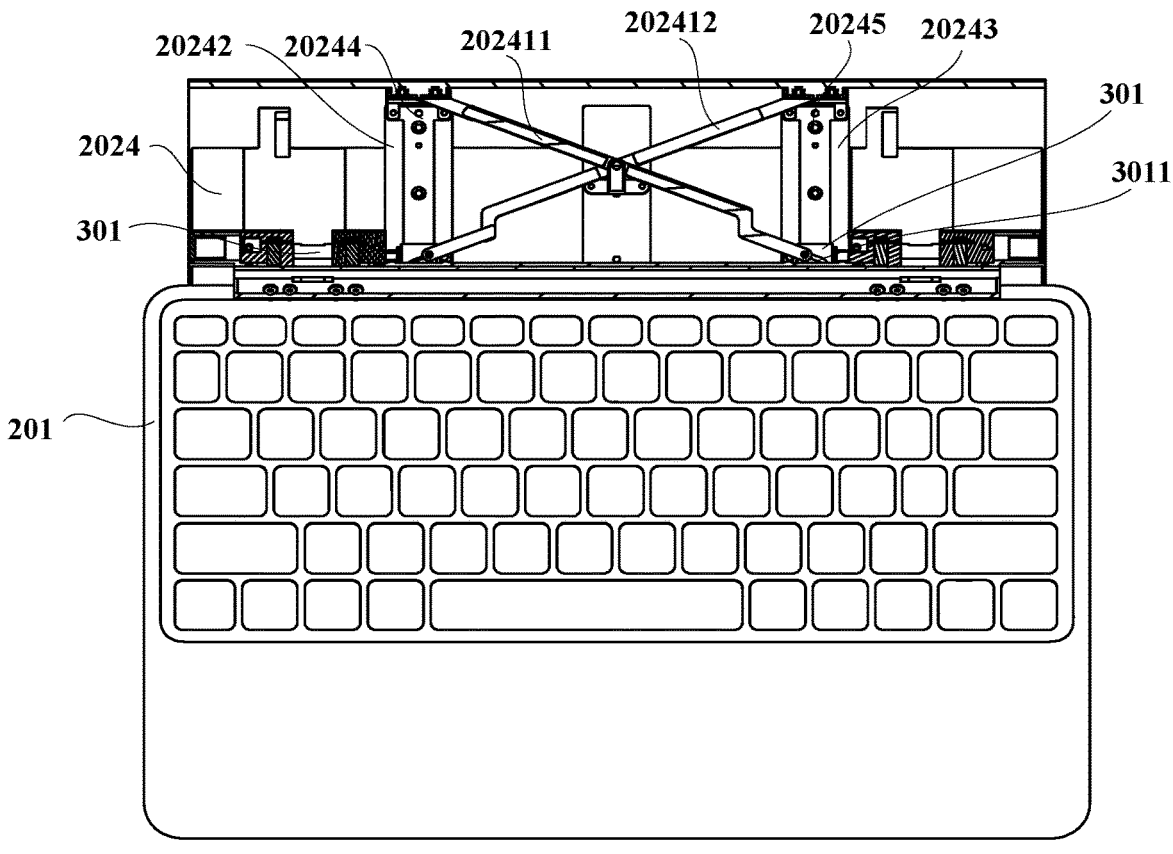
Figure 26:
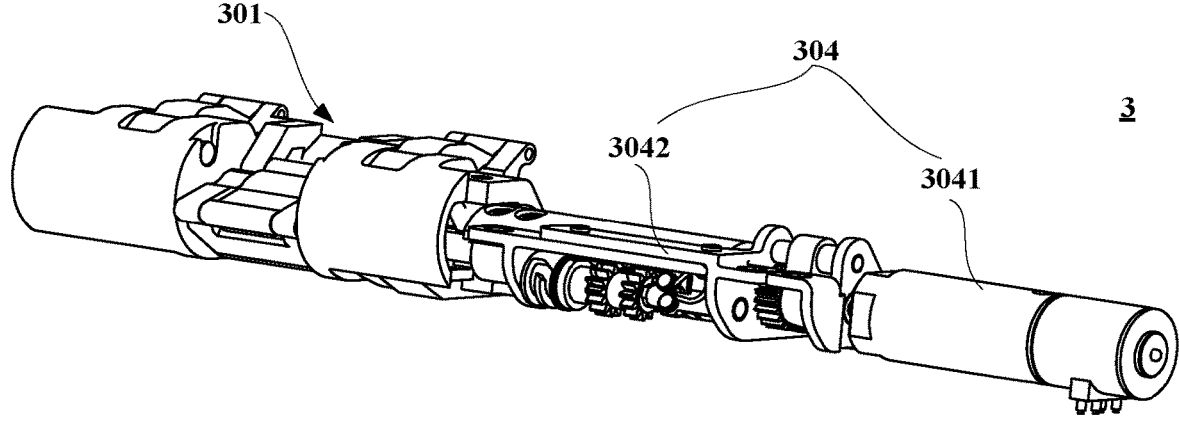
Figure 27:
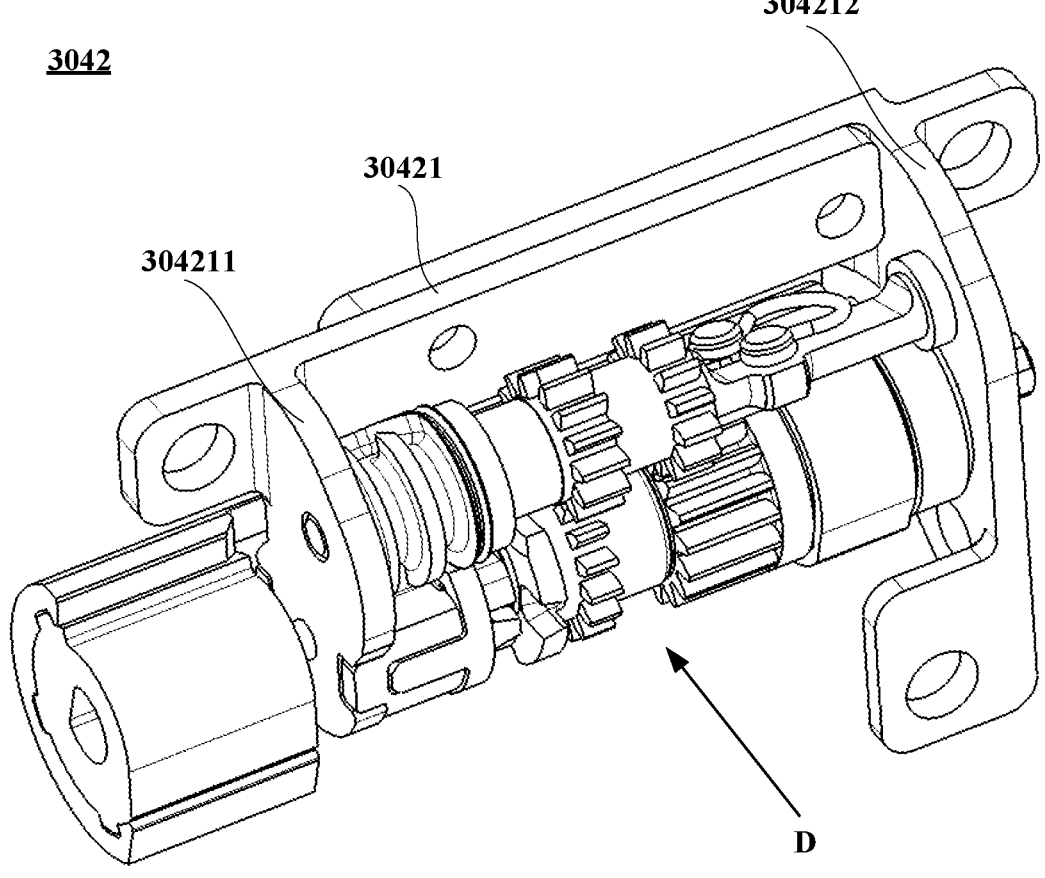
Figure 28:
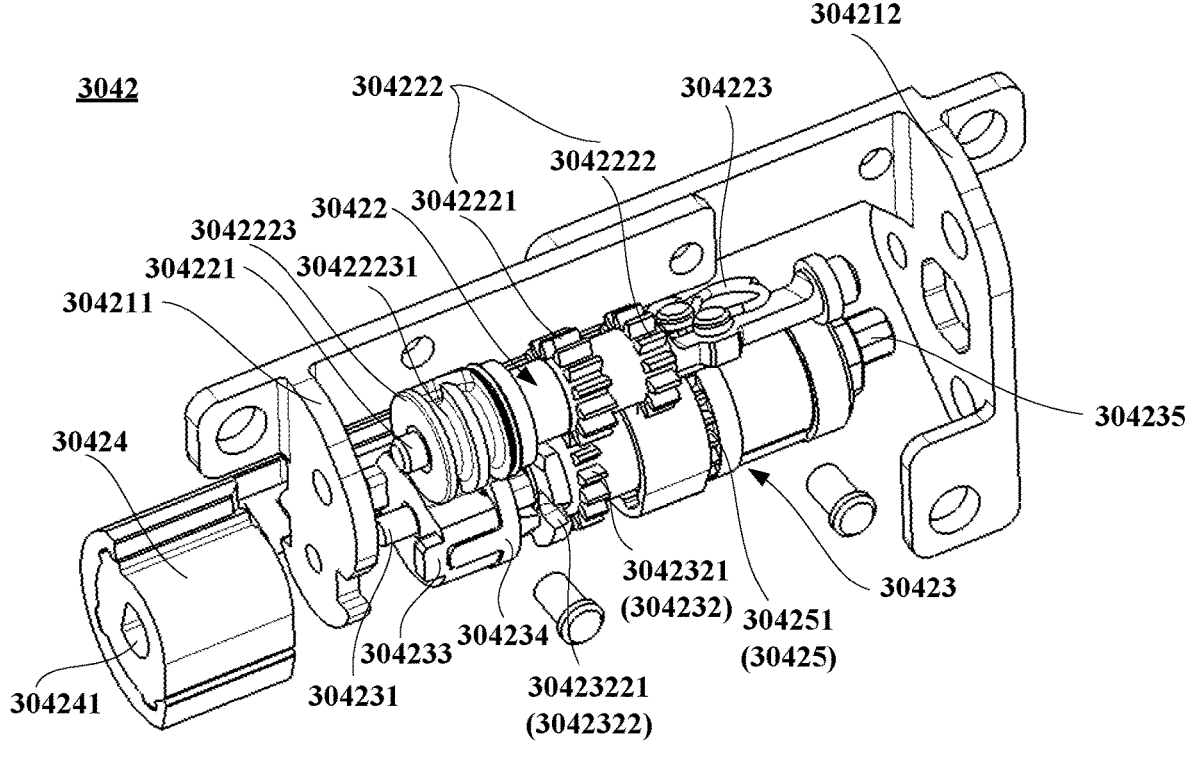
Figure 29A:
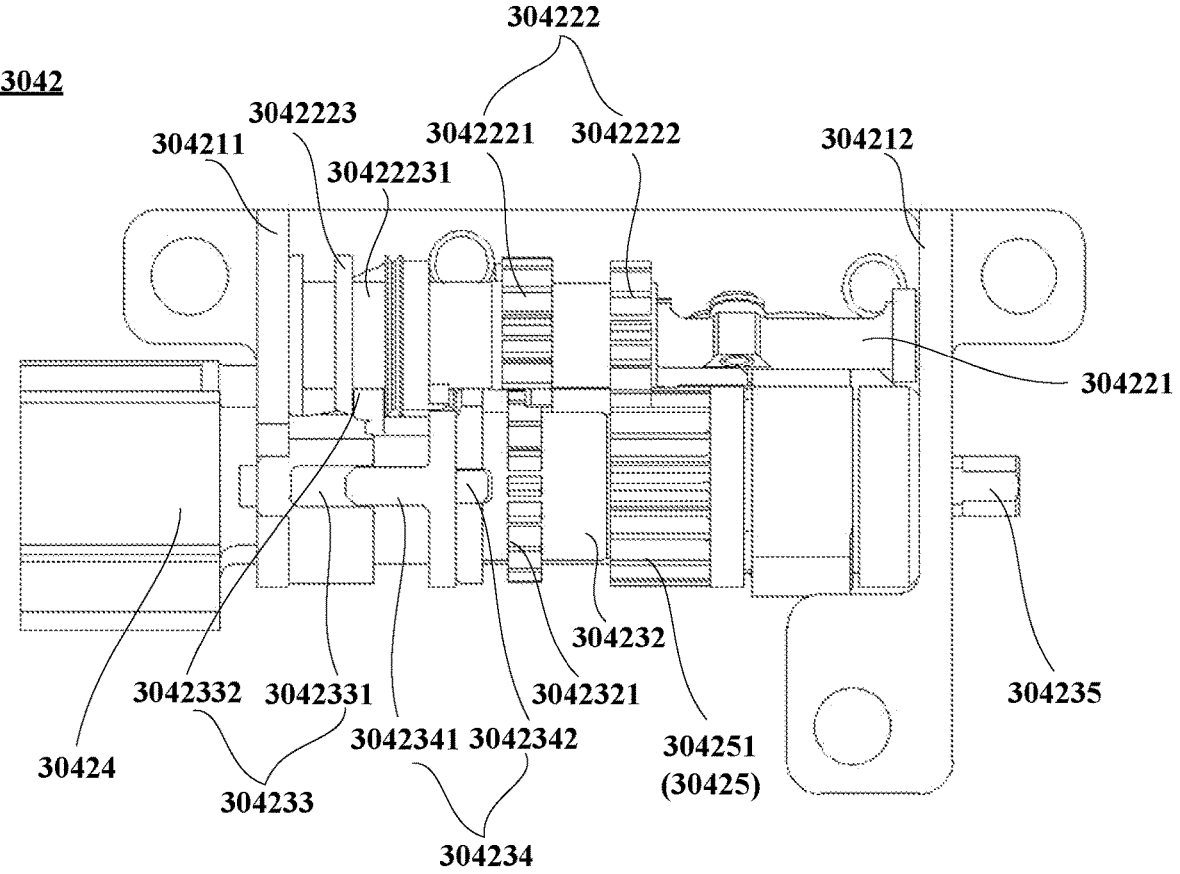
Figure 29B:
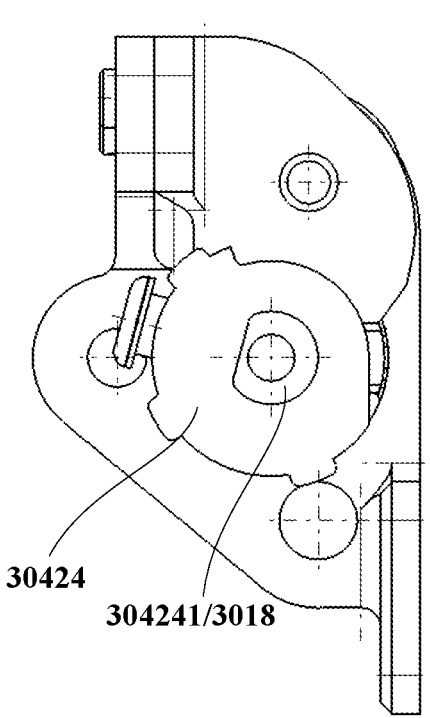
Figure 30A:
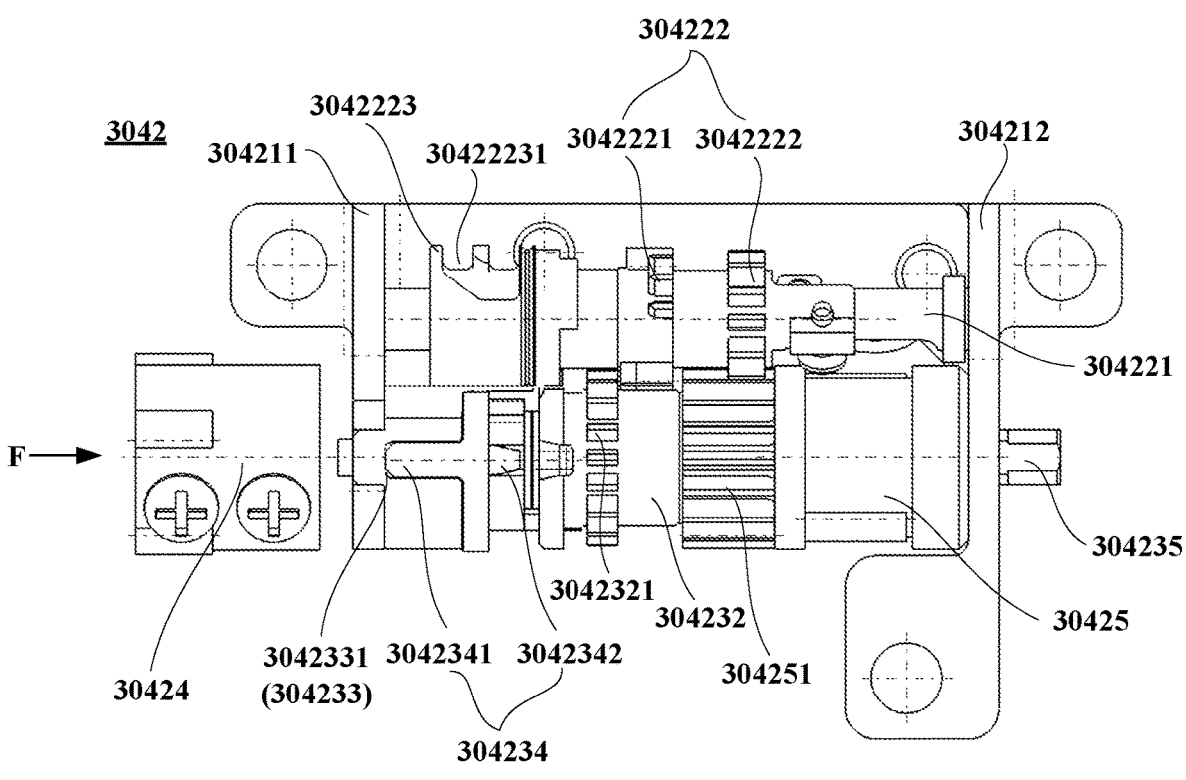
Figure 30B:
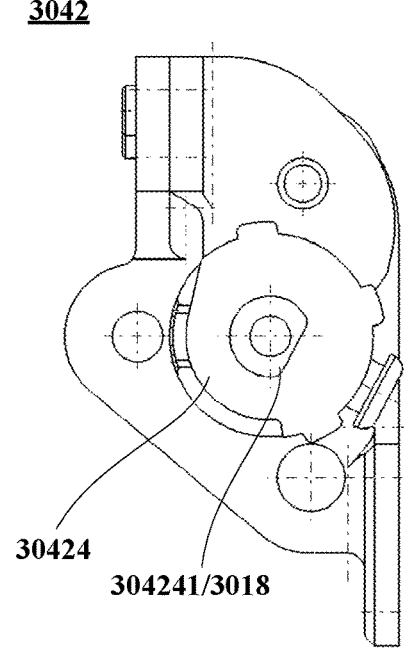
Figure 31:
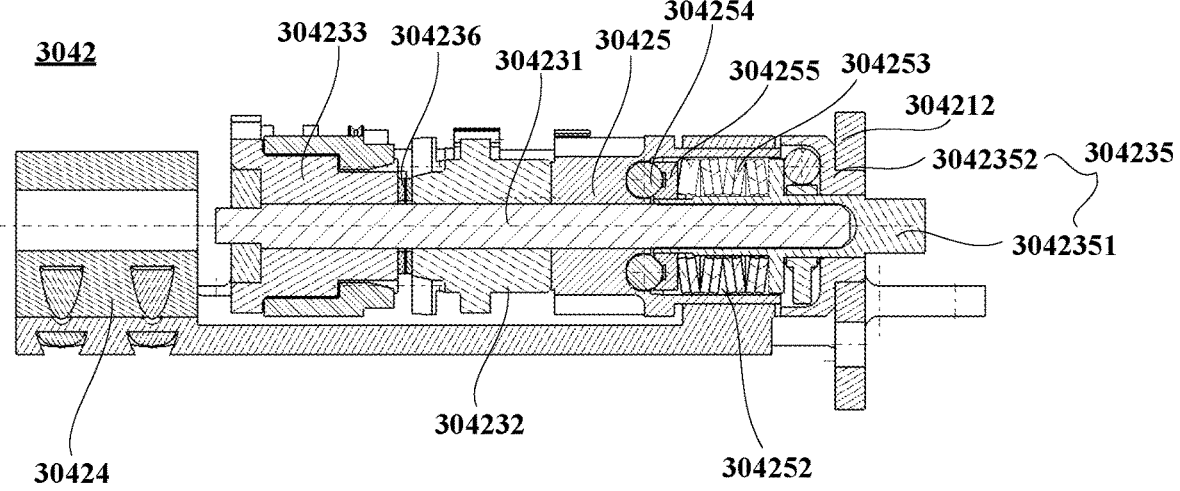
Figure 32A:
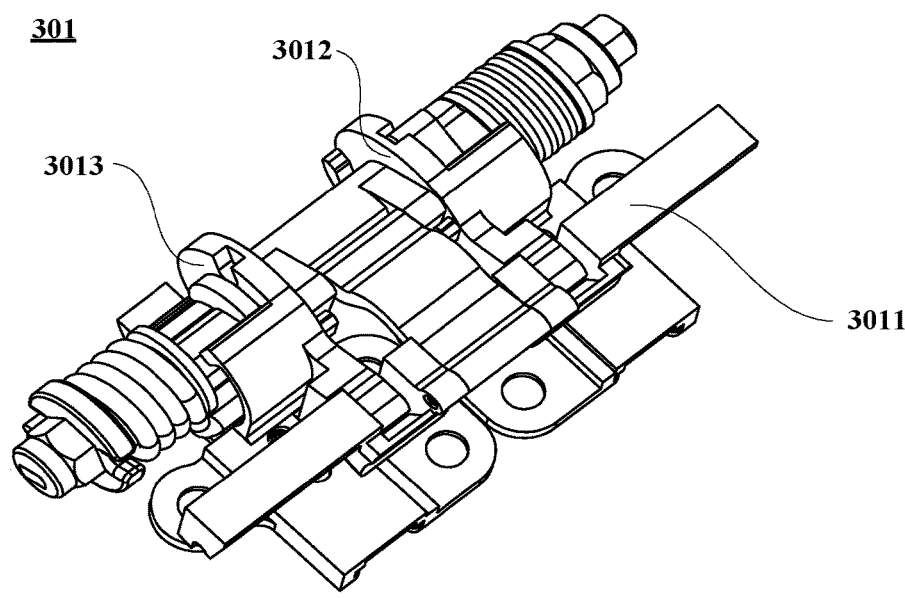
Figure 32B:
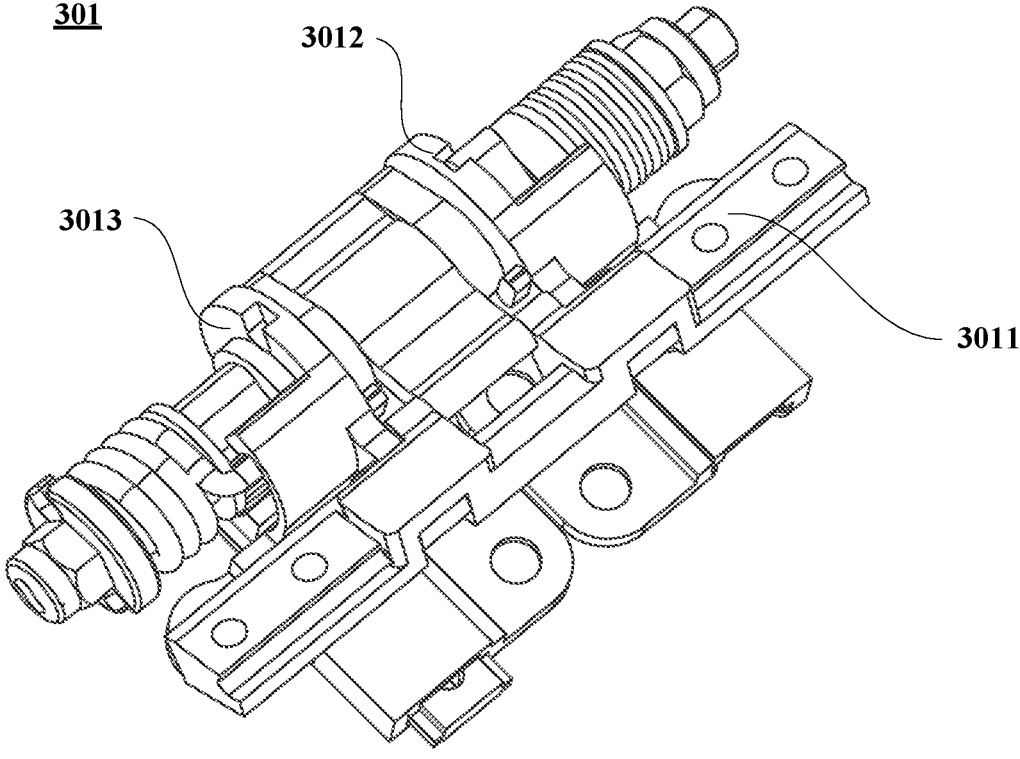
Figure 33:
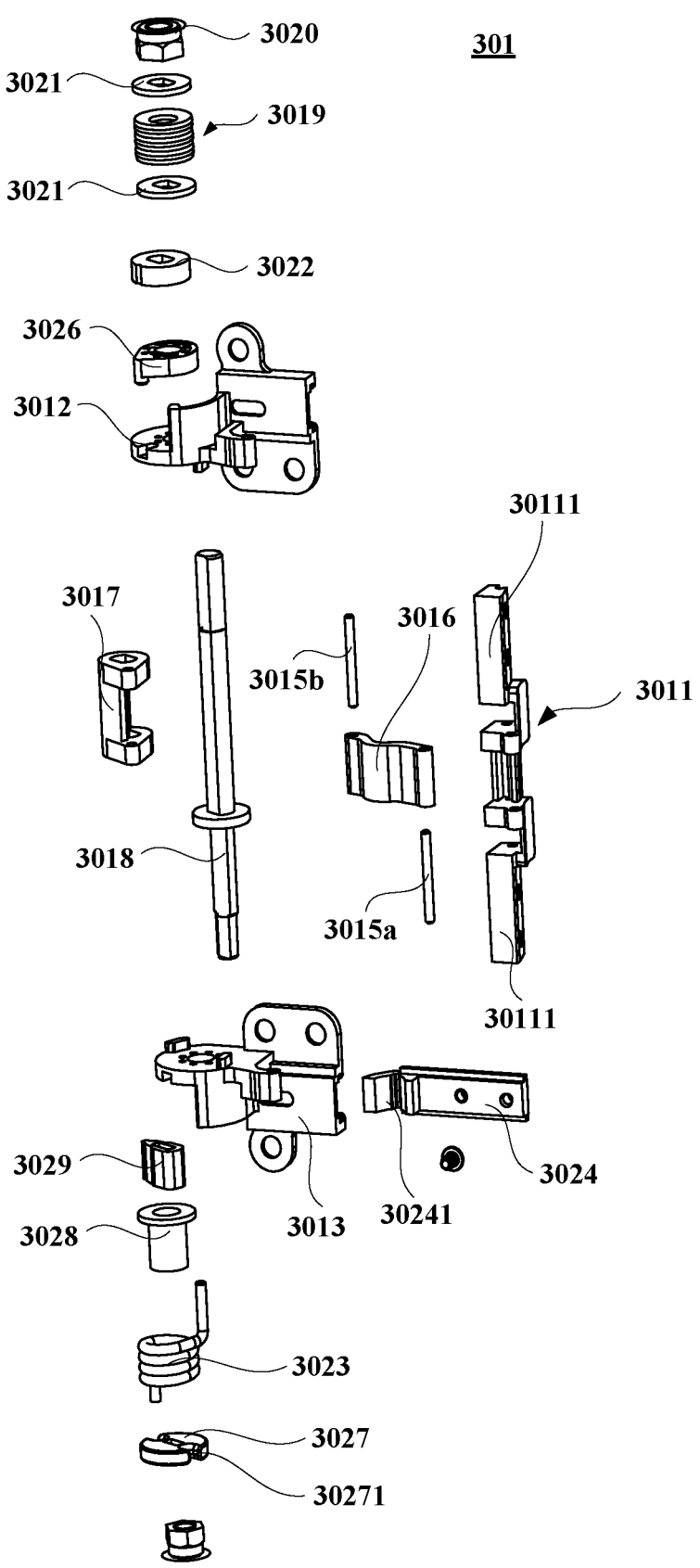
Figure 34:
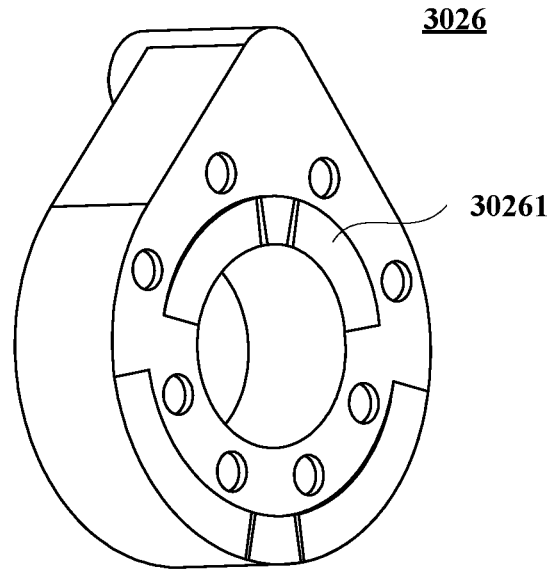
Figure 35:
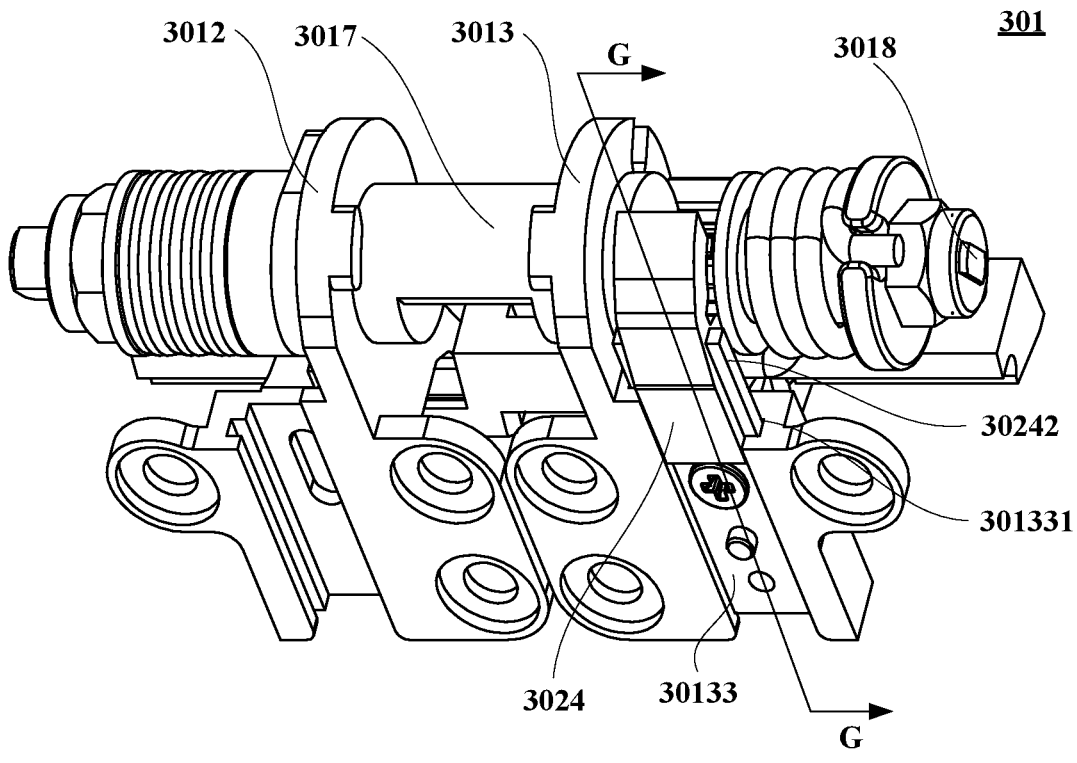

FIG. 14 is a schematic partial view of a structure of a keyboard body according to an embodiment of this application;

FIG. 15 is a schematic diagram of a structure of the keyboard body shown in FIG. 14 from another angle;

FIG. 16 is an enlarged view of a partial structure of the keyboard body shown in FIG. 15;

FIG. 17 is a locally enlarged view of a structure of a C part in FIG. 16;

FIG. 18 shows a relative position relationship between a first connecting rod and a second connecting rod when a keyboard assembly is in a closed state;

FIG. 19 is an enlarged diagram of a partial structure of a horizontal rod according to an embodiment of this application;

FIG. 20 is a schematic diagram of a structure of installing a horizontal rod on a keyboard body according to an embodiment of this application;

FIG. 21 is a schematic diagram of a structure of an up and down mechanism according to an embodiment of this application;

FIG. 22 shows a cooperation relationship between a horizontal rod and a key when a keyboard assembly is in an opened state according to an embodiment of this application;

FIG. 23 shows a cooperation relationship between a horizontal rod and a key when a keyboard assembly is in a closed state according to an embodiment of this application;

FIG. 24 is a schematic diagram of a structure of a rotating shaft mechanism according to an embodiment of this application;

FIG. 25a is a schematic partial view of a structure of a keyboard assembly in a closed state according to an embodiment of this application;

FIG. 25b is a schematic diagram of a structure of a fourth support board of a support portion in FIG. 25a when a keyboard assembly is in an opened state;

FIG. 26 is a schematic diagram of a structure of a rotating shaft mechanism according to an embodiment of this application;

FIG. 27 is a schematic diagram of a structure of a protection mechanism according to an embodiment of this application;

FIG. 28 is an exploded view of the protection mechanism shown in FIG. 27;

FIG. 29a is a D-direction view of the protection mechanism shown in FIG. 27;

FIG. 29b is an E-direction view of the protection mechanism shown in FIG. 29a;

FIG. 30a is a schematic diagram of a structure of a protection mechanism when a keyboard assembly is in an opened state according to an embodiment of this application;

FIG. 30b is an F-direction view of the protection mechanism shown in FIG. 30a;

FIG. 31 is a sectional view of a protection mechanism according to an embodiment of this application;

FIG. 32a and FIG. 32b are schematic diagrams of a structure of a rotating assembly according to another embodiment of this application;

FIG. 33 is an exploded view of the rotating assembly shown in FIG. 32a;

FIG. 34 is a schematic diagram of a structure of a second extrusion structure according to an embodiment of this application;

FIG. 35 is a schematic diagram of a structure of the rotating assembly shown in FIG. 32a from another angle;

16

Figure 36A:
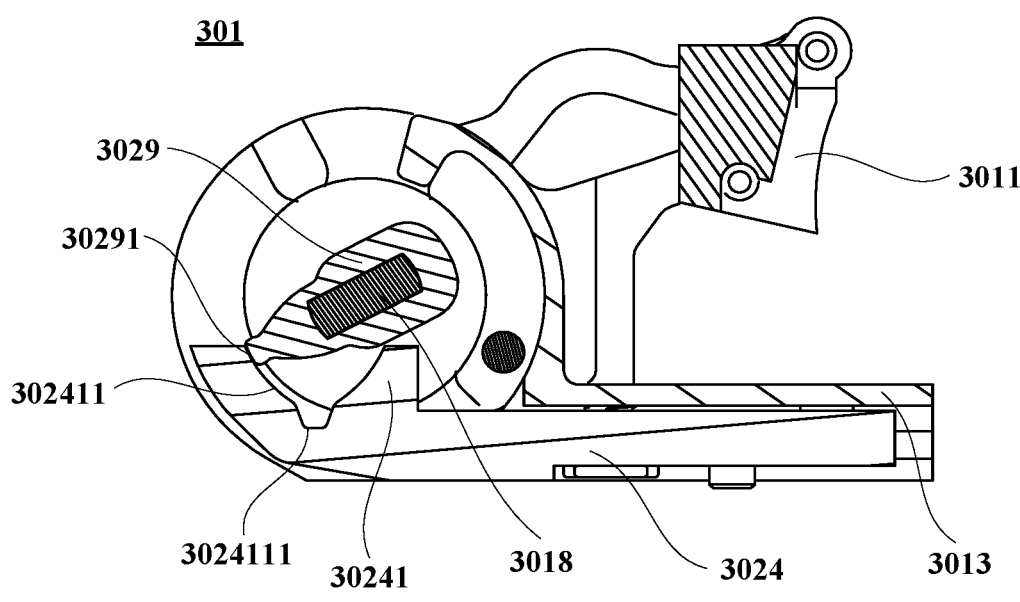
Figure 36B:
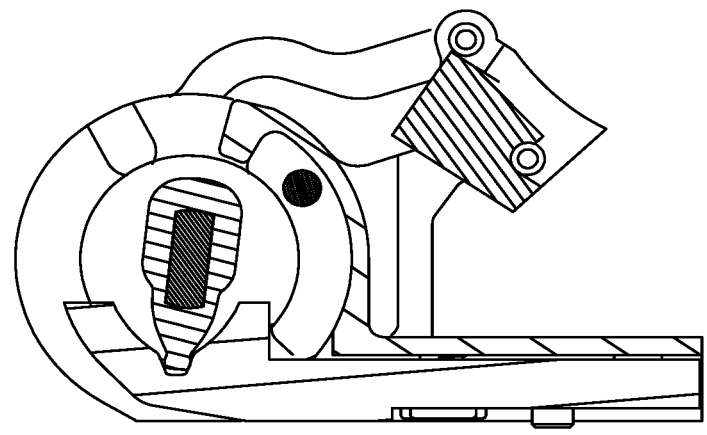
Figure 36C:
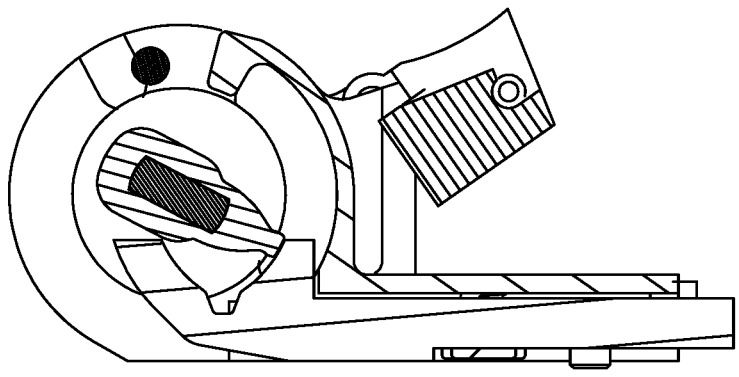

FIG. 36a is a sectional view along G-G of the rotating assembly shown in FIG. 35; and FIG. 36b and FIG. 36c are sectional views of a rotating assembly in different folding statuses according to another embodiment of this application.

REFERENCE NUMERALS

1: host;

2: keyboard assembly; 201: keyboard body; 2011: receptacle; 2012: key; 20121: key cap; 20122: up and down mechanism;

201221: second abutting structure; 2012211: second inclined face; 2013: keyboard cover; 2014: rotating shaft connecting piece;

2015: frame assembly; 20151: first frame; 201511: first inner frame; 201512: first outer frame;

20152: second frame; 201521: second inner frame; 201522: second outer frame; 20153: horizontal rod;

201531: first abutting structure; 2015311: first inclined face; 2016: first connecting rod assembly;

20161: first connecting rod; 201611: first end of the first connecting rod; 201612: second end of the first connecting rod;

20162: second connecting rod; 201621: first end of the second connecting rod; 201622: second end of the second connecting rod;

2017: second connecting rod assembly; 2018: key slot; 202: support portion; 2021: first support board;

2021a: first edge of the first support board; 2021b: second edge of the first support board; 2022: second support board;

2022a: first edge of the second support board; 2022b: second edge of the second support board; 2023: third support board;

2023a: first edge of the third support board; 2023b: second side of the third support board; 20231: arc-shaped board segment;

20232: straight board segment; 20241: auxiliary support mechanism; 202411: first support rod; 202412: second support rod;

20242: slide; 20243: slide; 20244: first sliding block; 20245: second sliding block;

3: rotating shaft mechanism; 301: rotating assembly; 3011: connecting piece; 30111: body portion; 30112: first installation portion;

30113: second installation portion; 30114: third installation portion; 301141: connecting arm; 3012: first fastening piece;

30121: first open slot; 3013: second fastening piece; 30131: second open slot; 30132: second sliding slot; 30133: slide;

301331: first limiting portion; 3014: middle connection rod; 3015a: first rotating shaft; 3015b: second rotating shaft;

3015c: second rotating shaft; 3015d: fourth rotating shaft; 3016: first connection rod; 3017: second connection rod; 30171: third open slot;

30172: hollow region; 3018: main shaft; 30181: stop portion; 301811: track slot; 3019: elastic piece;

3020: limiting piece; 3021: gasket; 3022: first extrusion structure; 30221: first slot; 3023: elastic piece;

3024: third connection rod; 30241: connecting portion; 302411: track slot; 3024111: recessed portion; 30242: second limiting portion;

3025: fourth connection rod; 3026: second extrusion structure; 30261: first protrusion; 3027: rotation fastening piece;

30271: locking slot; 3028: sleeve; 3029: swing rod structure; 30291: protruding portion; 303: cam; 3031: cam sliding slot;

304: automatic opening and closing apparatus; 3041: motor; 3042: protection mechanism; 30421: fastening frame; 304211: first fastening plate;

304212: second fastening plate; 30422: first rotating shaft assembly; 304221: first shaft; 304222: first gear piece;

3042221: first gear structure; 3042222: second gear structure; 3042223: guide slot structure;

30422231: guide slot; 304223: assisting mechanism; 30423: second rotating shaft assembly; 304231: second shaft;

304232: second gear piece; 3042321: third gear structure; 3042322: first stopper; 30423221: notch; 304233: fast pin; 3042331: open slot;

3042332: guide structure; 304234: sliding pin; 3042341: pin shaft; 3042342: second stopper;

304235: motor connecting piece; 304236: gasket; 30424: conversion bracket; 304241: mounting hole;

30425: conversion bracket; 304251: fourth gear structure; 304252: accommodating cavity; 304253: elastic piece;

304254: rolling piece; 304255: press block;

4: host support kit.

DESCRIPTION OF EMBODIMENTS

To make the objectives, technical solutions, and advantages of this application clearer, the following further describes this application in detail with reference to the accompanying drawings.

Figure 1:
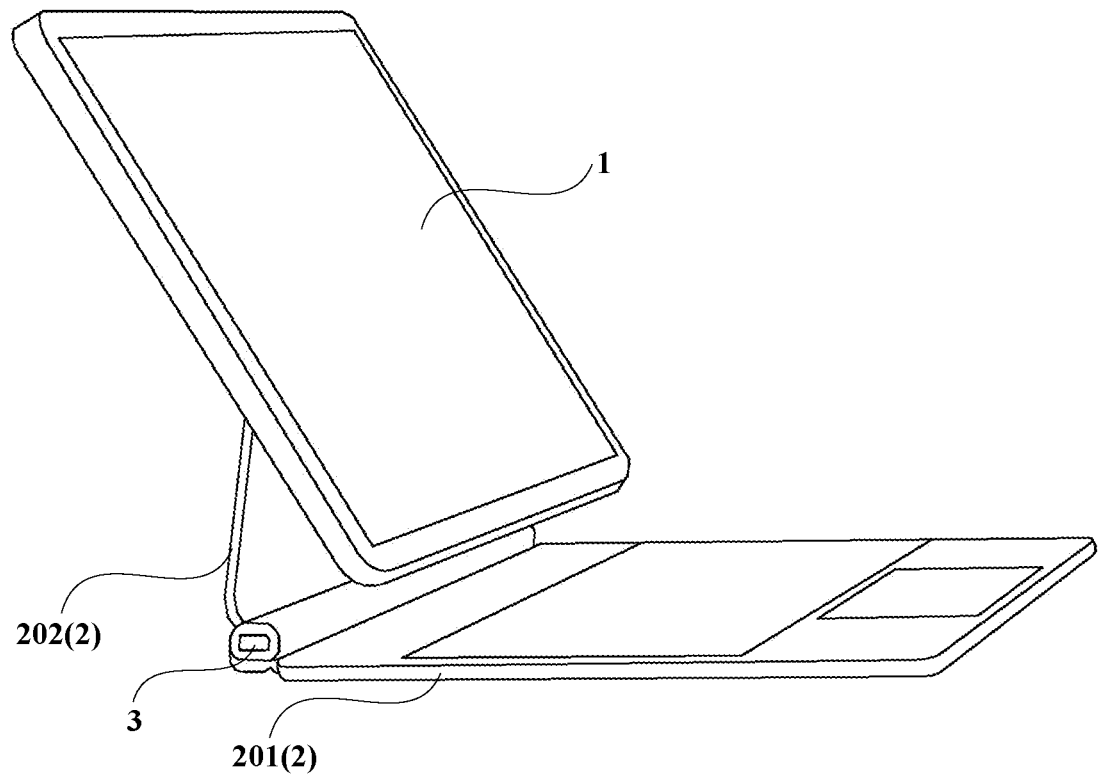
FIG. 1 is a schematic diagram of a structure of a conventional two-in-one product according to an embodiment of this application.

An embodiment of this application provides a keyboard assembly. To facilitate understanding of the keyboard assembly provided in this embodiment of this application, the following first describes an application scenario of the keyboard assembly. The keyboard assembly may be used in an electronic device, for example, a foldable electronic device. For example, the foldable electronic device may be but is not limited to a two-in-one product. The two-in-one product usually includes a host 1 and a keyboard assembly 2. FIG. 1 shows a conventional two-in-one product according to an embodiment of this application. In this embodiment, the host 1 is detachably connected to the keyboard assembly 2. After being detached from the keyboard assembly 2, the host 1 can still be used as an independent electronic device. For example, the host 1 may be a tablet computer. In addition to a keyboard body 201 that can implement a keyboard function, the keyboard assembly 2 further includes a support portion 202 as a support structure, to support the host 1 and facilitate use by the user. For example, the keyboard assembly 2 may be a keyboard accessory used with the tablet computer. The keyboard assembly 2 can support the tablet computer, and can also be used as a keyboard.

It may be understood that, after the host 1 is installed on the keyboard assembly 2, the keyboard body 201 and the support portion 202 of the keyboard assembly 2 rotate relative to each other, to open or close the two-in-one product. Relative rotation between the keyboard body 201 and the support portion 202 may be implemented by disposing a rotating shaft mechanism 3. It can be learned from FIG. 1 that the keyboard body 201 and the support portion 202 may be respectively located on two sides of the rotating shaft mechanism 3, and may be rotatively connected to the rotating shaft mechanism 3.

Currently, to reduce operation steps such as opening, powering on, and logging in in a process in which a user starts a foldable electronic device similar to the two-in-one product, a concept of automatic opening and closing is proposed in this field. Because the keyboard body 201 and the support portion 202 of the keyboard assembly 2 may implement relative rotation through the rotating shaft mechanism 3, an automatic opening and closing apparatus for implementing an automatic opening and closing function may be disposed on the rotating shaft mechanism 3. The automatic opening and closing apparatus usually includes a motor, to drive rotation of the rotating shaft mechanism 3 by using the motor, thereby implementing relative rotation of the keyboard body 201 and the support portion 202.

However, to adapt to a current development trend of a lighter and thinner electronic device, installation space reserved for the rotating shaft mechanism 3 in the keyboard assembly 2 is increasingly limited. On this basis, if the automatic opening and closing apparatus is disposed on the rotating shaft mechanism 3, a size of a structure such as a motor in the automatic opening and closing apparatus is required to be relatively small. However, if a size of the motor is excessively small, torque provided by the motor for rotation of the rotating shaft mechanism 3 is limited.

It can be learned from the foregoing description that, in the two-in-one product, the host 1 and the keyboard assembly 2 are in a structure form of a detachable connection, and a weight of the host 1 is generally greater than a weight of the keyboard assembly 2. Therefore, when the two-in-one product is opened to a specific angle, support force of the keyboard assembly 2 for the host 1 is insufficient. The two-in-one product shakes in a movement process of the two-in-one product. In this case, the rotating shaft mechanism 3 may be even damaged.

In addition, because the user has a personalized requirement for a use angle of the two-in-one product, if a process in which the two-in-one product is driven to be opened or closed by using the motor is manually intervened, the motor or another mechanical part in the automatic opening and closing apparatus may be damaged when the torque provided by the motor is insufficient.

The rotating shaft mechanism provided in this application is intended to resolve the foregoing problem. A protection mechanism is disposed in the automatic opening and closing apparatus of the rotating shaft mechanism, to protect the automatic opening and closing apparatus in a scenario such as manual intervention, thereby implementing a safe and reliable automatic opening and closing function of the keyboard assembly. In this way, a service life of the keyboard assembly is prolonged. In addition, the rotating assembly is disposed in the rotating shaft mechanism, to implement hovering at any angle and stepless adjustment of opening and closing angles of the keyboard assembly. To facilitate understanding of the rotating shaft mechanism provided in this application, and the keyboard assembly and the electronic device to which the rotating shaft mechanism is used, the following describes the rotating shaft mechanism, the keyboard assembly, and the electronic device in detail with reference to specific embodiments.

It should be noted that terms used in the following embodiments are merely intended to describe specific embodiments, but are not intended to limit this application. The terms "one", "a", "the", "the foregoing", "this", and "the one" of singular forms used in this specification and the appended claims of this application are also intended to include expressions such as "one or more", unless otherwise specified in the context clearly.

Reference to "an embodiment", "some embodiments", or the like described in this specification indicates that one or more embodiments of this application include a specific feature, structure, or characteristic described with reference to the embodiments. Therefore, in this specification, statements such as "in an embodiment", "in some embodiments", "in other embodiments", and "in some other embodiments" that appear at different places in this specification do not necessarily mean reference to a same embodiment, instead, they mean "one or more but not all of the embodiments", unless otherwise specifically emphasized. The terms "include", "comprise", "have", and their variants all mean "include but is not limited to", unless otherwise specifically emphasized.

Figure 2:
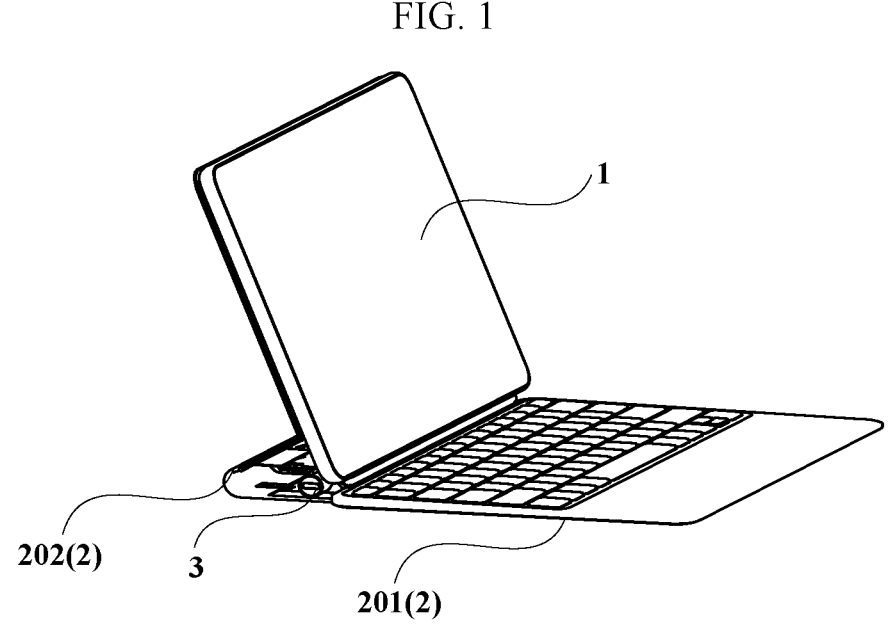
FIG. 2 is a schematic diagram of a structure of an electronic device according to an embodiment of this application.

FIG. 2 is a schematic diagram of an application scenario of a rotating shaft mechanism according to an embodiment of this application. FIG. 2 shows a foldable electronic device. The electronic device includes a host 1 and a keyboard assembly 2. The host 1 is detachably connected to the keyboard assembly 2. In this application, the host 1 is a product having a complete structure and complete functions. After being detached from the keyboard assembly 2, the host 1 can still be used as an independent electronic device. The host 1 in this application may include but is not limited to a display, a battery module, a computing storage module, and the like. In addition, the host 1 may also be provided with a contact or a connector interface matching an external device, for example, a pogo pin (pogo pin), USB, a Type-A connection interface, or a Type-C connection interface, to implement a wired connection between the host 1 and the external device. Alternatively, the host 1 may have functional modules such as Bluetooth and Wi-Fi, to implement a wireless connection between the host 1 and the external device. In this application, a type of the host 1 is not specifically limited. The host 1 may be but is not limited to a tablet computer, a palmtop computer (personal digital assistant, PDA), or the like.

Figure 3A:
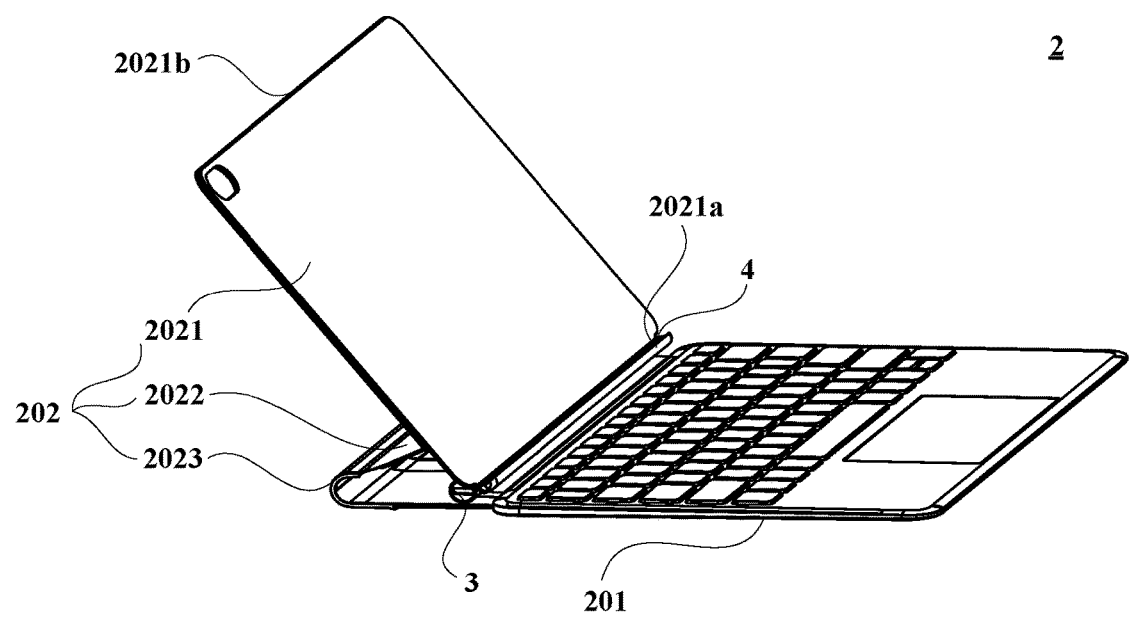
FIG. 3a is a schematic diagram of a structure of a keyboard assembly according to an embodiment of this application.

FIG. 3a is a schematic diagram of a structure of a keyboard assembly 2 according to an embodiment of this application. In this embodiment, the keyboard assembly 2 is in an opened state (that is, a support portion 202 is away from a keyboard body 201, and the keyboard body 201 is in a state of being exposed to a user). The keyboard assembly 2 includes the keyboard body 201 and the support portion 202. The keyboard body 201 may provide a keyboard input function for the host 1. In addition, a control circuit, a battery, some sensors (such as an infrared sensor, an ultrasonic sensor, and a fingerprint sensor), or the like may be further disposed in the keyboard body 201. The control circuit may be disposed to provide a circuit control function for the keyboard body 201, and the sensor may be disposed to provide a function such as signal triggering. In addition, the battery in the keyboard body 201 may be configured to maintain a normal working state of the keyboard body 201 when there is no external power supply.

It can be learned from the foregoing embodiment that, relative rotation between the keyboard body 201 and the support portion 202 may be implemented by using a rotating shaft mechanism 3. Further with reference to FIG. 3a, in this embodiment, the keyboard assembly 2 further includes the rotating shaft mechanism 3, and the keyboard body 201 may be connected to the rotating shaft mechanism 3.

In this application, the support portion 202 of the keyboard assembly 2 includes a first support board 2021, a second support board 2022, and a third support board 2023. The first support board 2021, the second support board 2022, and the third support board 2023 are disposed around the rotating shaft mechanism 3. The first support board 2021 may support the host 1 shown in FIG. 2. To fasten the host 1 installed on the keyboard assembly 2 and the first support board 2021, in a possible embodiment of this application, a first magnetic element (not shown in FIG. 3a) may be disposed in the first support board 2021, and a second magnetic element may be disposed in a corresponding position of the host 1. The first magnetic element and the second magnetic element may adsorb each other. In this application, the first magnetic element may be an element with a magnetic property, or may be an element without a magnetic property but can be absorbed by an element with a magnetic property. Similarly, the second magnetic element may be an element with a magnetic property, or may be an element without a magnetic property but can be absorbed by an element with a magnetic property. The first magnetic element and the second magnetic element can be mutually absorbed and fastened.

Still with reference to FIG. 3a, the first support board 2021 has a first edge 2021a and a second edge 2021b that are disposed opposite to each other. The first edge 2021a of the first support board 2021 is disposed toward the rotating shaft mechanism. The first edge 2021a may be fixedly connected to a host support kit 4. The first support board 2021 may rotate around the rotating shaft mechanism. With reference to both FIG. 2 and FIG. 3a, the host support kit 4 may be configured to support the host 1. In addition, an arc face may be disposed on the host support kit 4. After the host 1 is installed on the host support kit 4, a frame of the host 1 may be clamped to the arc face, to implement attachment and fastening between the host support kit 4 and the frame of the host 1. This helps implement fastening between the host 1 and the first support board 2021, to reduce a risk that the host 1 falls off the first support board 2021. It may be understood that, in this application, a connector interface, a contact, or the like may be further disposed on the host support kit 4, and the connector interface or the contact may be led to the control circuit in the keyboard body 201 through a lead. In this way, when the host 1 is installed on the keyboard assembly 2, a contact or a connector interface of the host 1 may be connected to the corresponding contact or connector interface on the host support kit 4, to implement an electrical connection between the host 1 and the keyboard assembly 2, so that the host 1 can be operated and controlled by using the keyboard body 201. It should be noted that, in this application, the lead for connecting the host support kit 4 and the control circuit of the keyboard body 201 may be hidden in the rotating shaft mechanism 3, so that the lead is protected.

Figure 3B:
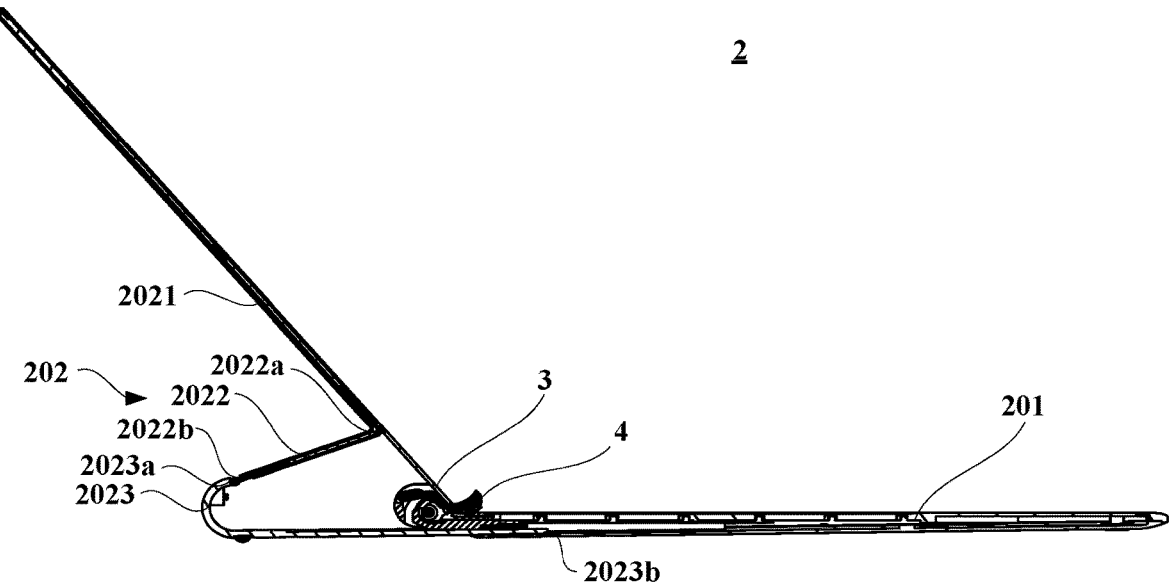
FIG. 3b is a sectional view of a keyboard assembly according to an embodiment of this application.

FIG. 3b is a sectional view of a keyboard assembly according to an embodiment of this application. In this application, the second support board is located between the first support board 2021 and the third support board 2023. The second support board 2022 may include a first edge 2022a and a second edge 2022b that are disposed opposite to each other. The first edge 2022a of the second support board 2022 is hinged to a surface that is of the first support board 2021 and that is away from the keyboard body 201. In this case, the second support board 2022 can rotate relative to the first support board 2021. In addition, the third support board 2023 includes a first edge 2023a and a second edge 2023b that are disposed opposite to each other. The second edge 2022b of the second support board 2022 is hinged to the first edge 2023a of the third support board 2023.

Still with reference to FIG. 3*b*, in the embodiment shown in FIG. 3*b*, the keyboard assembly 2 is in an opened state, and parts that are of the first support board 2021, the second support board 2022, and the third support board 2023 and that are disposed around the rotating shaft mechanism 3 form a triangular support structure. In this way, in a process of opening and closing the keyboard assembly 2 (that is, the support portion 202 approaches the keyboard body 201, and the keyboard body 201 is covered by a part of the support portion 202), the triangular support structure can implement stable support for the host 1 shown in FIG. 2, and can further implement a relative rotation process between the support portion 202 of the keyboard assembly 2 and the keyboard body 201. Therefore, a structure of the keyboard assembly 2 is relatively reliable.

Figure 4A:
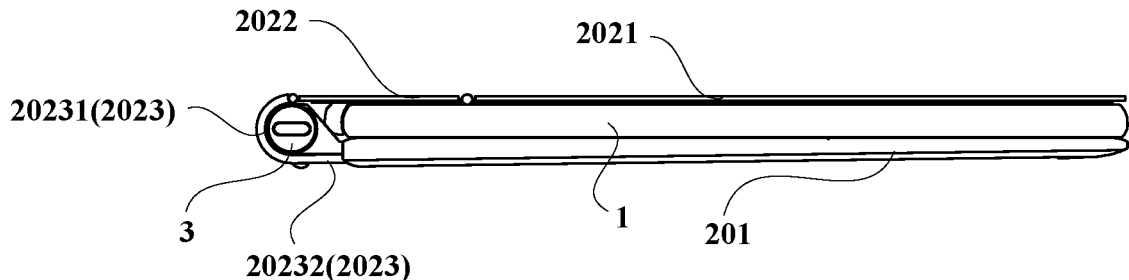
FIG. 4a to FIG. 4e are schematic diagrams of a structure of the electronic device provided in FIG. 2 in different folding statuses.
Figure 4B:
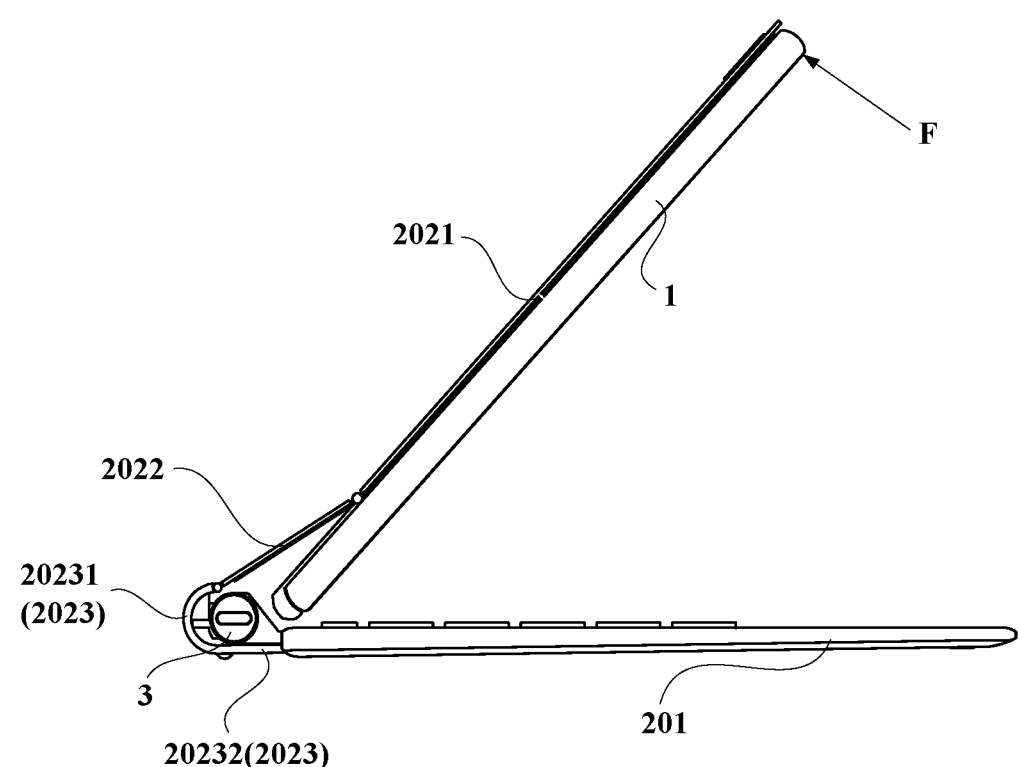
Figure 4C:
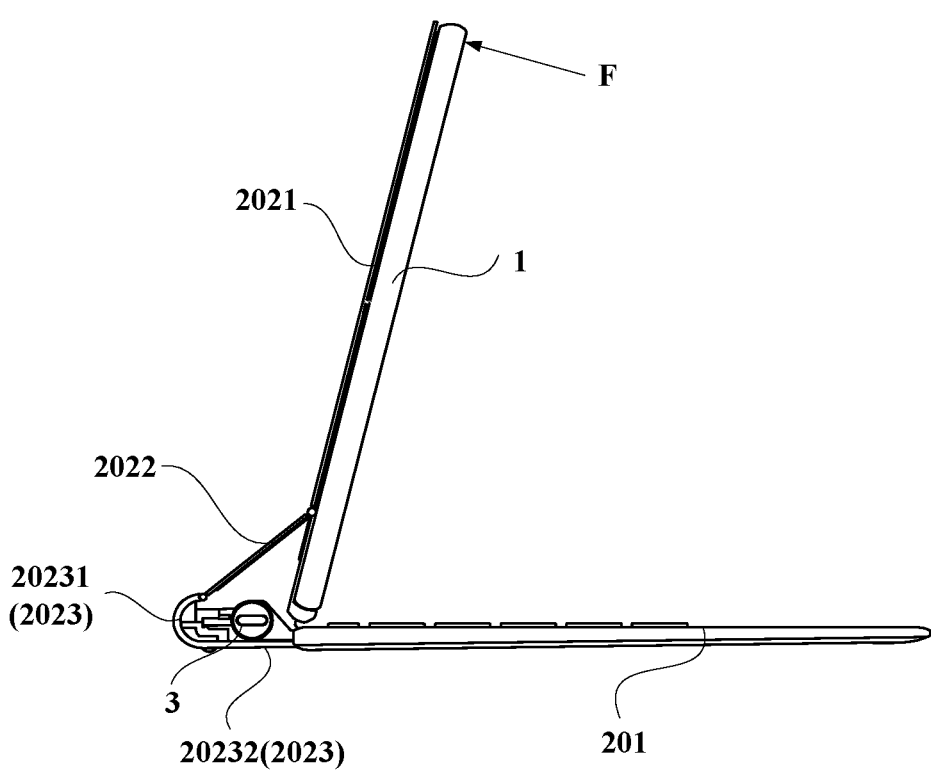
Figure 4D:
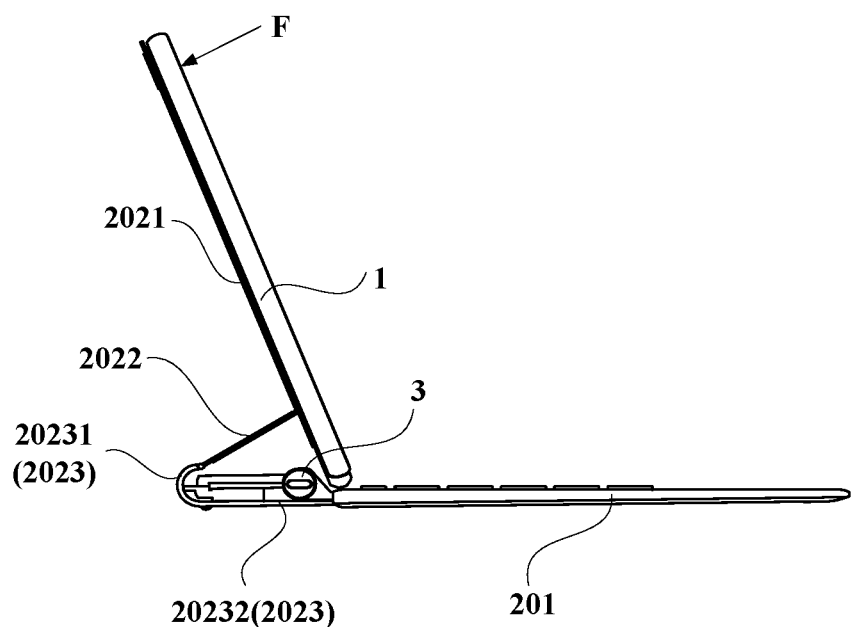
Figure 4E:
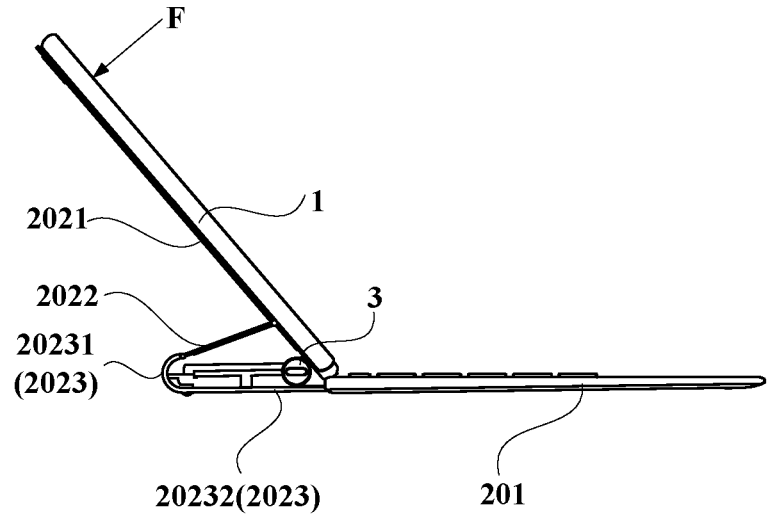

FIG. 4*a* is a schematic diagram of a structure of the electronic device provided in FIG. 2 in a closed state according to this application. It can be learned from FIG. 4*a* that, when the electronic device is in the closed state, the host 1 is attached to the keyboard body 201, and at least a part of the second support board 2022 and the first support board 2021 cover the host 1 to protect the host 1. In addition, in this application, the third support board 2023 includes an arc-shaped board segment 20231 and a straight board segment 20232. A radian of the arc-shaped board segment 20231 may be designed based on a contour of the rotating shaft mechanism 3. In this way, when the electronic device is in the closed state, the arc-shaped board segment 20231 can cover the rotating shaft mechanism 3, to protect the rotating shaft mechanism 3. In addition, appearance aesthetics of the keyboard assembly 2 can be improved.

By using the electronic device provided in this application, when the electronic device needs to be opened from the closed state, force F away from the keyboard body 201 may be applied on the host 1 and the first support board 2021. FIG. 4*b* to FIG. 4*e* are schematic diagrams of a structure of an electronic device opened at different angles. It can be learned from FIG. 4*b* to FIG. 4*e* that, in a process of opening the electronic device, the first support board 2021 may drive the second support board 2022 to rotate in a direction away from the keyboard body 201, and the second support board 2022 may rotate to drive the third support board 2023 to move in a direction away from the keyboard body 201, so that the third support board 2023 is detached from the rotating shaft mechanism 3.

In addition, still with reference to FIG. 4*a* to FIG. 4*e*, in the process of opening the electronic device, the parts that are of the first support board 2021, the second support board 2022, and the third support board 2023 and that are disposed around the rotating shaft mechanism 3 form the triangular support structure. The triangular support structure can effectively improve movement stability of the electronic device. It may be understood that, in a process in which the electronic device is changed from the opened state to the closed state, the first support board 2021, the second support board 2022, and the third support board 2023 all move toward the keyboard body 201. In this process, the triangular support structure may also provide stable support for movement of the electronic device.

Figure 5:
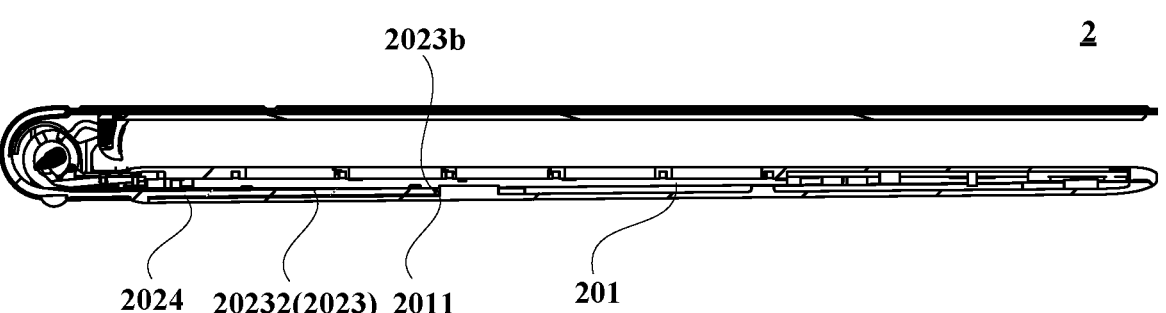
FIG. 5 is a schematic sectional view of a structure of a keyboard assembly in a closed state according to an embodiment of this application.

FIG. 5 is a schematic sectional view of a structure of a keyboard assembly in a closed state according to this application. It can be learned from the description of the foregoing embodiment that, in a process in which the keyboard assembly moves from the opened state to the closed state, the third support board 2023 moves in a direction toward the keyboard body 201. In this application, a receptacle 2011 may be disposed in the keyboard body 201, and an opening of the receptacle 2011 is provided toward the third support board 2023. In this way, when the keyboard assembly 2 is in the closed state shown in FIG. 5, at least a part of the straight board segment 20232 of the third support board 2023 can be accommodated in the receptacle 2011, to improve an integration degree of an appearance of the keyboard assembly 2. In addition, in some embodiments of this application, the second edge 2023*b* of the third support board 2023 shown in FIG. 3*b* may be alternatively always located in the receptacle 2011, and the third support board 2023 can slide in the receptacle 2011, so that the receptacle 2011 can guide sliding of the third support board 2023. To improve movement stability of the third support board 2023, in some other embodiments of this application, a slide (not shown in FIG. 5) may be disposed on a side wall of the receptacle 2011; and a sliding block structure (not shown in FIG. 5) is disposed on the third support board 2023, and the sliding block structure can move along the slide, to reduce shaking of the third support board 2023 in a movement process, thereby improving movement stability of the entire keyboard assembly 2.

It can be learned from the description of the foregoing embodiment that, the rotating shaft mechanism 3 plays an important role in a movement process of the keyboard assembly 2 from the opened state to the closed state and from the closed state to the opened state. To understand an implementation of movement of the keyboard assembly 2 provided in this application, the following describes in detail a specific manner of disposing the rotating shaft mechanism 3 with reference to the accompanying drawings.

It may be understood that, in order that the keyboard body 201 and the support portion 202 of the keyboard assembly 2 can be kept at any folding angle to meet a personalized use requirement of the user, a rotating assembly may be usually disposed in the rotating shaft mechanism 3. Therefore, in a folding mode switching process of the keyboard assembly 2, the rotating assembly can provide reliable damping force for the entire keyboard assembly 2, thereby implementing stable support for the host 1. In this application, a folding angle between the keyboard body 201 and the support portion 202 is an included angle between a surface that is of the keyboard body 201 and that faces the support portion 202 and a surface that is of the support portion 202 and that faces the keyboard body 201, in a process in which the keyboard assembly 2 is changed from the opened state to the closed state and from the closed state to the opened state.

Figure 6A:
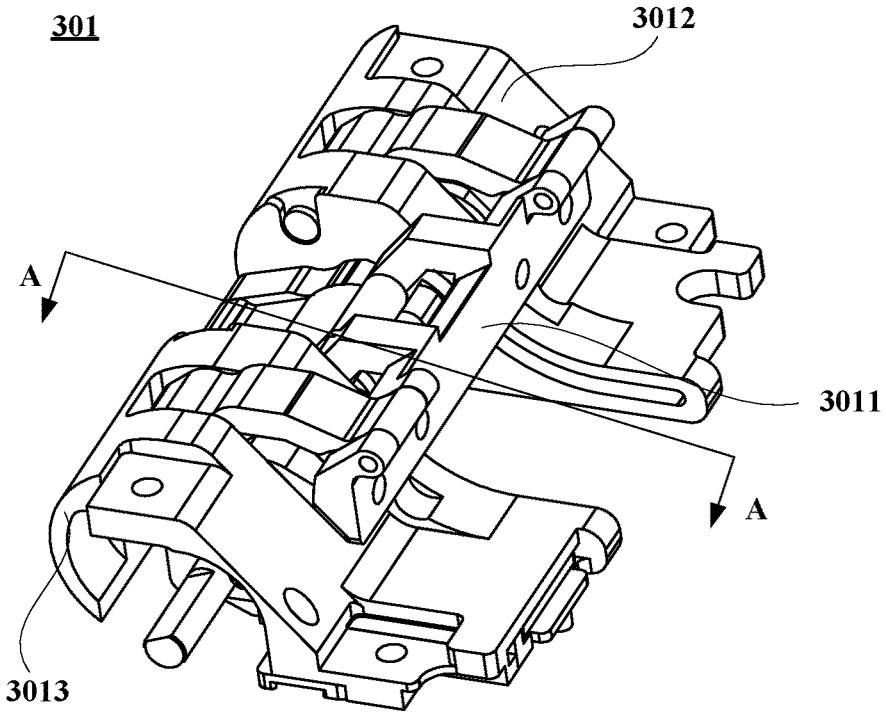
FIG. 6a and FIG. 6b are schematic diagrams of a structure of a rotating assembly according to an embodiment of this application.

FIG. 6*a* is a schematic diagram of a structure of a rotating assembly according to an embodiment of this application. FIG. 6*a* is a schematic diagram of a structure of a rotating assembly 301 when the keyboard assembly 2 is in the closed state. In addition, FIG. 6*b* is a schematic diagram of a structure of a rotating assembly 301 when the keyboard assembly 2 is in the opened state.

Figure 6B:
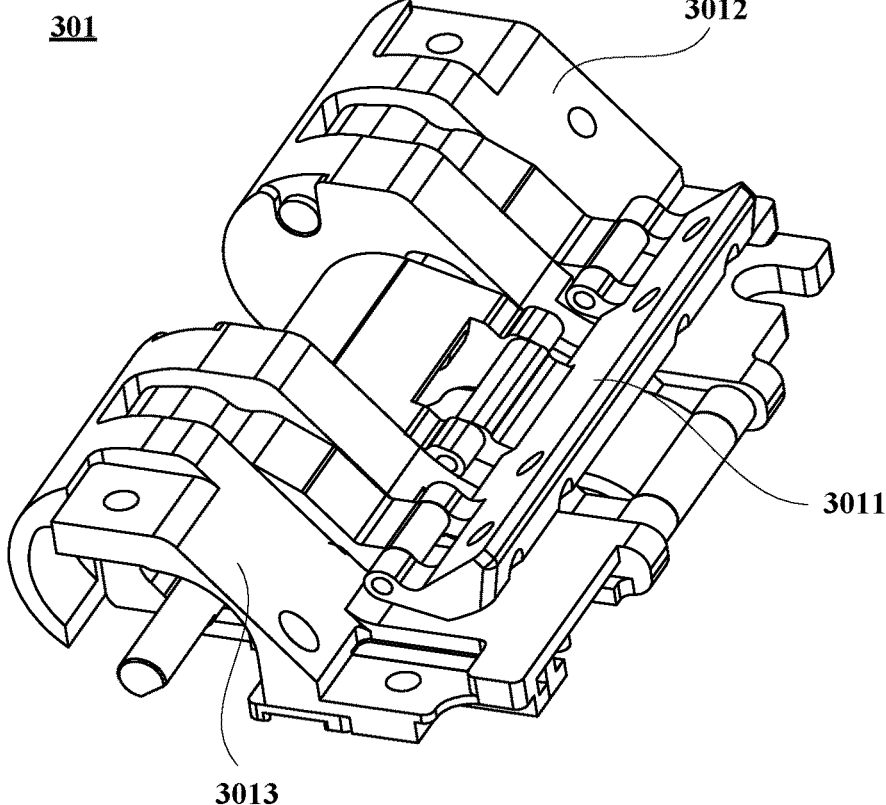

With reference to both FIG. 6*a* and FIG. 6*b*, in this embodiment, the rotating assembly 301 may include a connecting piece 3011, a first fastening piece 3012, and a second fastening piece 3013. The first fastening piece 3012 and the second fastening piece 3013 may be fixedly connected to the keyboard body 201 shown in FIG. 5. A connection manner may be but is not limited to a tight connection by using a fastener such as a screw. In addition, the first fastening piece 3012 and the second fastening piece 3013 may serve as support kits of the entire rotating assembly 301. The first fastening piece 3012 and the second fastening piece 3013 are spaced. Another structure of the rotating assembly 301 may be directly or indirectly connected to the first fastening piece 3012 and the second fastening piece 3013.

Figure 7:
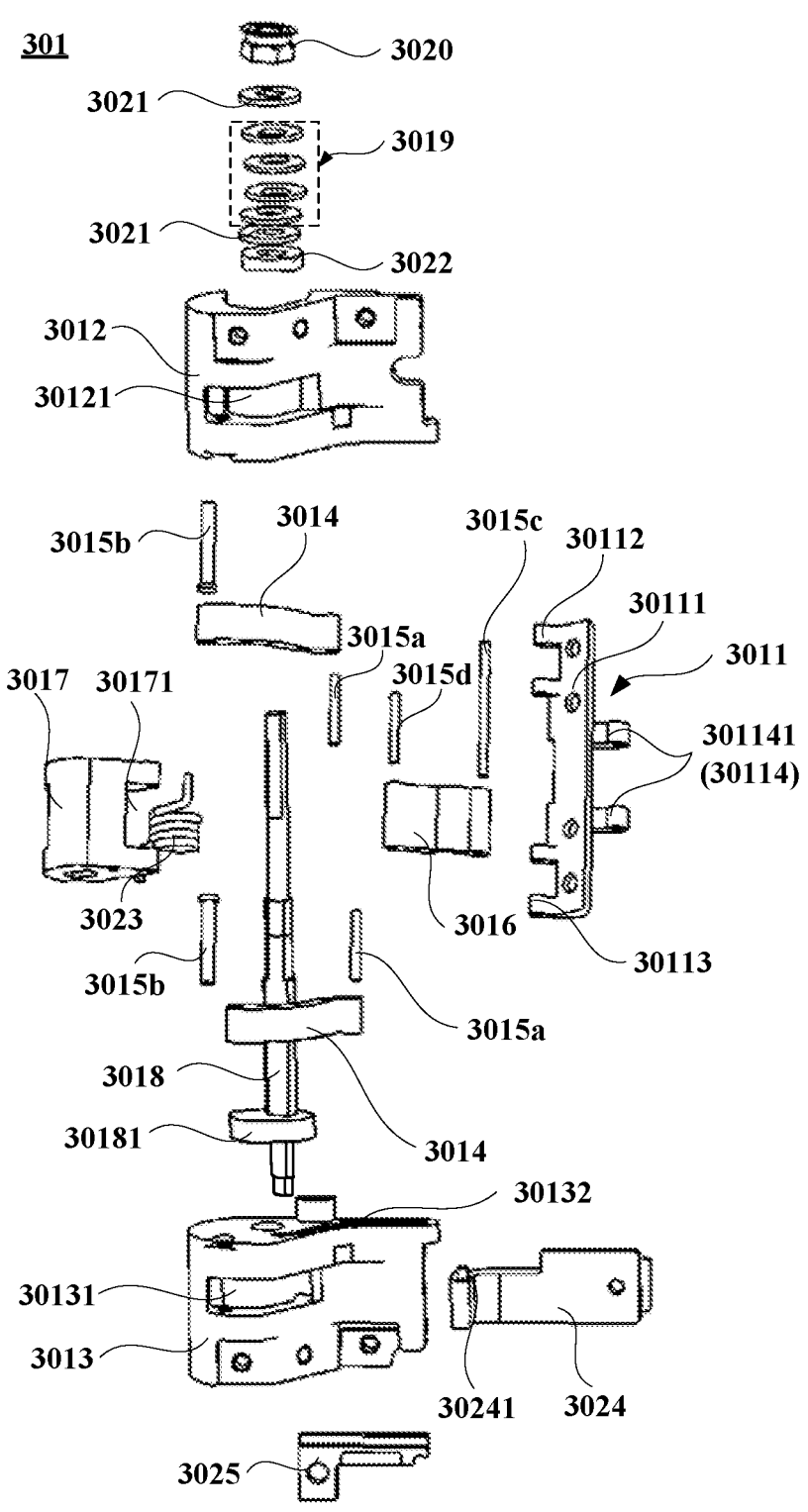
FIG. 7 is an exploded view of a rotating assembly according to an embodiment of this application.

For ease of understanding of a connection relationship between structures of the rotating assembly 301, refer to FIG. 7. FIG. 7 is an exploded view of the rotating assembly 301 shown in FIG. 6*a* and FIG. 6*b*. In this embodiment, the connecting piece 3011 includes a body portion 30111 disposed in a long-strip structure. The body portion 30111 may be fixedly connected to the host support kit 4 shown in FIG. 3*b*. A connection manner may be but is not limited to a tight connection by using a fastener such as a screw. Still with reference to FIG. 7, the body portion 30111 has a first edge. A first installation portion 30112 and a second installation portion 30113 are disposed on the first side. The first installation portion 30112 and the second installation portion 30113 are spaced. In addition, the body portion 30111 has a first face and a second face that are disposed opposite to each other. The first face may be configured to fixedly connect to the host support kit 4. Because the first edge of the first support board 2021 is fixedly connected to the host support kit 4, the first support board 2021 may be fixedly connected to the first face of the body portion 30111 through the host support kit 4. The first installation portion 30112 and the second installation portion 30113 may extend in a direction away from the second face. The first installation portion 30112 may have a first installation slot. The second installation portion 30113 may have a second installation slot. Still with reference to FIG. 7, a third installation portion 30114 may be further disposed on the first edge of the body portion 30111. The third installation portion 30114 is located at the body portion 30111. The body portion 30111 further has a second edge. The first edge and the second edge are disposed opposite to each other. The third installation portion 30114 may include two connecting arms 301141 that are disposed relative to each other. The two connecting arms 301141 extend in a direction from the first edge to the second edge of the body portion 30111.

With reference to all of FIG. 6*a*, FIG. 6*b*, and FIG. 7, in this application, the first fastening piece 3012 and the second fastening piece 3013 are located on a same side of the connecting piece 3011. The rotating assembly 301 may further include a connection rod assembly. The connection rod assembly includes middle connection rods 3014. There are two middle connection rods 3014. A first open slot 30121 is disposed on a surface on a side that is of the first fastening piece 3012 and that faces the connecting piece 3011. A second open slot 30131 is disposed on a surface on a side that is of the second fastening piece 3013 and that faces the connecting piece 3011. The middle connection rod 3014 includes a first end and a second end that are disposed opposite to each other. A first end of one middle connection rod 3014 is installed in the first installation slot of the first installation portion 30112, and a second end of the middle connection rod 3014 is installed in the first open slot 30121 of the first fastening piece 3012. In addition, the first end of the middle connection rod 3014 is rotatively connected to a slot wall of the first installation slot through a first rotating shaft 3015*a*, and the second end of the middle connection rod 3014 is rotatively connected to the first open slot 30121 of the first fastening piece 3012 through a second rotating shaft 3015*b*. To implement the rotative connection between the first end of the middle connection rod 3014 and the slot wall of the first installation slot, the first rotating shaft 3015*a* may be fixedly connected to the first end of the first connection rod, and the first rotating shaft 3015*a* may be rotatively connected to the slot wall of the first installation slot. In a rotative connection manner, mounting holes may be disposed on two opposite slot walls of the first installation slot, and two ends of the middle connection rod 3014 each are inserted into one mounting hole. In some other embodiments of this application, the first rotating shaft 3015*a* may be further fixedly connected to the slot wall of the first installation slot, and the first end of the middle connection rod 3014 may rotate around the first rotating shaft 3015*a*. In addition, in this embodiment, the second end of the middle connection rod 3014 may be rotatively connected to a slot wall of the first open slot 30121 of the first fastening piece 3012 through the second rotating shaft 3015*b*. The second rotating shaft 3015*b* may be but is not limited to a pin shaft. It should be noted that in this application, for setting of a rotative connection manner of two mechanical parts, reference may be made to the manner of rotatively connecting the first end of the middle connection rod 3014 to the slot wall of the first installation slot through the first rotating shaft 3015*a*. Details are not described in the following embodiments.

Similarly, a first end of the other middle connection rod 3014 may be installed in the second installation slot of the second installation portion 30113 of the connecting piece 3011, and is rotatively connected to a slot wall of the second installation slot through the first rotating shaft 3015*a*. The second end of the middle connection rod 3014 may be installed in the second open slot 30131 of the second fastening piece 3013, and is rotatively connected to a slot wall of the second open slot 30131 through the second rotating shaft 3015*b*. In addition, in this embodiment, the second end of the middle connection rod 3014 may be rotatively connected to the slot wall of the second open slot 30131 of the second fastening piece 3013 through the second rotating shaft 3015*b*. The second rotating shaft 3015*b* may be but is not limited to a pin shaft.

Still with reference to FIG. 6*a*, FIG. 6*b*, and FIG. 7, in this application, the connection rod assembly may further include a first connection rod 3016 and a second connection rod 3017. The first connection rod 3016 includes a first end and a second end that are disposed opposite to each other. The first end of the first connection rod 3016 may be installed on the third installation portion 30114 of the connecting piece 3011. The first end of the first connection rod 3016 is located between the two connecting arms 301141. In addition, the first end of the first connection rod 3016 is rotatively connected to the two connecting arms 301141 through a third rotating shaft 3015*c*. In addition, the second end of the first connection rod 3016 is rotatively connected to the second connection rod 3017 through a fourth rotating shaft 3015*d*. A third open slot 30171 may be disposed at an end that is of the second connection rod 3017 and that is configured to connect to the first connection rod 3016. The second end of the first connection rod 3016 may be installed in the third open slot 30171, and the second end of the first connection rod 3016 is rotatively connected to a slot wall of the third open slot 30171 through the fourth rotating shaft 3015*d*, so that a connection structure formed by the first connection rod 3016 and the second connection rod 3017 is relatively compact.

In addition, a first sliding slot (not shown in FIG. 7) is disposed at an end face on a side that is of the first fastening piece 3012 and that faces the second fastening piece 3013, and a second sliding slot 30132 is disposed at an end face on a side that is of the second fastening piece 3013 and that faces the first fastening piece 3012. One end of the third rotating shaft 3015*c* is inserted into the first sliding slot and can slide along the first sliding slot, and the other end of the third rotating shaft 3015c may be inserted into the second sliding slot 30132 and can slide along the second sliding slot 30132. It may be understood that the connection rod assembly can slide along the first sliding slot and the second sliding slot 30132.

In this application, a movement trajectory of the third rotating shaft 3015c may be set by designing specific forms of the first sliding slot and the second sliding slot 30132. In addition, because the first end of the first connection rod 3016 is rotatively connected to the connecting piece 3011 through the third rotating shaft 3015c, in a process in which the third rotating shaft 3015c moves along the specified movement trajectory, a connection part between the second end of the first connection rod 3016 and the connecting piece 3011 can move according to a specified movement track.

Figure 8A:
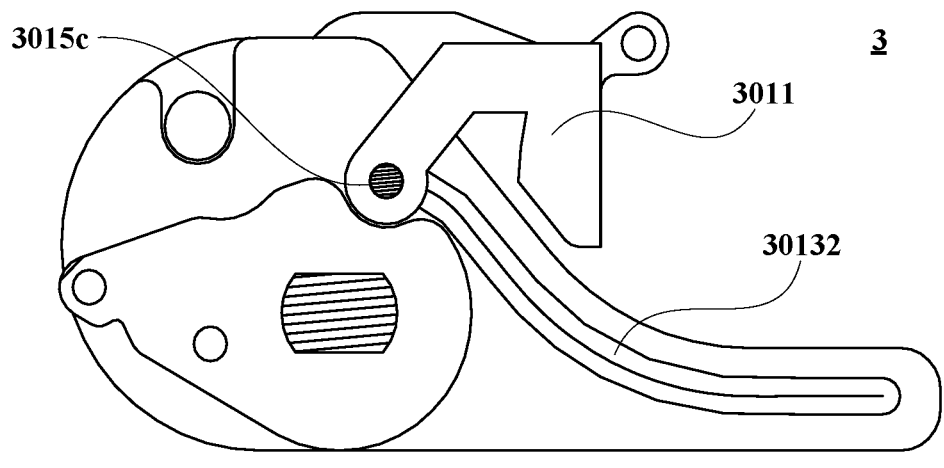

For example, FIG. 8a is a sectional view along A-A of the rotating assembly 301 shown in FIG. 6a. FIG. 8a shows a position of the third rotating shaft 3015c in the second sliding slot 30132 when the keyboard assembly 2 is in the closed state, that is, when the included angle between the surface that is of the keyboard body 201 and that faces the support portion 202 and the surface that is of the support portion 202 and that faces the keyboard body 201 is approximately 0°. In the state shown in FIG. 8a, the third rotating shaft 3015c is located at the highest point of the second sliding slot 30132. In addition, when the rotating assembly 301 is used on the keyboard assembly 2, in the state shown in FIG. 8a, the third rotating shaft 3015c is located at an end that is of the second sliding slot 30132 and that is the furthest from the keyboard body 201.

Figure 8B:
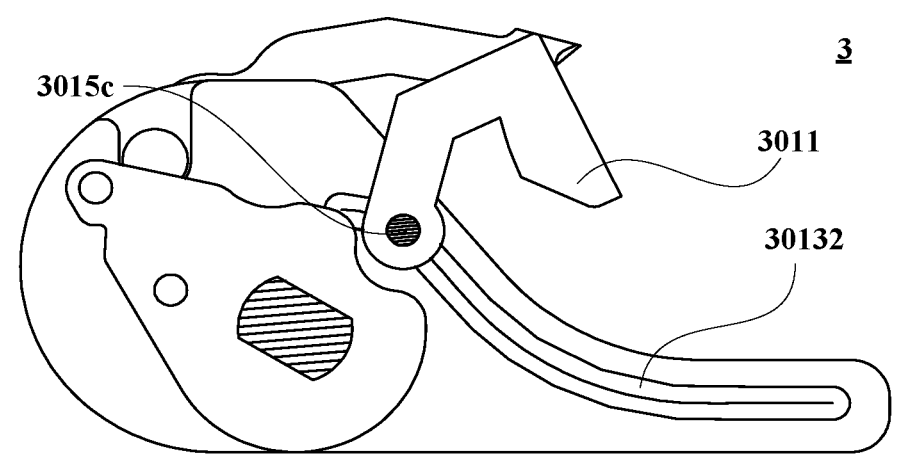
FIG. 8b to FIG. 8d are sectional views of a rotating assembly in different folding statuses according to an embodiment of this application.

In a process in which the keyboard assembly 2 moves from the closed state to the opened state, the third rotating shaft 3015c can slide along the second sliding slot 30132. FIG. 8b shows a position of the third rotating shaft 3015c in the second sliding slot 30132 when the keyboard assembly 2 is in an intermediate state from the closed state to the opened state. In the state shown in FIG. 8b, the included angle between the surface that is of the keyboard body 201 and that faces the support portion 202 and the surface that is of the support portion 202 and that faces the keyboard body 201 may be approximately 45. Through comparison between FIG. 8a and FIG. 8b, it can be learned that, in the process of opening the keyboard assembly 2, the third rotating shaft 3015c slides in a direction toward the keyboard body 201 along the second sliding slot 30132.

Figure 8C:
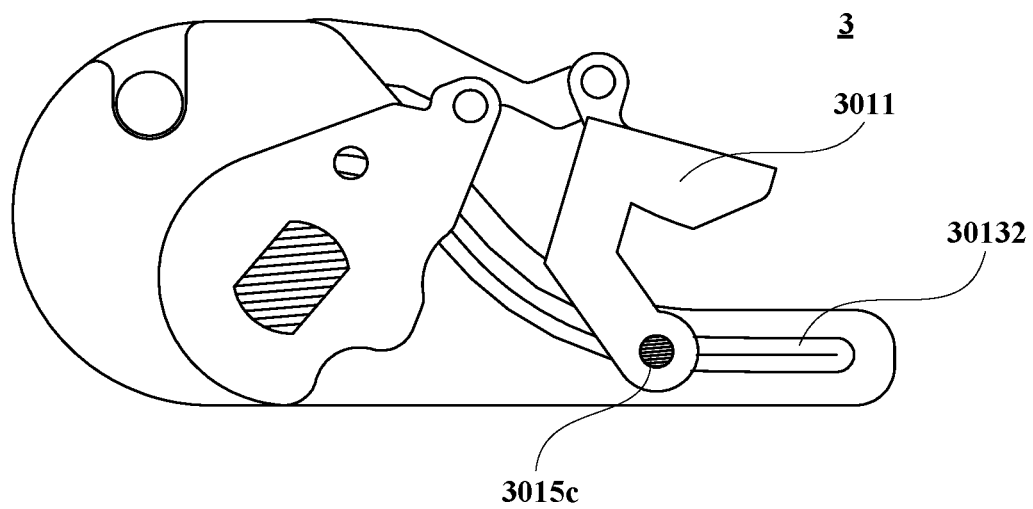
Figure 8D:
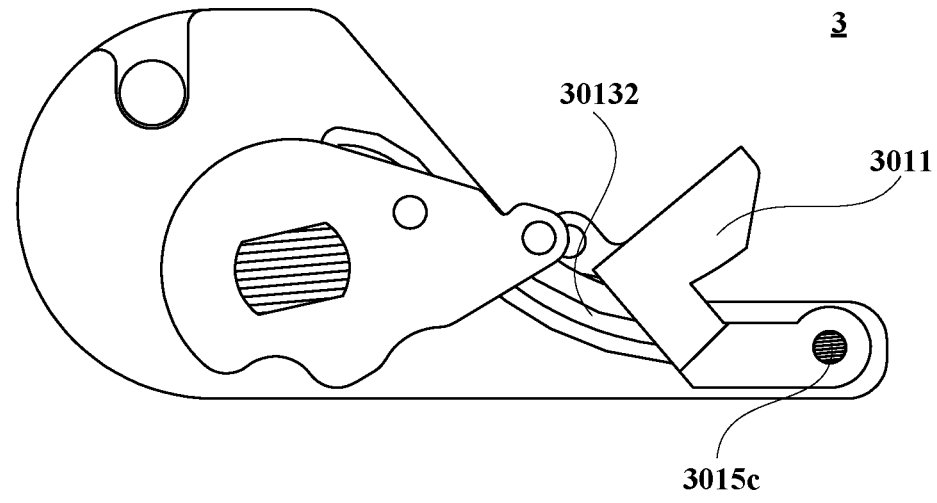

When the keyboard assembly is continuously opened in the state shown in FIG. 8b, refer to FIG. 8c. FIG. 8c shows a position of the third rotating shaft 3015c in the second sliding slot 30132 when the included angle between the surface that is of the keyboard body 201 and that faces the support portion 202 and the surface that is of the support portion 202 and that faces the keyboard body 201 is approximately 110°. Further refer to FIG. 8d. FIG. 8d shows a position of the third rotating shaft 3015c in the second sliding slot 30132 when the included angle between the surface that is of the keyboard body 201 and that faces the support portion 202 and the surface that is of the support portion 202 and that faces the keyboard body 201 is the largest (for example, approximately 130°). In this case, the third rotating shaft 3015c is located at an end that is of the second sliding slot 30132 and that is the closest to the keyboard body 201. It can be learned from FIG. 8a to FIG. 8d that, in this application, the movement trajectory of the connecting piece 3011 can be set by designing a specific form of the second sliding slot 30132.

Still with reference to FIG. 6a, FIG. 6b, and FIG. 7, in this application, the rotating assembly 301 may further include a main shaft 3018, and the main shaft 3018 may sequentially penetrate the first fastening piece 3012, the second connection rod 3017, and the second fastening piece 3013. The main shaft 3018 is rotatively connected to the first fastening piece 3012 and the second fastening piece 3013. The main shaft 3018 can rotate relative to the first fastening piece 3012 and the second fastening piece 3013. In addition, in a radial direction of the main shaft 3018, the second connection rod 3017 and the main shaft 3018 are fastened relative to each other. In this case, the second connection rod 3017 and the main shaft 3018 may rotate synchronously around an axis of the main shaft 3018. In a possible embodiment of this application, to relatively fasten the second connection rod 3017 and the main shaft 3018 in the radial direction, an irregular hole may be disposed on the second connection rod 3017. For example, the irregular hole may be but is not limited to a D-shaped hole. In addition, a section of a part that is of the main shaft 3018 and that penetrates the second connection rod 3017 is also set to an irregular section that can match the irregular hole, to implement limiting of the second connection rod 3017 and the main shaft 3018 in the radial direction.

In addition, a stop portion 30181 may be further disposed at an end that is of the main shaft 3018, that is located on the second fastening piece 3013, and that is away from the first fastening piece 3012, to limit the main shaft 3018 along an axial direction and reduce fluttering of the main shaft 3018 along the axial direction, thereby improving movement stability of the entire rotating assembly 301.

In this application, in order that the rotating assembly 301 can provide damping force in a corresponding rotation position for the rotating shaft mechanism in an entire movement process of the entire rotating shaft mechanism to keep the rotating shaft mechanism in the corresponding rotation position, still with reference to FIG. 7, in a possible embodiment of this application, an elastic piece 3019 may be further disposed on the rotating assembly 301, and the elastic piece 3019 may accumulate elastic force when being pressed. As shown in FIG. 7, the elastic piece 3019 may be disposed on a side that is of the first fastening piece 3012 and that is away from the second fastening piece 3013. A specific disposing form of the elastic piece 3019 is not limited in this application. For example, the elastic piece 3019 may include an elastic pad. There may be one or more elastic pads. When the elastic piece 3019 includes a plurality of elastic pads, the plurality of elastic pads may be disposed in a stacked manner. In addition, with reference to FIG. 7, the elastic piece 3019 may be sleeved on the main shaft 3018. In this embodiment, when the elastic piece 3019 is pressed, the elastic piece 3019 generates elastic force along the axial direction of the main shaft 3018.

In addition, to prevent the elastic piece 3019 from falling off the main shaft 3018, a limiting piece 3020 may be further disposed on a side that is of the elastic piece 3019 and that is away from the first fastening piece 3012. For example, the limiting piece 3020 may be a nut. The limiting piece 3020 is sleeved on the main shaft 3018. The elastic piece 3019 is limited along the axial direction of the main shaft 3018. In addition, in this application, to apply effective force on the elastic piece 3019, a group of gaskets 3021 may be further disposed. The group of gaskets 3021 are sleeved on the main shaft 3018. The elastic piece 3019 is disposed between the group of gaskets 3021. In addition, an outer ring diameter of the gasket 3021 may be further greater than or equal to an outer ring diameter of the elastic piece 3019. The limiting piece 3020 may abut against a gasket 3021 located on a side that is of the elastic piece 3019 and that is away from the first fastening piece 3012.

It should be noted that, in this application, the elastic piece 3019 may be deformed along the axial direction of the main shaft 3018. Elastic force generated due to the deformation of the elastic piece 3019 may be applied on the first fastening piece 3012, to generate friction force between the first fastening piece 3012 and the elastic piece 3019. The friction force may hinder rotation of the main shaft 3018. In addition, the second connection rod 3017 and the main shaft 3018 may rotate synchronously. The second connection rod 3017 can drive the connecting piece 3011 to rotate. The connecting piece 3011 is fixedly connected to the host support kit 4 fastened to the first support board 2021 shown in FIG. 3*b*. Therefore, when the second connection rod 3017 is hindered as the main shaft 3018 rotates, movement of the first support board 2021 is hindered. In this way, the elastic force generated by the elastic piece 3019 is converted into damping force that hinders rotation of the rotating shaft mechanism.

It may be understood that the host 1 may be fastened to the first support board 2021. When the host 1 reaches a specific rotation position in a rotation process of the first support board 2021, if torque generated by gravity of the host 1 is equal to torque generated by the damping force of the rotating shaft mechanism, the first support board 2021 can hover in the corresponding rotation position without external force.

Because the rotating shaft mechanism requires different damping force in different rotation positions, a change of the damping force may be implemented through changing the elastic force generated by the elastic piece 3019. The change of the elastic force of the elastic piece 3019 may be implemented through changing deformation of the elastic piece 3019. In a possible embodiment of this application, in order that the elastic piece 3019 has corresponding deformation in different rotation positions, a cam contact surface may be disposed between the first fastening piece 3012 and the elastic piece 3019. During specific implementation, still with reference to FIG. 7, a first extrusion structure 3022 is disposed between the elastic piece 3019 and the first fastening piece 3012. The first extrusion structure 3022 is sleeved on the main shaft 3018. The elastic piece 3019 may press the first extrusion structure 3022 toward the first fastening piece 3012, so that the first extrusion structure 3022 abuts against the first fastening piece 3012 under the elastic force of the elastic piece 3019. In addition, in the radial direction of the main shaft 3018, the first extrusion structure 3022 and the main shaft 3018 are fastened relative to each other, and the first extrusion structure 3022 may rotate synchronously with the main shaft 3018. An irregular hole may be disposed on the first extrusion structure 3022. For example, the irregular hole may be but is not limited to a D-shaped hole. In addition, a section of a part that is of the main shaft 3018 and that penetrates a first cam mechanism 3022 is also set to an irregular section that can match the irregular hole, to implement limiting of the first extrusion structure 3022 and the main shaft 3018 in the radial direction.

Figure 9:
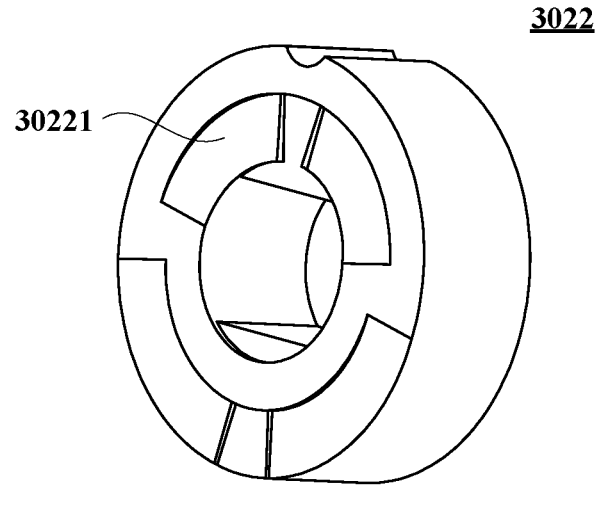
FIG. 9 is a schematic diagram of a structure of a first extrusion structure according to an embodiment of this application.

FIG. 9 is a schematic diagram of a structure of a first extrusion structure according to an embodiment of this application. A first slot 30221 is disposed on an end face that is of the first extrusion structure 3022 and that faces the first fastening piece 3012. The first slot 30221 has a plurality of segments, for example, four segments shown in FIG. 9. In addition, the first slot 30221 may be disposed in an arc shape. Radii of circles in which the plurality of segments of the first slot 30221 are located may be different. In order that the first extrusion structure 3022 cooperates with the end face of the first fastening piece 3012, in this application, a first protrusion (not shown in the figure) may be disposed on an end face that is of the first fastening piece 3012 and that faces the first extrusion structure 3022. The first protrusion also has a plurality of segments. The plurality of segments of the first protrusion are disposed in a one-to-one correspondence with the plurality of segments of the first slot 30221. It may be understood that, in some other embodiments of this application, the first slot 30221 may also be disposed on an end face that is of the first fastening piece 3012 and that faces the first extrusion structure 3022, and the first protrusion may be disposed on an end face that is of the first extrusion structure 3022 and that faces the second fastening piece.

When the correspondingly disposed first protrusion falls into the first slot 30221 so that the first slot 30221 cooperates with and is clamped to the first protrusion, a total length of the first extrusion structure 3022 and the first fastening piece 3012 in the axial direction of the main shaft 3018 is the smallest. In this case, extrusion force on the elastic piece 3019 is the smallest, and a deformation amount of the elastic piece 3019 is the smallest, so that the elastic force generated by the elastic piece 3019 is the smallest. Therefore, friction force between the first extrusion structure 3022 and the first fastening piece 3012 is the smallest. After the first extrusion structure 3022 rotates relative to the first fastening piece 3012, when the first slot 30221 is misaligned with the first protrusion, a total length of the first extrusion structure 3022 and the first fastening piece 3012 in the axial direction of the main shaft 3018 increases, thereby increasing the deformation amount of the elastic piece 3019 to accumulate the elastic force. Under the elastic force, the friction force between the first extrusion structure 3022 and the first fastening piece 3012 increases, thereby increasing the damping force of the rotating shaft mechanism.

It should be noted that, in this application, through properly designing the first slot 30221 and the first protrusion, the damping force of the rotating shaft mechanism 3 is the largest when the corresponding keyboard assembly 2 is in the closed state, so that the keyboard assembly 2 can be stably kept in the closed state.

Figure 10:
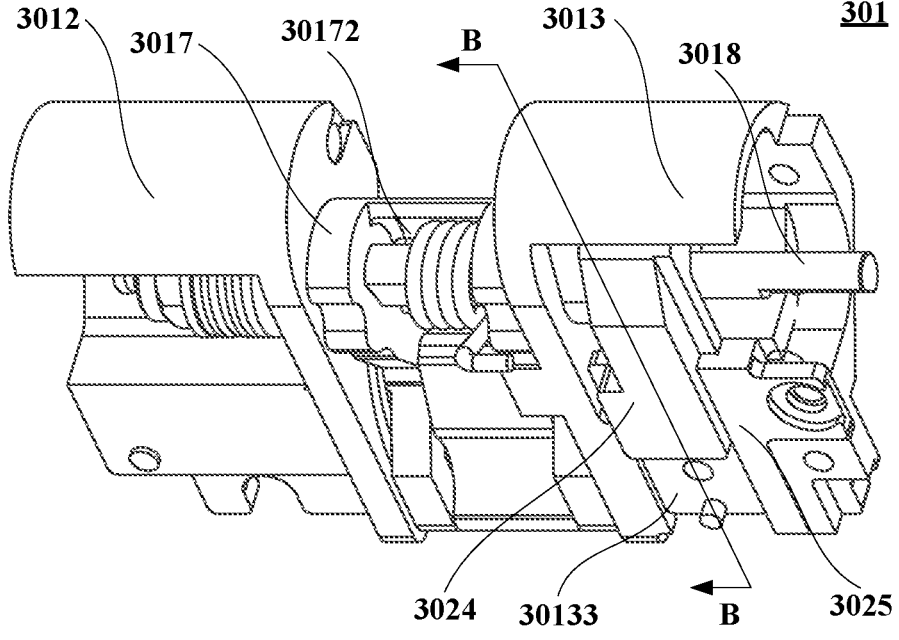
FIG. 10 is a schematic diagram of a structure of a rotating assembly according to another embodiment of this application.

Still with reference to FIG. 7, in this application, an elastic piece 3023 may be further disposed in the rotating assembly 301. The elastic piece 3023 may be, for example, a torsion spring. In addition, FIG. 10 is a schematic diagram of a structure of the rotating assembly 301 corresponding to FIG. 6*b* from another angle. It can be learned from FIG. 10 that a hollow region 30172 may be disposed on the second connection rod 3017, and the elastic piece 3023 can be hidden in the hollow region 30172. In this embodiment, the elastic piece 3023 may be sleeved on the main shaft 3018. In addition, because the main shaft 3018 can rotate relative to the first fastening piece 3012 and the second fastening piece 3013, and the second connection rod 3017 can rotate synchronously with the main shaft 3018, in this application, one end of the elastic piece 3023 may be fastened to the first fastening piece 3012 or the second fastening piece 3013, and the other end of the elastic piece 3023 may be fastened to the second connection rod 3017 or the main shaft 3018. In this way, in a process in which the second connection rod 3017 rotates with the main shaft 3018, the elastic piece 3023 may generate elastic deformation, thereby generating elastic force in a direction around the main shaft. On this basis, through a proper design, the elastic force generated by the elastic piece 3023 can provide auxiliary force for rotation of the second connection rod 3017 and the main shaft 3018. Therefore, when relatively small force is applied on the connecting piece 3011 shown in FIG. 7, the second connection rod 3017 and the main shaft 3018 can be driven to rotate, to improve comfortableness of the user in performing an open operation or a close operation on the keyboard assembly 2 using the rotating assembly 301.

Still with reference to FIG. 7, the rotating assembly 301 may further include a third connection rod 3024, and the third connection rod 3024 can slide along the second fastening piece 3013. In addition, with reference to FIG. 10, a slide 30133 is disposed on a side that is of the second fastening piece 3013 and that is away from the second open slot 30131 shown in FIG. 7, and the third connection rod 3024 can be accommodated in the slide 30133 and can slide along the slide 30133.

In some embodiments of this application, to prevent the third connection rod 3024 from falling off the slide 30133, still with reference to FIG. 7 and FIG. 10, the rotating assembly 301 may further include a fourth connection rod 3025. At least a part of the fourth connection rod 3025 is located on a side that is of the third connection rod 3024 and that is away from the second open slot 30131. The fourth connection rod 3025 is fixedly connected to the second fastening piece 3013. Therefore, the third connection rod 3024 is limited in the slide 30133 by using the fourth connection rod 3025, to improve movement reliability of the third connection rod 3024.

Figure 11A:
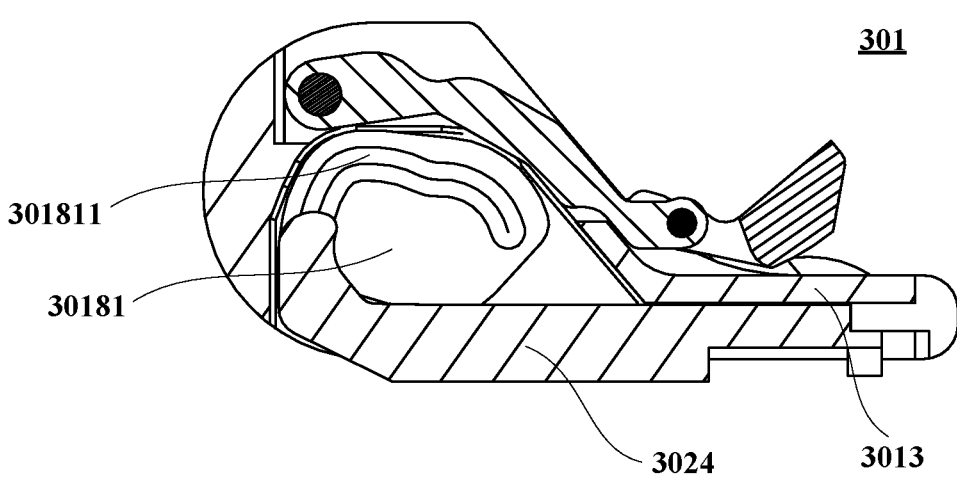
FIG. 11a is a sectional view along B-B in FIG. 10.

In addition, in a rotation process of the rotating assembly 301, to implement sliding of the third connection rod 3024 in the slide 30133, it can be learned from FIG. 7 that a side that is of the third connection rod 3024 and that faces the second fastening piece 3013 has a connecting portion 30241. Because another structure of the rotating assembly 301 can rotate with the main shaft 3018, in this application, the third connection rod 3024 can be connected to the main shaft 3018 through the connecting portion 30241. During specific implementation, refer to FIG. 11a. FIG. 11a is a sectional view along B-B in FIG. 10. It can be learned from the description of the foregoing embodiment that the stop portion 30181 is disposed on the side that is of the main shaft 3018, that is located on the second fastening piece 3013, and that is away from the first fastening piece 3012. With reference to both FIG. 7 and FIG. 11a, a track slot 301811 may be disposed on an end face that is of the stop portion 30181 and that faces the third connection rod 3024, and the connecting portion 30241 of the third connection rod 3024 can be inserted into the track slot 301811. In this way, in the rotation process of the main shaft 3018, the connecting portion 30241 of the third connection rod 3024 can slide along the track slot 301811.

Figure 11B:
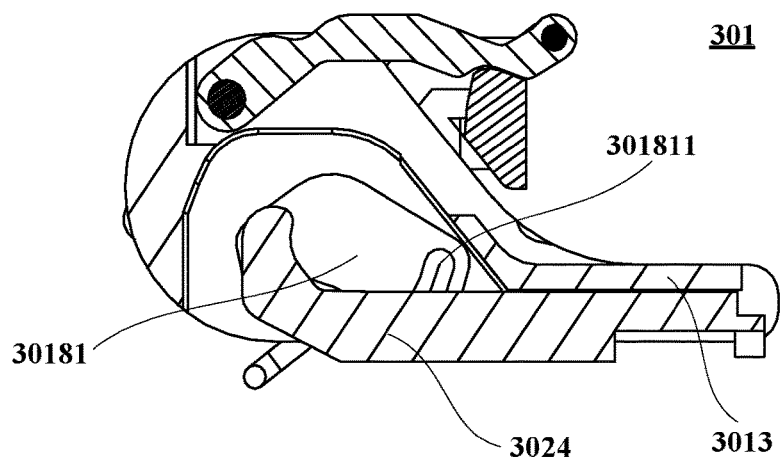
FIG. 11b is a sectional view of a rotating assembly in a closed state according to an embodiment of this application.

It may be understood that a movement trajectory of the third connection rod 3024 can be designed through properly designing the track slot 301811. For example, when the rotating assembly 301 is in the opened state shown in FIG. 11a, the third connection rod 3024 can be hidden in the second fastening piece 3013. In addition, refer to FIG. 11b. FIG. 11b shows a relative position relationship between the third connection rod 3024 and the stop portion 30181 when the rotating assembly 301 is in the closed state. When the rotating assembly 301 is in the closed state shown in FIG. 11b, the third connection rod 3024 may extend out of the second fastening piece 3013. For example, when the rotating assembly 301 is used in the keyboard assembly 2 shown in FIG. 3a, in the process in which the keyboard assembly 2 is switched from the opened state to the closed state, the third connection rod 3024 can slide in a direction toward the keyboard body 201. On the contrary, in the process in which the keyboard assembly 2 is switched from the closed state to the opened state, the third connection rod 3024 can slide in a direction away from the keyboard body 201. In some other embodiments of this application, when the rotating assembly 301 is used in the keyboard assembly 2, in the process in which the keyboard assembly 2 is switched from the opened state to the closed state, the third connection rod 3024 may alternatively slide in a direction away from the keyboard body 201. On the contrary, in the process in which the keyboard assembly 2 is switched from the closed state to the opened state, the third connection rod 3024 can slide in a direction toward the keyboard body 201.

Figure 12:
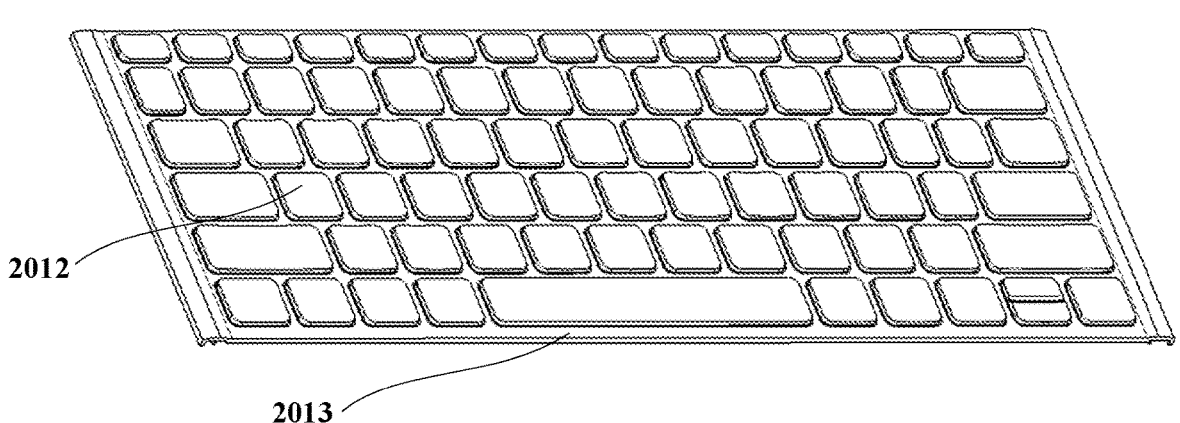
FIG. 12 is a schematic partial view of a structure of a keyboard body according to an embodiment of this application.

It can be learned from the description of the foregoing embodiment that the keyboard body 201 of the keyboard assembly 2 can be configured to implement a keyboard input function. Keys 2012 may be disposed on the keyboard body 201. FIG. 12 is a schematic partial view of a structure of the keyboard body 201 according to a possible embodiment of this application. The keyboard body 201 may further include a keyboard cover 2013. The keyboard cover 2013 can protect an internal structure of the keyboard body 201. The keys 2012 can come out of the keyboard cover 2013. Generally, the keys 2012 can protrude from a surface of the keyboard cover 2013, to implement functions of the keys 2012 through hitting the keys 2012. However, when the keyboard assembly 2 is in the closed state, the keys 2012 are in an unused state. In this case, the keys 2012 do not need to protrude from the surface of the keyboard cover 2013. On this basis, this application provides a solution in which the keys 2012 on the keyboard body 201 can go up or down with rotation of the rotating shaft mechanism. Therefore, when the keyboard assembly 2 is in the opened state, the keys 2012 go up and protrude from the surface of the keyboard cover 2013 of the keyboard body 201. However, when the keyboard assembly 2 is in the closed state, the keys 2012 go down and is hidden in the keyboard body 201, to reduce a thickness of the keyboard assembly 2 in the closed state. In this way, a requirement of a thin design of the electronic device is met, and a trace on a display is avoided when the keyboard body 201 is attached to the display of the electronic device in the closed state, thereby improving use experience of the user.

During specific implementation, FIG. 13a is a schematic diagram of an entire structure of the keyboard body 201 according to this application. Structures such as the keys 2012 and the key cover 2013 shown in FIG. 12 are omitted in FIG. 13a, to display a connection relationship between the rotating shaft mechanism 3 and the keyboard body 201. It can be learned from FIG. 13a that a rotating shaft connecting piece 2014 may be disposed at an end part that is of the keyboard body 201 and that is close to the rotating shaft mechanism 3. The rotating shaft connecting piece 2014 may be but is not limited to be disposed in a long-strip structure. A length direction of the rotating shaft connecting piece 2014 may be the same as the axial direction of the main shaft 3018 of the rotating assembly 301.

It can be learned from the description of the rotating assembly 301 of the rotating shaft mechanism 3 in the foregoing embodiment that the rotating assembly 301 includes the third connection rod 3024 that can slide along the direction toward or away from the keyboard body 201. In this application, the rotating shaft connecting piece 2014 may be fixedly connected to the third connection rod 3024, to drive, in the sliding process of the third connection rod 3024, the rotating shaft connecting piece 2014 to move along a direction toward or away from the rotating shaft mechanism 3. It may be understood that, in this application, when the third connection rod 3024 slides along the direction toward the keyboard body 201, the rotating shaft connecting piece 2014 can be driven to move along the direction away from the rotating shaft mechanism 3; and when the third connection rod 3024 slides along the direction away from the keyboard body 201, the rotating shaft connecting piece 2014 can be driven to move along the direction toward the rotating shaft mechanism 3.

It should be noted that, in this application, to improve movement stability of the rotating shaft connecting piece 2014, a plurality of rotating assemblies 301 may be disposed in the rotating shaft mechanism 3. For example, in the embodiment shown in FIG. 13a, two rotating assemblies 301 may be disposed in the rotating shaft mechanism 3, and the two rotating assemblies 301 may be disposed at two ends in a length direction of the rotating shaft mechanism 3. In this way, third connection rods 3024 of the two rotating assemblies 301 may be both fixedly connected to the rotating shaft connecting piece 2014, and the two third connection rods 3024 move synchronously in the same direction through proper disposition to drive the rotating shaft connecting piece 2014 to move, to improve movement reliability of the rotating shaft connecting piece 2014 and improve movement stability of the entire keyboard assembly 2.

In addition, refer to FIG. 13b. FIG. 13b is a schematic diagram of a structure of the keyboard body shown in FIG. 13a from another angle. The keyboard body 201 may further include a frame assembly 2015. The frame assembly 2015 includes a first frame 20151, a second frame 20152, and a horizontal rod 20153. In the axial direction of the main shaft 3018 of the rotating assembly 301 of the rotating shaft mechanism 3, the first frame 20151 and the second frame 20152 are disposed relative to each other, and the first frame 20151 and the second frame 20152 are both fixedly connected to the rotating shaft connecting piece 2014. A connection manner may be but is not limited to a tight connection by using a fastener such as a screw. In this way, when the rotating shaft connecting piece 2014 moves with the third connection rod 3024, the first frame 20151 and the second frame 20152 may be driven to move synchronously with the rotating shaft connecting piece 2014.

FIG. 14 is a schematic partial view of a structure obtained after the keyboard cover 2013 of the keyboard body 201 shown in FIG. 12 is removed. It can be learned from FIG. 14 that the keys 2012 are located between the first frame 20151 and the second frame 20152. In addition, in this application, the keys 2012 may be in a plurality of rows disposed in parallel. Each row of the keys 2012 includes a plurality of keys 2012. Each row of the keys 2012 are arranged in a direction from the first frame 20151 to the second frame 20152.

FIG. 15 is a schematic diagram of a structure of the keyboard body 201 shown in FIG. 14 from another angle. In this embodiment, there are a plurality of horizontal rods 20153. One horizontal rod 20153 is correspondingly disposed for each row of the keys 2012. A length direction of the horizontal rod 20153 is the same as the arrangement direction of each row of the keys 2012. In addition, the horizontal rod 20153 may be disposed on a side that is of correspondingly disposed keys 2012 and that faces the rotating shaft mechanism 3 shown in FIG. 13a, or may be disposed on a side that is of correspondingly disposed keys 2012 and that is away from the rotating shaft mechanism 3. This is not specifically limited in this application.

In this application, the first frame 20151 and the second frame 20152 can drive the horizontal rod 20153 to move in the length direction of the horizontal rod 20153. During specific implementation, refer to FIG. 16. FIG. 16 is an enlarged view of a partial structure of the keyboard body 201 shown in FIG. 15. In this application, the first frame 20151 includes a first inner frame 201511 and a first outer frame 201512, the first inner frame 201511 and the first outer frame 201512 are disposed side by side, and the first inner frame 201511 is located on a side that is of the first outer frame 201512 and that faces the keys 2012. In addition, the first outer frame 201512 is configured to fixedly connect to the rotating shaft connecting rod 2014 shown in FIG. 13a, and the first inner frame 201511 is fixedly connected to the plurality of horizontal rods 20153. A connection manner may be but is not limited to a tight connection by using a fastener such as a screw. The first outer frame 201512 and the first inner frame 201511 may be connected through the first connecting rod assembly 2016.

FIG. 17 is a locally enlarged view of a structure of a C part in FIG. 16. In this application, the first connecting rod assembly 2016 includes a first connecting rod 20161 and a second connecting rod 20162. A first end 201611 of the first connecting rod 20161 is hinged to the first inner frame 201511, and a second end 201612 of the first connecting rod 20161 is hinged to the first outer frame 201512. The first connecting rod 20161 may be but is not limited to be hinged to the first inner frame 201511 and the first outer frame 201512 through a pin shaft. A first end 201621 of the second connecting rod 20162 is hinged to a rod body of the first connecting rod 20161. The rod body of the first connecting rod 20161 is a part that is located between the first end 201611 and the second end 201612. The second end 201622 of the second connecting rod 20162 may be hinged to another mechanical part of the keyboard body 201. It should be noted that the another mechanical part of the keyboard body 201 may be any mechanical part in a fixed position on the keyboard body 201. In this application, the mechanical part in the fixed position is a mechanical part whose position does not change regardless of a working status of the keyboard assembly. For example, the keyboard cover 2013 shown in FIG. 12 is a structure that is in a fixed position on the keyboard body 201. Similarly, the second connecting rod 20162 may be but is not limited to be connected to the first connecting rod 20161 and the mechanical part of the keyboard body 201 through a pin shaft. In addition, in a possible embodiment of this application, the second end 201622 of the second connecting rod 20162 may be located on a side that is of the first end 201621 and that is away from the first inner frame 201511.

Still with reference to FIG. 16, in this application, the second frame 20152 may include a second inner frame 201521 and a second outer frame 201522, the second inner frame 201521 and the second outer frame 201522 are disposed side by side, and the second inner frame 201521 is located on a side that is of the second outer frame 201522 and that faces the keys 2012. In addition, the second outer frame 201522 is configured to fixedly connect to the rotating shaft connecting rod 2014 shown in FIG. 13a, and the second inner frame 201521 is fixedly connected to the plurality of horizontal rods 20153. A connection manner may be but is not limited to a tight connection by using a fastener such as a screw. The second outer frame 201522 and the second inner frame 201521 may be connected through a second connecting rod assembly 2017. The second connecting rod assembly 2017 includes a third connecting rod and a fourth connecting rod. In this application, a first end of the third connecting rod is hinged to the second inner frame 201521, and a second end of the third connecting rod is hinged to the second outer frame 201522. This is similar to a case of the first frame 20151. The third connecting rod may be but is not limited to be hinged to the second inner frame 201521 and the second outer frame 201522 through a pin shaft. A first end of the fourth connecting rod is hinged to a rod body of the third connecting rod, and a second end of the fourth connecting rod may be hinged to another mechanical part of the keyboard body 201. For example, the second end may be hinged to the keyboard cover 2013. Similarly, the fourth connecting rod may be but is not limited to be connected to the third connecting rod and the mechanical part of the keyboard body 201 through a pin shaft. In addition, in a possible embodiment of this application, the second end of the fourth connecting rod may be located on a side that is of the first end and that is away from the second inner frame 201521.

Still with reference to FIG. 17, in FIG. 17, a coordinate system including an X axis and a Y axis is used to indicate movement directions of the first frame 20151 and the horizontal rod 20153. A positive direction of the Y axis points to the rotating shaft mechanism (not shown in FIG. 17, where reference may be made to FIG. 13a), and a positive direction of the X axis points to the second frame (not shown in FIG. 17, where reference may be made to FIG. 16). In addition, in this application, the positive direction of the X axis may be the same as or opposite to the arrangement direction of each row of the keys 2012. A process in which the first frame 20151 drives the horizontal rod 20153 to move is described by using an example in which the keyboard assembly 2 shown in FIG. 17 is in the opened state.

When the keyboard assembly 2 is changed from the opened state shown in FIG. 17 to the closed state, the rotating shaft mechanism 3 drives the first outer frame 201512 to move toward the positive direction of the Y axis, and the second end 201612 of the first connecting rod 20161 moves toward the positive direction of the Y axis accordingly. Because the second end 201622 of the second connecting rod 20162 is located in the positive direction of the Y axis of the first connecting rod 20161, the second end 201612 of the first connecting rod 20161 moves along the positive direction of the Y axis. To be specific, the second end 201612 of the first connecting rod 20161 moves toward the second end 201622 of the second connecting rod 20162. In addition, the second end 201622 of the second connecting rod 20162 is fixedly connected to the structure of the keyboard body 201. The second end 201622 of the second connecting rod 20162 is always in a fixed position, and the second connecting rod 20162 can rotate only around the second end 201622.

FIG. 18 shows a relative position relationship between the first connecting rod 20161 and the second connecting rod 20162 when the keyboard assembly 2 is in the closed state. It can be learned through comparison between FIG. 17 and FIG. 18 that, in the process in which the keyboard assembly 2 is changed from the opened state shown in FIG. 17 to the closed state shown in FIG. 18, an included angle between the first connecting rod 20161 and the second connecting rod 20162 in the X-axis direction decreases, and the first end 201611 of the first connecting rod 20161 and the first end 201621 of the second connecting rod 20162 both move along the positive direction of the X axis, to push the first inner frame 201511 to move along the positive direction of the X axis. Each horizontal rod 20153 driven by the first inner frame 201511 moves along a direction toward the second frame 20152.

It may be understood that, in the foregoing process, an included angle between the third connecting rod and the fourth connecting rod in the X-axis direction increases, and the first end of the third connecting rod and the first end of the fourth connecting rod both move along the positive direction of the X axis, to drive the second inner frame 201521 to move along the positive direction of the X axis. Each horizontal rod 20153 driven by the second inner frame 201521 moves along a direction away from the first frame 20151.

In addition, when the keyboard assembly 2 is changed from the closed state shown in FIG. 18 to the opened state shown in FIG. 17, each horizontal rod 20153 driven by the first inner frame 201511 and the second inner frame 201521 moves along a negative direction of the X axis.

In this application, in a change process of the keyboard assembly 2, the first outer frame 201512 and the second outer frame 201522 may move in a direction toward or away from the rotating shaft mechanism, to drive the first inner frame 201511 and the second inner frame 201521 to move in a same direction along the arrangement direction of each row of the keys 2012, so that the horizontal rod 20153 can move back and forth along the arrangement direction of each row of the keys 2012 accordingly. Further, each horizontal rod 20153 is correspondingly disposed for one row of the keys 2012. On this basis, to implement up and down of the keys 2012 in different folding statuses of the keyboard assembly 2, an extrusion mechanism may be disposed between the horizontal rod 20153 and the corresponding keys 2012, so that the keys 2012 go up or down after being pressed and pushed by back-and-forth movement of the horizontal rod 20153.

During specific implementation, refer to FIG. 19. FIG. 19 is an enlarged diagram of a partial structure of the horizontal rod 20153 according to a possible embodiment of this application. First abutting structures 201531 may be disposed on the horizontal rod 20153. There may be a plurality of first abutting structures 201531. The first abutting structures 201531 may be disposed based on a quantity of keys 2012 correspondingly disposed for the horizontal rod 20153. In this embodiment of this application, the first abutting structure 201531 may be provided with a first inclined face 2015311. In addition, tilt angles of first inclined faces 2015311 of the plurality of first abutting structures 201531 may be the same or may be different.

In addition, refer to FIG. 20. FIG. 20 is a schematic diagram of a structure of installing the horizontal rod 20153 on the keyboard body 201. The keyboard body 201 has a plurality of key slots 2018. At least one first abutting structure 201531 can be correspondingly accommodated in each key slot 2018. For example, as shown in FIG. 20, two first abutting structures 201531 may be accommodated in each key slot 2018.

In this application, the key 2012 may include a key cap 20121 and an up and down mechanism. The key cap 20121 covers and is fastened to the up and down mechanism, to protect the up and down mechanism. In addition, the key cap 20121 can serve as a force-bearing component of the key 2012, and an input function of the keyboard assembly 2 can be implemented through pressing the up and down mechanism down by applying force on the key cap 20121. The up and down mechanism can drive the key cap 20121 to go up after the force applied on the key cap 20121 is removed. FIG. 21 is a schematic diagram of a structure of the up and down mechanism 20122 according to a possible embodiment of this application. The up and down mechanism 20122 can be accommodated in the key slot 2018 shown in FIG. 20. Second abutting structures 201221 are disposed in the up and down mechanism 20122. The second abutting structure 201221 may be provided with a second inclined face 2012211. In addition, each up and down mechanism 20122 may have a plurality of second abutting structures 201221. For example, as shown in FIG. 21, two second abutting structures 201221 may be disposed on each up and down mechanism 20122. When each up and down mechanism 20122 has the plurality of second abutting structures 201221, tilt directions of second inclined faces 2012211 of the plurality of second abutting structures 201221 may be the same or may be different.

FIG. 22 shows a cooperation relationship between the horizontal rod 20153 and the key 2012 when the keyboard assembly 2 is in the opened state. In the embodiment shown in FIG. 22, the key cap is omitted for ease of expressing cooperation between the horizontal rod 20153 and the key 2012. In addition, in comparison with FIG. 17, a view angle of the keyboard assembly 2 in FIG. 22 is adjusted. However, directions of the Y axis and the X axis in FIG. 22 are the same as those in FIG. 17.

As shown in FIG. 22, in this application, for the horizontal rod 20153 and the key 2012 that are correspondingly disposed, the first inclined face 2015311 of the first abutting structure 201531 of the horizontal rod 20153 shown in FIG. 19 and the second inclined face 2012211 of the second abutting structure 201221 of the up and down mechanism 20122 shown in FIG. 21 may be disposed relative to each other. The first abutting structure and the second abutting structure are located in the same key slot 2018. The second inclined face 2012211 is in the positive direction of the X axis relative to the first inclined face 2015311. In addition, in the state shown in FIG. 22, the first inclined face 2015311 and the second inclined face 2012211 that are disposed relative to each other may be spaced; or the first inclined face 2015311 and the second inclined face 2012211 are in contact with no extrusion force or small extrusion force therebetween. In this case, when the up and down mechanism 20122 is in an up state, the entire key 2012 may protrude from the surface of the keyboard cover 2013 shown in FIG. 12, to implement the input function of the keyboard assembly 2 through hitting the key 2012.

It can be learned from the description of the foregoing embodiment that, when the keyboard assembly 2 is changed from the opened state shown in FIG. 22 to the closed state, the horizontal rod 20153 can move along the positive direction of the X axis, and the second inclined face 2012211 of the second abutting structure 201221 is in the positive direction of the X axis relative to the first inclined face 2015311 of the first abutting structure 201531. Therefore, when the horizontal rod 20153 moves along the positive direction of the X axis, the first inclined face 2015311 may be used to apply extrusion force on the second inclined face 2012211. FIG. 23 shows a cooperation relationship between the horizontal rod 20153 and the key 2012 when the keyboard assembly 2 is in the closed state. It can be learned from FIG. 23 that, when the keyboard assembly 2 is in the closed state, the up and down structure 20122 drives the key cap to go down under the extrusion force applied on the second inclined face 2012211 through the first inclined face 2015311, so that the key 2012 can be hidden in the corresponding key slot 2018. Therefore, the thickness of the keyboard assembly 2 in the closed state is small. In this way, the requirement of the thin design of the electronic device is met, to improve use experience of the user.

In addition, when the keyboard assembly 2 is changed from the closed state to the opened state, the horizontal rod 20153 moves along the negative direction of the X axis, and the extrusion force applied on the second inclined face 2012211 through the first inclined face 2015311 becomes increasingly smaller. The up and down mechanism 20122 can drive the key cap 20121 to go up from the corresponding key slot 2018, and enable the key cap 20121 to protrude from the surface of the keyboard cover 2013 shown in FIG. 12, to implement functions of the key 2012.

It should be noted that the solution in which the key 2012 goes up or down according to the folding status of the keyboard assembly 2 provided in this application can be applied to the keyboard assembly 2 in this application, and can also be applied to another foldable electronic device having a keyboard. For example, the solution can be applied to a notebook computer. For a specific setting manner, refer to the foregoing embodiment of this application. Details are not described herein again.

It can be learned from the description of the foregoing embodiment that, with reference to FIG. 2, the support portion 202 of the keyboard assembly 2 may be configured to support the host 1 installed on the first support board 2021. Therefore, in the processes in which the keyboard assembly 2 is changed from the closed state to the opened state and from the opened state to the closed state, a relatively high requirement is imposed on movement stability of the support portion 202.

On this basis, refer to FIG. 24. FIG. 24 is a schematic diagram of a structure of the rotating shaft mechanism 3 according to another possible embodiment of this application. In this embodiment, the rotating shaft mechanism 3 may further include a cam 303. The cam 303 can rotate synchronously with the main shaft 3018 of the rotating assembly 301. In other words, in the radial direction of the main shaft 3018, the cam 303 and the main shaft 3018 are fastened relative to each other. An irregular hole may be disposed on the cam 303. For example, the irregular hole may be but is not limited to a D-shaped hole. In addition, a section of a part that is of the main shaft 3018 and that penetrates the cam 303 is also set to an irregular section that can match the irregular hole, to implement limiting of the cam 303 and the main shaft 3018 in the radial direction.

Still with reference to FIG. 24, a cam sliding slot 3031 is disposed on a surface of the cam 303. In addition, refer to FIG. 25a. FIG. 25a is a schematic partial view of a structure of the keyboard assembly 2 in the closed state according to an embodiment of this application. FIG. 25a shows a structure of the fourth support board 2024 of the support portion 202 in the closed state. An auxiliary support mechanism 20241 is disposed on the fourth support board 2024. The auxiliary support mechanism 20241 includes a first support rod 202411 and a second support rod 202412. The first support rod 202411 and the second support rod 202412 are disposed in a cross manner. Middle parts of the first support rod 202411 and the second support rod 202412 are hinged.

In addition, a slide 20242 and a slide 20243 are disposed on the fourth support board 2024. The slide 20242 and the slide 20243 can extend in directions away from the keyboard body 201. A first sliding block 20244 is disposed in the slide 20242. A second sliding block 20245 is disposed in the slide 20243. Still with reference to FIG. 25a, in this application, the first sliding block 20244 and the second sliding block 20245 can be both fixedly connected to the fourth support board 2024.

It can be learned from the description of the foregoing embodiment that, in order that the rotating shaft mechanism 3 relatively stably moves, one rotating assembly 301 may be disposed at each of the two end parts of the rotating shaft mechanism 3 in the length direction. In addition, in this application, one cam 303 can be correspondingly disposed for each rotating assembly 301.

In this way, the auxiliary support structure may be located between the two rotating assemblies 301. One end of the first support rod 202411 can be accommodated in a cam sliding slot 3031 of one cam 303, and the other end of the first support rod 202411 is hinged to the first sliding block 20244. One end of the second support rod 202412 is accommodated in a cam sliding slot 3031 of the other cam 303, and the other end of the second support rod 202412 is hinged to the second sliding block 20245. FIG. 25*b* shows a structure of the fourth support board 2024 of the support portion 202 shown in FIG. 25*a* when the keyboard assembly 2 is in the opened state. With reference to both FIG. 25*a* and FIG. 25*b*, in the process from the closed state shown in FIG. 25*a* to the opened state shown in FIG. 25*b*, the cam 303 can rotate with the main shaft 3018 of the rotating assembly 301. In this way, the end that is of the first support rod 202411 and that is accommodated in the corresponding cam sliding slot 3031 and the end that is of the second support rod 202412 and that is accommodated in the corresponding cam sliding slot 3031 are pushed to move toward each other along the axial direction of the main shaft 3018. Because the first support rod 202411 is hinged to the second support rod 202412, in the foregoing process, the first support rod 202411 can push the first sliding block 20244 to slide along the slide 20243 in a direction away from the keyboard body 201, and the second support rod 202412 can push the second sliding block 20245 to slide along the slide 20242 in a direction away from the keyboard body 201. In addition, because the first sliding block 20244 and the second sliding block 20245 are both fixedly connected to the fourth support board 2024, in a process in which the first sliding block 20244 and the second sliding block 20245 slide in the directions away from the keyboard body 201, the fourth support board 2024 can be pushed to slide in a direction away from the keyboard body 201. In this way, movement stability of the support portion 202 can be improved in the process of opening the keyboard assembly 2, so that the keyboard assembly 2 can stably support the host 1 disposed on the first support board 2021, thereby improving user experience.

It may be understood that, in this application, a track shape of the cam sliding slot 3031 may be designed based on the first support rod 202411, the second support rod 202412, and movement directions of the first sliding block 20244 and the second sliding block 20245. Therefore, the first sliding block 20244 and the second sliding block 20245 can be pushed to stably slide in a process in which the first support rod 202411 and the second support rod 202412 rotate around a hinge joint of the first support rod 202411 and the second support rod 202412.

In addition to the foregoing structure, the rotating shaft mechanism 3 provided in this application may be further provided with an automatic opening and closing apparatus 304. The automatic opening and closing apparatus 304 may include a motor 3041. When the rotating shaft mechanism 3 is used in the keyboard assembly 2, the motor 3041 can be used to drive the rotating shaft mechanism 3 to move, to open or close the keyboard assembly 2, thereby simplifying operation steps of the user.

In addition, the user has a personalized requirement for a use angle of a foldable device. In a process in which the motor 3041 is used to drive the keyboard assembly 2 to be opened or closed, the process may be subconsciously intervened according to a requirement of the user. If torque provided by the motor 3041 is insufficient, the motor 3041 or another mechanical part is damaged. To resolve this problem, the motor 3041 can safely and reliably run. A protection mechanism 3042 may be further disposed on the automatic opening and closing apparatus 304 provided in this application.

During specific implementation, refer to FIG. 26. FIG. 26 is a schematic diagram of a structure of the rotating shaft mechanism 3 according to an embodiment of this application. In this embodiment of this application, in addition to the rotating assembly 301, the rotating shaft mechanism 3 further includes the automatic opening and closing apparatus 304. The automatic opening and closing apparatus 304 includes the motor 3041 and the protection mechanism 3042. The protection mechanism 3042 may be but is not limited to a clutch. The protection mechanism 3042 is located between the motor 3041 and the rotating assembly 301. The motor 3041 may be used to drive the rotating shaft mechanism 3 to rotate, to implement an automatic opening and closing function of the keyboard assembly. The protection mechanism 3042 can protect the motor 3041. In a normal working state, the motor 3041 transmits the torque to the rotating assembly 301 through the protection mechanism 3042, to drive the rotating assembly 301 to rotate. When a load on the motor 3041 is excessively large, the protection mechanism 3042 can adjust the load on the motor 3041, to avoid damage to the motor.

FIG. 27 is a schematic diagram of a structure of the protection mechanism 3042 according to an embodiment of this application. The protection mechanism 3042 includes a fastening frame 30421. The fastening frame 30421 may serve as a support base of the entire protection mechanism 3042, to support another structure of the protection mechanism 3042. In addition, a first fastening plate 304211 and a second fastening plate 304212 may be disposed on the fastening frame 30421. The first fastening plate 304211 and the second fastening plate 304212 are disposed relative to each other, to form installation space between the first fastening plate 304211 and the second fastening plate 304212.

FIG. 28 is an exploded view of the protection mechanism 3042 shown in FIG. 27. In this application, the fastening frame 30421 may be fixedly connected to the keyboard body 201 in the foregoing embodiment. A connection manner may be but is not limited to a threaded connection.

Still with reference to FIG. 28, the protection mechanism 3042 further includes two rotating shaft assemblies. For ease of description, the two rotating shafts may be respectively denoted as a first rotating shaft assembly 30422 and a second rotating shaft assembly 30423. The first rotating shaft assembly 30422 and the second rotating shaft assembly 30423 are accommodated in the installation space between the first fastening plate 304211 and the second fastening plate 304212. The first rotating shaft assembly 30422 includes a first shaft 304221. The second rotating shaft assembly 30423 includes a second shaft 304231. Axes of the first shaft 304221 and the second shaft 304231 may be set in parallel. One end of the first shaft 304221 is fastened to the first fastening plate 304211, and the other end of the first shaft is fastened to the second fastening plate 304212. One end of the second shaft 304231 is fastened to the first fastening plate 304211, and the other end of the second shaft extends toward the second fastening plate 304212.

In addition, the first rotating shaft assembly 30422 further includes a first gear piece 304222. The first gear piece 304222 is sleeved on the first shaft 304221. The first gear piece 304222 can rotate around the first shaft 304221, and can slide along an axial direction of the first shaft 304221. In a direction from the first fastening plate 304211 to the second fastening plate 304212, a first gear structure 3042221 and a second gear structure 3042222 are disposed on the first gear piece 304222, and the first gear structure 3042221 and the second gear structure 3042222 are spaced. Still with reference to FIG. 28, a guide slot structure 3042223 is further disposed on the first gear piece 304222, and the guide slot structure 3042223 is located between the first gear structure 3042221 and the first fastening plate 304211. A guide slot 30422231 is disposed on the guide slot structure 3042223. The guide slot 30422231 may be but is not limited to be disposed in a spiral shape.

When the second rotating shaft assembly 30423 is disposed, a second gear piece 304232 is further disposed on the second rotating shaft assembly 30423. The second gear piece 304232 can be sleeved on the second shaft 304231, and can rotate around the second shaft 304231. Still with reference to FIG. 28, a third gear structure 3042321 may be disposed on the second gear piece 304232. The third gear structure 3042321 can be engaged with the first gear structure 3042221.

A first stopper 3042322 may be further disposed on an end that is of the second gear piece 304232 and that faces the first fastening plate 304211. A notch 30423221 may be disposed on the first stopper 3042322. In addition, the second rotating shaft assembly 30423 may further include a fast pin 304233 and a sliding pin 304234. The fast pin 304233 and the sliding pin 304234 are located on a side that is of the second gear piece 304232 and that faces the first fastening plate 304211. Still with reference to FIG. 28, the fast pin 304233 is sleeved on the second shaft 304231, and the fast pin 304233 may be rotatively connected to the second shaft 304231. In addition, the fast pin 304233 may extend out of the installation space from the first fastening plate 304211, to fixedly connect to the main shaft of the rotating assembly in the foregoing embodiment.

In this application, to connect the fast pin 304233 to the rotating shaft of the rotating assembly, the protection mechanism 3042 may further include a conversion bracket 30424. The conversion bracket 30424 may be disposed on a side that is of the first fastening plate 304211 and that is away from the second fastening plate 304212. An end that is of the fast pin 304233 and that extends out of the installation space from the first fastening plate 304211 may be fixedly connected to the conversion bracket 30424. The conversion bracket 30424 can rotate synchronously with the main shaft of the rotating assembly shown in FIG. 26.

With reference to FIG. 28, a mounting hole 304241 is disposed on the conversion bracket 30424. The main shaft 3018 (refer to FIG. 7) of the rotating assembly 301 may be installed in the mounting hole 304241. The conversion bracket 30424 can rotate synchronously with the main shaft 3018. It may be understood from the description of the foregoing embodiment that, in this application, a section of a part that is of the main shaft 3018 and that is installed in the mounting hole 304241 may be an irregular section, for example, a D-shaped section. In this case, the mounting hole 304241 of the conversion bracket 30424 may also be disposed as an irregular hole that cooperates with the section of the main shaft, for example, a D-shaped hole.

FIG. 29a is a D-direction view of the protection mechanism 3042 shown in FIG. 27. In this application, the fast pin 304233 is provided with an open slot 3042331. An opening of the open slot 3042331 is located at an end that is of the fast pin 304233 and that is away from the first fastening plate 304211. The open slot 3042331 extends in a direction toward the first fastening plate 304211. In this application, a guide structure 3042332 may be further disposed on a surface of the fast pin 304233. The guide structure 3042332 may be a protrusion structure. The guide structure 3042332 can be inserted into the guide slot 30422231 of the guide slot structure 3042223 of the first gear piece 304222, and can slide along the guide slot 30422231.

In this application, in a process in which the guide structure 3042332 slides in the guide slot 30422231, the first gear piece 304222 can be pushed to slide along the first rotating shaft. Still with reference to FIG. 28, in a possible embodiment of this application, an assisting mechanism 304223 may be further disposed on the first rotating shaft assembly 30422. The assisting mechanism 304223 can provide assistance for sliding of the first gear piece 304222 along the first shaft 304221, to improve sliding reliability of the first gear piece 304222. In this application, a specific manner of disposing the assisting mechanism 304223 is not limited. For example, the assisting mechanism 304223 may be a torsion spring. One end of the assisting mechanism 304223 may be fixedly connected to the first gear piece 304222, and the other end of the assisting mechanism may be fixedly connected to the first shaft 304221. Through properly designing a shape of the torsion spring, in a process in which the first gear piece 304222 slides along the first shaft 304221, elastic force generated by deformation of the torsion spring drives the first gear piece 304222 and the first shaft 304221 to slide relative to each other.

With reference to FIG. 29a, the sliding pin 304234 is located between the fast pin 304233 and the first stopper 3042322. The sliding pin 304234 is sleeved on the second shaft 304231 shown in FIG. 28, and can slide along an axial direction of the second shaft 304231. In this application, a pin shaft 3042341 is disposed at an end that is of the sliding pin 304234 and that faces the fast pin 304233. The pin shaft 3042341 can be inserted into the open slot 3042331 of the fast pin 304233, and can slide along the open slot 3042331.

It may be understood that, in this application, there may be one or more open slots 3042331 on the fast pin 304233. The pin shaft 3042341 disposed on the sliding pin 304234 can be correspondingly disposed in the open slot 3042331, to improve sliding stability of the sliding pin 304234 along the open slot 3042331 of the fast pin 304233.

In addition, still with reference to FIG. 29a, a second stopper 3042342 is further disposed at an end that is of the sliding pin 304234 and that is away from the fast pin 304233. The second stopper 3042342 may be a protrusion structure. When the sliding pin 304234 slides in a direction away from the first fastening plate 304211, the second stopper 3042342 may be inserted into the notch 30423221 of the first stopper 3042322, so that the sliding pin 304234 and the second gear piece 304232 are locked relative to each other. Because the pin shaft 3042341 of the sliding pin 304234 is always located in the open slot 3042331 of the fast pin 304233, and the fast pin 304233 is fixedly connected to the main shaft of the rotating assembly, when the second stopper 3042342 is inserted into the notch 30423221 of the first stopper 3042322, the second gear piece 304232 can rotate synchronously with the fast pin 304233.

Still with reference to FIG. 29*a*, a first clamping portion (not shown in FIG. 29*a*) may be further disposed on a side that is of the sliding pin 304234 and that faces the first gear piece 304222, and a second clamping portion (not shown in FIG. 28) may be further disposed on the first gear piece 304222. The first clamping portion may be clamped to the second clamping portion. Therefore, when the first gear piece 304222 slides along the first shaft 304221, the sliding pin 304234 can be pushed to slide along the second shaft 304231 in a direction opposite to a direction of the first gear piece 304222. In this application, specific structures of the first clamping portion and the second clamping portion are not limited. For example, the first clamping portion may be a protrusion. A shape of the first clamping portion may be but is not limited to a trapezoid. In addition, the second clamping portion may be a slot, and the protrusion is clamped into the slot, to implement clamping between the first clamping portion and the second clamping portion. In some other embodiments of this application, the first clamping portion may be alternatively a slot, and the second clamping portion may be a protrusion.

Still with reference to FIG. 29*a*, a motor connecting piece 304235 may be further disposed at an end that is of the second shaft 304231 and that faces the second fastening plate 304212. The motor connecting piece 304235 may be configured to fixedly connect to a rotating shaft of the motor. In addition, the second rotating shaft assembly 30423 may further include a conversion bracket 30425. The conversion bracket 30425 is located between the second rotating shaft assembly 30423 and the second fastening plate 304212. The conversion bracket 30425 abuts against the second rotating shaft assembly 30423. In this application, the conversion bracket 30425 can be sleeved on the second shaft. The conversion bracket 30425 may be connected to the motor connecting piece 304235. The conversion bracket 30425 can rotate with the motor connecting piece 304235.

As shown in FIG. 29*a*, a fourth gear structure 304251 may be disposed on a surface of the conversion bracket 30425, and the second gear structure 3042222 of the first gear piece 304222 is engaged with the fourth gear structure 304251. In this application, FIG. 29*a* is a schematic diagram of a structure of the protection mechanism 3042 when the keyboard assembly is in the closed state. FIG. 29*b* is an E-direction view of FIG. 29*a*. FIG. 29*b* shows a structure on a side of the conversion bracket 30424 in the closed state. In the closed state, the first gear structure 3042221 and the third gear structure 3042321 are engaged, and the second gear structure 3042222 and the fourth gear structure 304251 are engaged. In addition, the guide structure 3042332 on the fast pin 304233 is inserted into the guide slot 30422231 of the guide slot structure 3042223.

In a process in which the keyboard assembly is changed from the closed state to the opened state, the motor 3041 shown in FIG. 26 runs and drives, by using the motor connecting piece 304235, the conversion bracket 30425 to rotate. Because the second gear structure 3042222 of the first gear piece 304222 is engaged with the fourth gear structure 304251 of the conversion bracket 30425, rotation of the conversion bracket 30425 can drive the first gear piece 304222 to rotate. In addition, because the first gear structure 3042221 of the first gear piece 304222 is engaged with the third gear structure of the second gear piece 304232, rotation of the first gear piece 304222 can drive the second gear piece 304232 to rotate.

With reference to FIG. 29*a*, in the closed state, the second stopper 3042342 of the sliding pin 304234 is inserted into the notch 30423221 of the first stopper 3042322 of the second gear piece 304232, and the pin shaft 3042341 of the sliding pin 304234 is inserted into the open slot 3042331 of the fast pin 304233. In this way, in a process in which the keyboard assembly is changed from the closed state to the opened state, rotation of the first gear piece 304222 can drive the second gear piece 304232 to rotate, and rotation of the second gear piece 304232 can drive the sliding pin 304234 and the fast pin 304233 to rotate accordingly. The fast pin 304233 is further connected to the main shaft of the rotating assembly through the conversion bracket 30424, to drive the main shaft of the rotating assembly to rotate with the fast pin 304233.

In addition, in a rotation process of the first gear piece 304222, the guide structure 3042332 of the fast pin 304233 can slide along the guide slot 30422231 of the guide slot structure 3042223, and the guide slot 30422231 of the guide slot structure 3042223 interacts with the guide structure 3042332 of the fast pin 304233. In this case, through a proper design, in a process in which the guide structure 3042332 of the fast pin 304233 slides along the guide slot 30422231 of the guide slot structure 3042223, the first gear piece 304222 is pushed to slide along the first shaft 304221 in a direction toward the second fastening plate 304212. It can also be learned from the description of the foregoing embodiment that the sliding pin 304234 can slide synchronously with the first gear piece 304222. In a process in which the first gear piece 304222 slides along the first shaft 304221 in the direction toward the second fastening plate 304212, the sliding pin 304234 can be pushed to slide along the second shaft 304231 in a direction toward the first fastening plate 304211.

FIG. 30*a* is a schematic diagram of a structure of the protection mechanism 3042 when the keyboard assembly is in the opened state. FIG. 30*b* is an F-direction view of FIG. 30*a*. FIG. 30*b* shows a structure on a side of the conversion bracket 30424 in the closed state. When the keyboard assembly is in the opened state, the first gear structure 3042221 and the third gear structure 3042321 are staggered, to break an engagement relationship between the first gear piece 304222 and the second gear piece 304232. However, in this case, the second gear structure 3042222 and the fourth gear structure 304251 are still in an engaged state. In addition, in this case, the second stopper 3042342 of the sliding pin 304234 is detached from the notch 30423221 of the first stopper 3042322 of the second gear piece 304232 shown in FIG. 28. There is no connection relationship between the sliding pin 304234 and the second gear piece 304232.

It may be understood that closing of the keyboard assembly may be usually implemented by using a user operation. During specific implementation, the user may apply, on the first support board of the support portion of the keyboard assembly, force in a direction toward the keyboard body. It can be learned from the description of the foregoing embodiment that, in the process in which the keyboard assembly is changed from the opened state to the closed state, movement of the first support board toward the keyboard body can drive the main shaft of the rotating assembly to rotate. With reference to both FIG. 29*a* and FIG. 30*a*, the process in which the keyboard assembly is changed from the opened state to the closed state is a process in which the protection mechanism moves from the state shown in FIG. 30*a* to the state shown in FIG. 29*a*. Because the main shaft of the rotating assembly can rotate synchronously with the conversion bracket 30424, in this process, the first gear piece 304222 slides along the first shaft 304221 in a direction toward the first fastening plate 304211 under cooperation between the guide structure 3042332 of the fast pin 304233 and the guide slot 30422231, so that the gear structures corresponding to the first gear piece 304222 and the second gear piece 304232 are engaged again. In addition, in a process in which the first gear piece 304222 slides in the direction toward the first fastening plate 304211, the sliding pin 304234 can be driven to slide in a direction toward the second fastening plate 304212, so that the second stopper 3042342 of the sliding pin 304234 is inserted into the notch 30423221 of the first stopper 3042322 of the second gear piece 304232 again.

After a structure and an operating principle of the protection mechanism 3042 provided in this application are understood, the following describes an implementation in which the protection mechanism 3042 protects the motor 3041 shown in FIG. 26.

FIG. 31 is a sectional view of the protection mechanism 3042 according to an embodiment of this application. For ease of description, FIG. 31 shows only a sectional structure at the second rotating shaft assembly 30423, and omits a sectional structure at the first rotating shaft assembly 30422.

With reference to FIG. 31, the conversion bracket 30425 is provided with an accommodating cavity 304252, and an opening of the accommodating cavity 304252 faces the motor connecting piece 304235. The motor connecting piece 304235 includes a rotation center piece 3042351. The rotation center piece 3042351 can be inserted into the accommodating cavity 304252. Still with reference to FIG. 31, in this application, the second shaft 304231 can be inserted into the rotation center piece 3042351. In addition, an end that is of the rotation center piece 3042351 and that is away from the conversion bracket 30425 can penetrate the second fastening plate 304212, to connect to the motor.

In addition, the motor connecting piece 304235 may further include a housing 3042352. The housing 3042352 is sleeved on the rotation center piece 3042351. The housing 3042352 may be fixed on the second fastening plate 304212. It can be learned from FIG. 31 that, in a possible embodiment of this application, a roll ball may be disposed between the housing 3042352 and the rotation center piece 3042351. There may be a plurality of roll balls. The housing 3042352 and the rotation center piece 3042351 both abut against the roll ball. In this case, friction force between the housing 3042352 and the rotation center piece 3042351 is rolling friction force, to reduce a risk that the housing and the rotation center piece are damaged, thereby prolonging a service life of the housing and the rotation center piece.

Still with reference to FIG. 31, an elastic piece 304253 is further disposed on the conversion bracket 30425. The elastic piece 304253 is accommodated in the accommodating cavity 304252. The elastic piece 304253 is sleeved on the rotation center piece 3042351 of the motor connecting piece 304235. In this application, a specific disposing form of the elastic piece 304253 is not limited. For example, the elastic piece 304253 may include a plurality of spring plates that are stacked. In addition, deformation of the elastic piece 304253 may form elastic force between the conversion bracket 30425 and the rotation center piece 3042351.

A rolling piece 304254 may be further disposed on the conversion bracket 30425. The rolling piece 304254 is accommodated in the accommodating cavity 304252. In addition, a slot is further disposed on a bottom wall of the accommodating cavity 304252 of the conversion bracket 30425. The rolling piece 304254 can be accommodated in the slot. One end of the elastic piece 304253 presses the rolling piece 304254 toward the bottom wall of the accommodating cavity 304252, and the other end of the elastic piece abuts against the rotation center piece 3042351. In this application, a specific disposing form of the rolling piece 304254 is not limited. For example, the rolling piece 304254 may be a roll ball or a roll pillar. In addition, there may be one or more rolling pieces 304254. The rolling pieces 304254 can be accommodated in corresponding slots in a one-to-one correspondence.

Still with reference to FIG. 31, a press block 304255 may be further disposed between the elastic piece 304253 and the rolling piece 304254, and the elastic piece 304253 presses the rolling piece 304254 toward the corresponding slot through the press block 304255. An arc-shaped slot is disposed on a surface that is of the press block 304255 and that is used to be in contact with the rolling piece 304254. At least a part of the rolling piece 304254 can be accommodated in the arc-shaped slot, to prevent the rolling piece 304254 from falling off in a movement process.

In this application, a gasket 304236 is further disposed between the sliding pin 304234 and the second gear piece 304232. A material of the gasket 304236 may be but is not limited to polyformaldehyde (polyformaldehyde, POM). The sliding pin 304234 and the second gear piece 304232 both abut against the gasket 304236, to generate torque in a process in which the second gear piece 304232 and the sliding pin 304234 rotate relative to each other. In addition, abrasion of the second gear piece and the sliding pin can be reduced, to improve structure reliability.

It may be understood that, when the keyboard assembly is in the opened state, if the keyboard assembly is manually closed, because the sliding pin 304234 can rotate with the fast pin 304233, rotating friction force may be generated between the sliding pin 304234 and the second gear piece 304232. The friction force can generate different torque when the keyboard assembly is in different states, to provide different hand feel experience for a consumer.

In addition, according to the rotating shaft mechanism provided in this application, in a process in which the motor is used to drive the keyboard assembly to be opened or closed, if torque brought by the conversion bracket 30425 to the motor connecting piece 304235 exceeds a specified value (that is, the motor is overloaded) due to manual intervention in the process, torque generated in the rotation process of the conversion bracket 30425 can overcome the elastic extrusion force applied by the elastic piece 304253 on the rolling piece 304254, so that the rolling piece 304254 falls off the corresponding slot. In this case, a connection relationship between the conversion bracket 30425 and the motor connecting piece 304235 may be broken, and torque applied on the conversion bracket 30425 is not applied on the motor connecting piece 304235, to avoid damage to the motor connected to the motor connecting piece 304235.

Therefore, in this application, the conversion bracket 30425 may serve as a torque limiter between the protection mechanism 3042 and the motor 3041, to prevent excessively large external torque from being applied on the motor back, thereby limiting torque overloaded protection for the motor 3041.

According to the automatic opening and closing apparatus provided in this application, during switching between a manual working mode and an electrical working mode, different torque can be generated through switching the connection relationship between the conversion bracket 30425 and the motor connecting piece 304235, so that torque required in the manual working mode and the electrical working mode can be met, thereby meeting user experience. In addition, torque between the conversion bracket 30425 and the motor connecting piece 304235 and torque between the second gear piece 304232 and the conversion bracket 30425 can be both implemented by using the elastic piece 304253. This helps reduce space occupied by the automatic opening and closing apparatus, to implement a miniaturization design of the automatic opening and closing apparatus.

In this application, in a process of using the automatic opening and closing apparatus to drive the keyboard assembly to be opened or closed, to improve movement stability of the keyboard assembly, a plurality of groups of automatic opening and closing apparatuses may be disposed in the rotating shaft mechanism. For example, one automatic opening and closing apparatus may be disposed at each of two ends of the rotating shaft mechanism in the length direction. In this way, the movement stability of the keyboard assembly can be effectively improved in a synchronous driving manner performed by using the two automatic opening and closing apparatuses.

In this application, the rotating assembly 301 of the rotating shaft mechanism 3 may be disposed in another possible manner in addition to the manner provided in the foregoing embodiment. For example, FIG. 32*a* is a schematic diagram of a structure of the rotating assembly 301 according to another embodiment of this application. FIG. 32*a* is a schematic diagram of a structure of the rotating assembly 301 when the keyboard assembly 2 is in the closed state. In addition, FIG. 32*b* is a schematic diagram of a structure of the rotating assembly 301 when the keyboard assembly 2 is in the opened state.

With reference to both FIG. 32*a* and FIG. 32*b*, the rotating assembly 301 includes the connecting piece 3011, the first fastening piece 3012, and the second fastening piece 3013. The first fastening piece 3012 and the second fastening piece 3013 may be fixedly connected to the keyboard body. A connection manner may be but is not limited to a connection by using a fastener such as a screw. In addition, the first fastening piece 3012 and the second fastening piece 3013 may serve as support kits of the entire rotating assembly 301. The first fastening piece 3012 and the second fastening piece 3013 are spaced. Another structure of the rotating assembly 301 may be directly or indirectly connected to the first fastening piece 3012 and the second fastening piece 3013.

For ease of understanding of a connection relationship between structures of the rotating assembly 301, refer to FIG. 33. FIG. 33 is an exploded view of the rotating assembly 301 shown in FIG. 32*a*. In this embodiment, the connecting piece 3011 includes the body portion 30111 disposed in a long-strip structure. The body portion 30111 may be fixedly connected to the host support kit. A connection manner may be but is not limited to a tight connection by using a fastener such as a screw. Still with reference to FIG. 33, the body portion 30111 may have two segments, and the connecting piece 3011 further includes a connection structure disposed between the two segments of the body portion 30111. The connection structure is configured to connect the two segments of the body portion 30111.

In this application, the rotating assembly 301 further includes the first connection rod 3016 and the second connection rod 3017, and the first connection rod 3016 is located between the connecting piece 3011 and the second connection rod 3017. One end that is of the first connection rod 3016 and that faces the connecting piece 3011 is rotatively connected to the connection structure of the connecting piece 3011 through the first rotating shaft 3015*a*, and one end that is of the first connection rod 3016 and that faces the second connection rod 3017 is rotatively connected to the second connection rod 3017 through the second rotating shaft 3015*b*.

Still with reference to FIG. 33, the rotating assembly 301 provided in this embodiment of this application may further include the main shaft 3018, and the main shaft 3018 penetrates the first fastening piece 3012, the second connection rod 3017, and the second fastening piece 3013. The main shaft 3018 can rotate relative to the first fastening piece 3012 and the second fastening piece 3013. In addition, in the radial direction of the main shaft 3018, the second connection rod 3017 and the main shaft 3018 are fastened relative to each other. In this case, the second connection rod 3017 and the main shaft 3018 may rotate synchronously around the axis of the main shaft 3018. In a possible embodiment of this application, to relatively fasten the second connection rod 3017 and the main shaft 3018 in the radial direction, an irregular hole may be disposed on the second connection rod 3017. For example, the irregular hole may be but is not limited to a D-shaped hole. In addition, the section of the part that is of the main shaft 3018 and that penetrates the second connection rod 3017 is also set to an irregular section that can match the irregular hole, to implement limiting of the second connection rod 3017 and the main shaft 3018 in the radial direction.

In this application, in order that the rotating assembly 301 can provide damping force in a corresponding rotation position for the rotating shaft mechanism in an entire movement process of the entire rotating shaft mechanism to keep the rotating shaft mechanism in the corresponding rotation position, still with reference to FIG. 33, in a possible embodiment of this application, an elastic piece 3019 may be further disposed on the rotating assembly 301, and the elastic piece 3019 may accumulate elastic force when being pressed. As shown in FIG. 33, the elastic piece 3019 may be disposed on a side that is of the first fastening piece 3012 and that is away from the second fastening piece 3013. A specific disposing form of the elastic piece 3019 is not limited in this application. For example, the elastic piece 3019 may include an elastic pad. There may be one or more elastic pads. When the elastic piece 3019 includes a plurality of elastic pads, the plurality of elastic pads may be disposed in a stacked manner. In addition, with reference to FIG. 33, the elastic piece 3019 may be sleeved on the main shaft 3018. In this embodiment, when the elastic piece 3019 is pressed, the elastic piece 3019 generates elastic force along the axial direction of the main shaft 3018.

In addition, to prevent the elastic piece 3019 from falling off the main shaft 3018, the limiting piece 3020 may be further disposed on the side that is of the elastic piece 3019 and that is away from the first fastening piece 3012. For example, the limiting piece 3020 may be a nut, to facilitate assembly and disassembly. The limiting piece 3020 is sleeved on the main shaft 3018, and limits the elastic piece 3019 along the axial direction of the main shaft 3018. In this application, to apply effective force on the elastic piece 3019, a group of gaskets 3021 may be further disposed. The group of gaskets 3021 are sleeved on the main shaft 3018. The elastic piece 3019 is disposed between the group of gaskets 3021. In addition, the outer ring diameter of the gasket 3021 may be further greater than or equal to the outer ring diameter of the elastic piece 3019. The limiting piece 3020 may abut against the gasket 3021 located on the side that is of the elastic piece 3019 and that is away from the first fastening piece 3012.

It should be noted that, in this application, the elastic piece 3019 may be deformed along the axial direction of the main shaft 3018. The elastic force generated due to the deformation of the elastic piece 3019 may be applied on the first fastening piece 3012, to generate the friction force between the first fastening piece 3012 and the elastic piece 3019. The friction force may hinder rotation of the main shaft 3018. In addition, the second connection rod 3017 and the main shaft 3018 may rotate synchronously. The second connection rod 3017 can drive the connecting piece 3011 to rotate. The connecting piece 3011 is fixedly connected to the host support kit 4 fastened to the first support board 2021 shown in FIG. 3*b*. Therefore, when the second connection rod 3017 is hindered as the main shaft 3018 rotates, movement of the first support board 2021 is hindered. In this way, the elastic force generated by the elastic piece 3019 is converted into damping force that hinders rotation of the rotating shaft mechanism.

It may be understood that the host 1 may be fastened to the first support board 2021. When the host 1 reaches a specific rotation position in a rotation process of the first support board 2021, if torque generated by gravity of the host 1 is equal to torque generated by the damping force of the rotating shaft mechanism 3, the first support board 2021 can hover in the corresponding rotation position without external force.

Because the rotating shaft mechanism 3 requires different damping force in different rotation positions, a change of the damping force may be implemented through changing the elastic force generated by the elastic piece 3019. The change of the elastic force of the elastic piece 3019 may be implemented through changing deformation of the elastic piece 3019. In a possible embodiment of this application, in order that the elastic piece 3019 has corresponding deformation in different rotation positions, an extrusion contact surface may be disposed between the first fastening piece 3012 and the elastic piece 3019. During specific implementation, still with reference to FIG. 33, the first extrusion structure 3022 is disposed between the elastic piece 3019 and the first fastening piece 3012. The first extrusion structure 3022 is sleeved on the main shaft 3018. The elastic piece 3019 may press the first extrusion structure 3022 toward the first fastening piece 3012, so that the first extrusion structure 3022 abuts against the first fastening piece 3012 under the elastic force of the elastic piece 3019. In addition, in the radial direction of the main shaft 3018, the first extrusion structure 3022 and the main shaft 3018 are fastened relative to each other. The irregular hole may be disposed on the first extrusion structure 3022. For example, the irregular hole may be but is not limited to a D-shaped hole. In addition, a section of a part that is of the main shaft 3018 and that penetrates the first extrusion structure 3022 is also set to an irregular section that can match the irregular hole, to implement limiting of the first extrusion structure 3022 and the main shaft 3018 in the radial direction.

In this embodiment of this application, the first extrusion structure 3022 may be disposed with reference to the first extrusion structure 3022 shown in FIG. 9. Details are not described herein. It may be understood be learned from the description of the foregoing embodiment that the first slot 30221 may be disposed on an end face that is of the first extrusion structure 3022 and that faces the first fastening piece 3012.

In addition, the second extrusion structure 3026 may be further disposed in the rotating assembly 301. FIG. 34 is a schematic diagram of a structure of the second extrusion structure 3026 according to a possible embodiment of this application. With reference to both FIG. 33 and FIG. 34, the second extrusion structure 3026 is disposed between the first extrusion structure 3022 and the first fastening piece 3012, and the main shaft 3018 may be rotatively connected to the second extrusion structure 3026. The elastic piece 3019 may press the first extrusion structure 3022 toward the second extrusion structure 3026. In addition, a first protrusion 30261 may be disposed on an end face that is of the second extrusion structure 3026 and that faces the first extrusion structure 3022, and the first protrusion 30261 may be correspondingly disposed for the first slot 30221 of the first extrusion structure 3022. It may be understood that, in some other embodiments of this application, the first slot 30221 may also be disposed on an end face that is of the second extrusion structure 3026 and that faces the first extrusion structure 3022, and the first protrusion 30261 may be disposed on an end face that is of the first extrusion structure 3022 and that faces the second extrusion structure 3026.

When the correspondingly disposed first protrusion 30261 falls into the first slot 30221 so that the first slot 30221 cooperates with and is clamped to the first protrusion 30261, a total length of the first extrusion structure 3022 and the second extrusion structure 3026 in the axial direction of the main shaft 3018 is the smallest. In this case, the extrusion force on the elastic piece 3019 is the smallest, so that the generated elastic force is the smallest. Therefore, friction force between the first extrusion structure 3022 and the second extrusion structure 3026 is the smallest. After the first extrusion structure 3022 and the second extrusion structure 3026 rotate relative to each other, when the first slot 30221 is misaligned with the first protrusion 30261, a total length of the first extrusion structure 3022 and the second extrusion structure 3026 in the axial direction of the main shaft 3018 increases. Therefore, the elastic piece 3019 accumulates elastic force. Under the elastic force, the friction force between the first extrusion structure 3022 and the second extrusion structure 3026 increases, thereby increasing damping force of the rotating shaft mechanism.

It should be noted that, in this application, through properly designing the first slot 30221 and the first protrusion 30261, the damping force of the rotating shaft mechanism 3 is the largest when the corresponding keyboard assembly is in the closed state, so that the keyboard assembly can be stably kept in the closed state.

Still with reference to FIG. 33, in this application, an elastic piece 3023 may be further disposed in the rotating assembly 301. The elastic piece 3023 may be, for example, a torsion spring. With reference to both FIG. 32*a* and FIG. 33, the elastic piece 3023 is disposed on the side that is of the second fastening piece 3013 and that is away from the first fastening piece 3012, the elastic piece 3023 is sleeved on the main shaft 3018, and the elastic piece 3023 can rotate relative to the main shaft 3018. In addition, the rotating assembly 301 further includes a rotation fastening piece 3027. The rotation fastening piece 3027 is located on a side that is of the elastic piece 3023 and that is away from the second fastening piece 3013. The rotation fastening piece 3027 is sleeved on the main shaft 3018. In the radial direction of the main shaft 3018, the rotation fastening piece 3027 is fixedly connected to the main shaft 3018. A locking slot 30271 is disposed on the rotation fastening piece 3027. One end of the elastic piece 3023 can be locked in the locking slot 30271, and the other end of the elastic piece can be fastened to the second fastening piece 3013. In this way, in the rotation process of the main shaft 3018, the elastic piece 3023 may generate elastic deformation, thereby generating elastic force in a direction around the axial direction of the main shaft 3018. On this basis, through a proper design, the elastic force generated by the elastic piece 3023 can provide auxiliary force for rotation of the main shaft 3018. Therefore, when relatively small force is applied on the connecting piece 3011, the main shaft 3018 can be driven to rotate, to improve comfortableness of the user in performing an open operation or a close operation on the keyboard assembly using the rotating assembly 301.

In addition, a sleeve 3028 may be further disposed on the rotating assembly 301. The sleeve 3028 can be sleeved on the main shaft 3018. The elastic piece 3023 can be sleeved on the sleeve 3028. The sleeve 3028 may guide movement of the elastic piece 3023 along the axial direction, to improve movement stability of the elastic piece 3023.

Still with reference to FIG. 33, the rotating assembly 301 may further include the third connection rod 3024, and the third connection rod 3024 can slide along the second fastening piece 3013. In addition, FIG. 35 is a schematic diagram of a structure of the rotating assembly 301 shown in FIG. 32a from another angle. In this embodiment, the slide 30133 is disposed on the side that is of the second fastening piece 3013 and that is away from the connecting piece 3011. The third connection rod 3024 can be accommodated in the slide 30133, and can slide along the slide 30133.

In some embodiments of this application, to prevent the third connection rod 3024 from falling off the slide 30133, still with reference to FIG. 35, a first limiting portion 301331 may be disposed on a side wall of the slide 30133, and a second limiting portion 30242 may be disposed on the third connection rod 3024. The second limiting portion 30242 can be clamped to the first limiting portion 301331, and can slide in the first limiting portion 301331. The first limiting portion 301331 may be a sliding slot, and the second limiting portion 30242 may be a protrusion, so that the protrusion can be clamped to the sliding slot. It may be understood that, in some other embodiments of this application, the first limiting portion 301331 may be alternatively a protrusion, and the second limiting portion 30242 may be a slot. In this way, the first limiting portion 301331 and the second limiting portion 30242 can cooperate to guide sliding of the third connection rod 3024 along the slide 30133, to improve movement reliability of the third connection rod 3024.

In addition, in the rotation process of the rotating assembly 301, to implement sliding of the third connection rod 3024 in the slide 30133, it can be learned from FIG. 33 that a side that is of the third connection rod 3024 and that faces the second fastening piece 3013 has the connecting portion 30241. Because the rotating assembly 301 can rotate with rotation of the main shaft 3018, in this application, the third connection rod 3024 can be connected to the main shaft 3018 through the connecting portion 30241. During specific implementation, with reference to FIG. 33, a swing rod structure 3029 may be further disposed on the rotating assembly 301 provided in this application, and the swing rod structure 3029 may be disposed on a side that is of the second fastening piece 3013 and that is away from the first fastening piece 3012. The swing rod structure 3029 can be sleeved on the main shaft 3018. In addition, in the radial direction of the main shaft 3018, the swing rod structure 3029 is fixedly connected to the main shaft 3018, so that the swing rod structure 3029 can rotate synchronously with the main shaft 3018. The swing rod structure 3029 has a protruding portion 30291.

In addition, FIG. 36a is a sectional view along G-G of the rotating assembly 301 shown in FIG. 35. With reference to both FIG. 33 and FIG. 36a, a track slot 302411 can be disposed on the connecting portion 30241 of the third connection rod 3024. The protruding portion 30291 of the swing rod structure 3029 can be inserted into the track slot 302411, and can be in contact with a slot wall of the track slot 302411. In this way, in the rotation process of the main shaft 3018, the swing rod structure 3029 can be driven to rotate synchronously, so that the protruding portion 30291 of the swing rod structure 3029 slides along the slot wall of the track slot 302411.

It may be understood that, a movement trajectory of the third connection rod 3024 can be designed through properly designing the track slot 302411. For example, when the rotating assembly 301 is in the closed state shown in FIG. 36a, the protruding portion 30291 of the swing rod structure 3029 abuts against the slot wall that is of the track slot 302411 and that is away from the connecting piece 3011, so that the third connection rod 3024 can be hidden in the second fastening piece 3013. In addition, FIG. 36b shows a relative position of the protruding portion 30291 of the third connection rod 3024 in the track slot 302411 when the rotating assembly 301 is in an intermediate state from the closed state to the opened state. It can be learned from FIG. 36b that, corresponding to the intermediate state, a recessed portion 3024111 may be disposed in the track slot 302411, and the protruding portion 30291 may extend into the recessed portion 3024111. In a process of continuing to open the rotating assembly 301 from the intermediate state shown in FIG. 36b, the protruding portion 30291 may press a side wall of the recessed portion 3024111, to push the third connection rod 3024 to slide in a direction toward the connecting piece 3011. FIG. 36c shows a relative position of the protruding portion 30291 of the third connection rod 3024 in the track slot 302411 when the rotating assembly 301 is in the opened state. When the rotating assembly 301 is in the opened state shown in FIG. 36c, the third connection rod 3024 may extend from the second fastening piece 3013 in a direction of approaching the connecting piece. For example, when the rotating assembly 301 is used for the keyboard assembly, in the process in which the keyboard assembly is changed from the closed state to the opened state, the third connection rod 3024 can slide in a direction toward the keyboard body. On the contrary, in the process in which the keyboard assembly is changed from the opened state to the closed state, the third connection rod 3024 can slide in the slide along a direction away from the connecting piece 3011, so that the third connection rod 3024 slides along the direction away from the keyboard body.

It should be noted that, when the rotating shaft mechanism provided in this embodiment of this application is used for the keyboard assembly, the third connection rod 3024 can be configured to connect to the rotating shaft connecting piece 2014 of the keyboard body 201 shown in FIG. 13a. In this way, in a process in which the third connection rod 3024 slides with rotation of the main shaft 3018, the rotating shaft connecting piece 2014 can be driven to move in a direction toward or away from the rotating shaft mechanism 3. It may be understood that, in this application, when the third connection rod 3024 slides along the direction toward the keyboard body 201, the rotating shaft connecting piece 2014 can be driven to move along the direction away from the rotating shaft mechanism 3; and when the third connection rod 3024 slides along the direction away from the keyboard body 201, the rotating shaft connecting piece 2014 can be driven to move along the direction toward the rotating shaft mechanism 3. Alternatively, when the third connection rod 3024 slides along the direction toward the keyboard body 201, the rotating shaft connecting piece 2014 can be driven to move along the direction toward the rotating shaft mechanism 3; and when the third connection rod 3024 slides along the direction away from the keyboard body 201, the rotating shaft connecting piece 2014 can be driven to move along the direction away from the rotating shaft mechanism 3. Therefore, when the keyboard assembly is in the opened state, the keys on the keyboard body 201 are in the up state; or when the keyboard assembly is in the closed state, the keys on the keyboard body 201 go down. For a specific manner of disposing the keyboard body, refer to the foregoing embodiment. Details are not described herein again.

In addition, when the automatic opening and closing apparatus is further disposed on the rotating shaft mechanism, refer to the foregoing embodiment for a connection relationship between the rotating assembly and the automatic opening and closing apparatus in this embodiment of this application, a manner in which the automatic opening and closing apparatus drives the rotating assembly to move, and a specific manner of disposing the automatic opening and closing apparatus. Details are not described herein again.

It should be noted that, in this application, a structure including the support portion 202 and the rotating shaft mechanism 3 mentioned in any foregoing embodiment may be defined as a support assembly. The support assembly may use the specific structure that is described in the foregoing embodiment and that depends on the keyboard assembly 2 to implement a case in which the first support board 2021 rotates to drive the third support board 2023 to slide along the direction toward or away from the rotating shaft mechanism 3. In addition, the support assembly may be disposed without depending on the structure of the keyboard assembly 2. When the first support board 2021 rotates around the rotating shaft mechanism 3, the third support board 2023 can be driven to slide along the direction toward or away from the rotating shaft mechanism 3. Therefore, a stable support structure can be formed among the first support board 2021, the second support board, and the third support board 2023.

In addition, the support assembly may be used for an electronic device. The electronic device may further include the host 1. For example, the host 1 may be the tablet computer in the foregoing embodiment. The host 1 may be fastened to the first support board 2021. The host 1 may move along a specified trajectory with the first support board 2021. In addition, in a process in which the first support board 2021 moves and drives the third support board 2023 to slide along a direction toward or away from the rotating shaft mechanism 3, a triangular support structure surrounding the rotating shaft mechanism 3 can be formed among the first support board 2021, a second support board, and the third support board 2023. This can help improve support stability of the support portion 202 for the host 1, thereby improving structural reliability of the electronic device.

In a possible embodiment of this application, a structure including the protection mechanism 3042 and the motor mentioned in any foregoing embodiment may be defined as a motor assembly. The motor assembly may protect the motor by using the specific structure that is described in the foregoing embodiment and that depends on the keyboard assembly 2, or may be disposed without depending on the structure of the keyboard assembly 2. When the motor drives the rotation center piece to rotate, and torque applied on the conversion bracket 30424 is less than connection force between the conversion bracket 30424 and the rotation center piece, the conversion bracket 30424 is connected to the motor connecting piece, the conversion bracket 30424 rotates with the rotation center piece, and the conversion bracket 30424 drives the first gear piece to rotate around the first shaft. Rotation torque of the first gear piece is transmitted to the second rotating shaft assembly. When the torque applied on the second rotating shaft assembly is transmitted to the conversion bracket 30424 through the first gear piece, and the torque applied on the conversion bracket 30424 is greater than the connection force between the conversion bracket 30424 and the rotation center piece, the conversion bracket 30424 is disconnected from the motor connecting piece. In this way, the motor is protected.

When the motor assembly is used in an electronic device, the electronic device may be another possible foldable electronic device in addition to a two-in-one product. The electronic device only needs to include two parts that can rotate relative to the rotating shaft mechanism 3 in any form. For example, the electronic device may include a first housing and a second housing, and the motor assembly can be configured to drive the two housings to rotate relative to one rotating shaft mechanism 3, to implement electrical opening and closing of the electronic device. In this way, operation steps of opening and closing the electronic device by the user can be simplified, thereby improving user experience. In addition, in scenarios such as a scenario of manually intervening electrical opening and closing of the electronic device, the motor assembly can protect the motor, to implement a safe and reliable automatic opening and closing function of the electronic device, to prolong service life of the electronic device.

In addition, the rotating shaft connecting piece 2014 of the keyboard body 201 mentioned in any foregoing embodiment of this application may be connected to the rotating shaft mechanism provided in the foregoing embodiment of this application, and may further use any other possible rotating shaft mechanism, provided that the rotating shaft connecting piece can be driven toward or away from the rotating shaft mechanism in a movement process of the rotating mechanism.

In addition to the foregoing keyboard assembly 2, the keyboard body 201 provided in this application may be used in an electronic device such as a notebook computer. In addition to the keyboard body 201, these electronic devices may further include a display. The display may be rotatively connected to the keyboard body 201 through the rotating shaft mechanism 3. When the electronic device is opened, the keys 2012 can move along specified trajectories in a direction of coming out of the key slots, to meet a use requirement of the user for input through hitting the keys 2012. In addition, when the electronic device is closed, the keys 2012 may move toward the key slots. In this way, the parts that are of the keys 2012 and that come out of the key slots are relatively small, so that the size of the entire keyboard body 201 is relatively small in a thickness direction, to help implement a thin design of the keyboard body 201 and implement a thin design of the electronic device in this state.

It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A support assembly, comprising a rotating shaft mechanism and a support portion,
   wherein the rotating shaft mechanism comprises a rotating assembly, with the rotating assembly comprising a first fastening piece, a second fastening piece, a connecting piece, and a connection rod assembly, wherein the first fastening piece and the second fastening piece are spaced, the first fastening piece and the second fastening piece are located on a same side of the connecting piece, a first sliding slot is disposed on an end face that is of the first fastening piece and that faces the second fastening piece, a second sliding slot is disposed on an end face that is of the second fastening piece and that faces the first fastening piece, the connecting piece is rotatively connected to the connection rod assembly, and the connection rod assembly can slide along the first sliding slot and the second sliding slot;

wherein the support portion comprises a first support board, a second support board, and a third support board that are disposed around the rotating shaft mechanism, wherein one end of the first support board is fixedly connected to the connecting piece, the second support board is located between the first support board and the third support board, and the second support board is rotatively connected to the first support board and the third support board; and wherein when the first support board rotates around the rotating shaft mechanism, the connection rod assembly slides along the first sliding slot and the second sliding slot, the connecting piece rotates around the connection rod assembly, and the third support board slides along a direction toward or away from the rotating shaft mechanism.

2. The support assembly of claim 1, wherein the rotating assembly further comprises a main shaft, wherein the main shaft penetrates the first fastening piece, the connection rod assembly, and the second fastening piece, the main shaft is rotatively connected to the first fastening piece and the second fastening piece, and the main shaft rotates to drive the connection rod assembly to slide along the first sliding slot and the second sliding slot.

3. The support assembly of claim 2, wherein the rotating shaft mechanism further comprises a cam and an auxiliary support mechanism, wherein the cam and the main shaft are fastened relative to each other in a radial direction of the main shaft, a cam sliding slot is disposed on a surface of the cam, one end of the auxiliary support mechanism is accommodated in the cam sliding slot, and the other end of the auxiliary support mechanism is connected to the third support board;

wherein the main shaft rotates, and one end of the auxiliary support mechanism slides along the cam sliding slot, to drive the third support board to slide along the direction toward or away from the rotating shaft mechanism.

4. The support assembly of claim 3, wherein the rotating shaft mechanism comprises two rotating assemblies that are spaced and each are disposed with one of the cam; wherein the auxiliary support mechanism is located between the two rotating assemblies and comprises a first support rod and a second support rod, the first support rod and the second support rod are disposed in a cross manner, and middle parts of the first support rod and the second support rod are hinged;

one end of the first support rod is accommodated in one cam sliding slot, and the other end of the first support rod is hinged to the third support board; and one end of the second support rod is accommodated in the other cam sliding slot, and the other end of the second support rod is hinged to the third support board.

5. The support assembly of claim 1, wherein the support assembly further comprises a keyboard body, the support portion is rotatively connected to the keyboard body through the rotating shaft mechanism, a receptacle is disposed in the keyboard body, at least a part of the third support board is accommodated in the receptacle, and the third support board can slide in the receptacle; and wherein the third support board comprises an arc-shaped board segment and a straight board segment that are fixedly connected, the arc-shaped board segment is located between the second support board and the straight board segment, the second support board is rotatively connected to the arc-shaped board segment, the arc-shaped board segment can cover the rotating shaft mechanism, and at least a part of the straight board segment is accommodated in the receptacle.

6. The support assembly of claim 5, wherein the support assembly further comprises a host support kit, the host support kit is fixedly connected to the connecting piece and is fixedly connected to an end part that is of the first support board and that faces the connecting piece, the host support kit is located on a side that is of the first support board and that faces the keyboard body.

7. The support assembly of claim 2, wherein the connection rod assembly comprises a first connection rod and a second connection rod, the first connection rod is located between the connecting piece and the second connection rod, the second connection rod is located between the first fastening piece and the second fastening piece, the main shaft penetrates the second connection rod, and the main shaft and the second connection rod are fastened relative to each other in the radial direction of the main shaft; and one end of the first connection rod is rotatively connected to the connecting piece, and the other end of the first connection rod is rotatively connected to the second connection rod; and one end that is of a rotating shaft rotatively connected to the first connection rod and the second connection rod is located in the first sliding slot, and the other end of the rotating shaft is located in the second sliding slot.

8. The support assembly of claim 7, wherein the connecting piece comprises a body portion, the body portion has a first edge and a second edge that are disposed opposite to each other, a first installation portion, a second installation portion, and a third installation portion are disposed on the first edge, the first installation portion and the second installation portion are spaced, the body portion comprises a first face and a second face that are disposed opposite to each other, the first installation portion and the second installation portion extend in directions away from the second face, the third installation portion is located on the second face, and the third installation portion extends along a direction from the first edge to the second edge; and wherein the rotating assembly further comprises a first middle connection rod and a second middle connection rod, one end of the first middle connection rods is rotatively connected to the first installation portion, and the other end of the first middle connection rod is rotatively connected to the first fastening piece; one end of the second middle connection rod is rotatively connected to the second installation portion, and the other end of the second middle connection rod is rotatively connected to the second fastening piece; and one end that is of the first connection rod and that faces the connecting piece is rotatively connected to an end part that is of the third installation portion and that is away from the first edge;

wherein the first support board is fixedly connected to the first face of the connecting piece.

9. The support assembly of claim 2, wherein the rotating assembly further comprises a first elastic piece, the first elastic piece is disposed on a side that is of the first fastening piece and that is away from the second fastening piece, and elastic force generated by the first elastic piece along the axial direction of the main shaft is applied on the first fastening piece.

10. The support assembly of claim 9, wherein the rotating assembly further comprises a first extrusion structure, the first extrusion structure is located between the first fastening piece and the first elastic piece, the first extrusion structure is sleeved on the main shaft, the first extrusion structure and the main shaft are fastened relative to each other in the radial direction of the main shaft, and a deformation amount of the first elastic piece changes when the first extrusion structure rotates with the main shaft;

wherein the first elastic piece presses the first extrusion structure toward the first fastening piece, a first slot is disposed on an end face that is of the first extrusion structure and that faces the first fastening piece, and a first protrusion is disposed on an end face that is of the first fastening piece and that faces the first extrusion structure; and wherein the rotating assembly further comprises a second extrusion structure, the second extrusion structure is located between the first extrusion structure and the first fastening piece, the second extrusion structure is sleeved on the main shaft, the main shaft is rotatively connected to the second extrusion structure, the first elastic piece presses the first extrusion structure toward the second extrusion structure, a first slot is disposed on an end face that is of the first extrusion structure and that faces the first fastening piece, and a first protrusion is disposed on an end face that is of the second extrusion structure and that faces the first extrusion structure.

11. The support assembly of claim 7, wherein the rotating assembly further comprises a second elastic piece, wherein the second elastic piece is disposed on a side that is of the second fastening piece and that is away from the first fastening piece, or the second elastic piece is disposed in a hollow region disposed on the second connection rod; and wherein the second elastic piece is sleeved on the main shaft, one end of the second elastic piece is fixedly connected to the main shaft, and the other end of the second elastic piece is fixedly connected to the second fastening piece; and the main shaft rotates, and the second elastic piece generates elastic force around the axial direction of the main shaft.

12. The support assembly of claim 5, wherein the support portion is rotatively connected to the keyboard body through the rotating shaft assembly, the keyboard body comprises a rotating shaft connecting piece, a frame assembly, and keys;

the rotating shaft mechanism moves to drive the rotating shaft connecting piece to move along the direction toward or away from the rotating shaft mechanism;

the keys are disposed in a plurality of rows in parallel, each row of the keys comprises a plurality of keys, and the keys are accommodated in key slots on the keyboard body;

the frame assembly comprises a first frame, a second frame, and horizontal rods, the first frame and the second frame are disposed relative to each other, the first frame and the second frame are fixedly connected to the rotating shaft connecting piece, a plurality of rows of the keys are located between the first frame and the second frame, and each row of the keys are arranged along a direction from the first frame to the second frame; and one horizontal rod is correspondingly disposed for each row of the keys, the first frame and the second frame move with the rotating shaft connecting piece along the direction toward or away from the rotating shaft mechanism to drive the horizontal rods to move along the arrangement direction of each row of the keys, and with movement of the horizontal rods, the keys move toward the key slots or move in a direction of coming out of the key slots.

13. The support assembly of claim 12, wherein the rotating assembly further comprises a third connection rod connected to the second fastening piece in a sliding manner; with rotation of the main shaft, the third connection rod slides along a direction of approaching or leaving the keyboard body; and the rotating shaft connecting piece is fixedly connected to the third connection rod; and wherein a slide is disposed on the second fastening piece, the third connection rod can slide along the slide, the rotating assembly further comprises a fourth connection rod, the fourth connection rod is fixedly connected to the second fastening piece, and the third connection rod is limited within the slide.

14. An electronic device, comprising a host and a support assembly, wherein the support assembly comprises a rotating shaft mechanism and a support portion, wherein the rotating shaft mechanism comprises a rotating assembly, with the rotating assembly comprising a first fastening piece, a second fastening piece, a connecting piece, and a connection rod assembly, wherein the first fastening piece and the second fastening piece are spaced, the first fastening piece and the second fastening piece are located on a same side of the connecting piece, a first sliding slot is disposed on an end face that is of the first fastening piece and that faces the second fastening piece, a second sliding slot is disposed on an end face that is of the second fastening piece and that faces the first fastening piece, the connecting piece is rotatively connected to the connection rod assembly, and the connection rod assembly can slide along the first sliding slot and the second sliding slot;

wherein the support portion comprises a first support board, a second support board, and a third support board that are disposed around the rotating shaft mechanism, wherein one end of the first support board is fixedly connected to the connecting piece;

the second support board is located between the first support board and the third support board, and the second support board is rotatively connected to the first support board and the third support board; and when the first support board rotates around the rotating shaft mechanism, the connection rod assembly slides along the first sliding slot and the second sliding slot, the connecting piece rotates around the connection rod assembly, and the third support board slides along a direction toward or away from the rotating shaft mechanism;

wherein the host is detachably connected to the first support board in the support assembly.

15. The electronic device of claim 14, wherein the rotating assembly further comprises a main shaft, the main shaft penetrates the first fastening piece, the connection rod assembly, and the second fastening piece, wherein the main shaft is rotatively connected to the first fastening piece and the second fastening piece, and the main shaft rotates to drive the connection rod assembly to slide along the first sliding slot and the second sliding slot.

16. The electronic device of claim 15, wherein the rotating shaft mechanism further comprises a cam and an auxiliary support mechanism; wherein the cam and the main shaft are fastened relative to each other in a radial direction of the main shaft, a cam sliding slot is disposed on a surface of the cam, one end of the auxiliary support mechanism is accommodated in the cam sliding slot, and the other end of the auxiliary support mechanism is connected to the third support board;

wherein the main shaft rotates, and one end of the auxiliary support mechanism slides along the cam sliding slot, to drive the third support board to slide along the direction toward or away from the rotating shaft mechanism.

17. The electronic device of claim 16, wherein the rotating shaft mechanism comprises two rotating assemblies, the two rotating assemblies are spaced, and one cam is correspondingly disposed for each rotating assembly; wherein the auxiliary support mechanism is located between the two rotating assemblies and comprises a first support rod and a second support rod, wherein the first support rod and the second support rod are disposed in a cross manner, and middle parts of the first support rod and the second support rod are hinged;

one end of the first support rod is accommodated in one cam sliding slot, and the other end of the first support rod is hinged to the third support board; and one end of the second support rod is accommodated in the other cam sliding slot, and the other end of the second support rod is hinged to the third support board.

18. The electronic device of claim 14, wherein the support assembly further comprises a keyboard body, the support portion is rotatively connected to the keyboard body through the rotating shaft mechanism, a receptacle is disposed in the keyboard body, at least a part of the third support board is accommodated in the receptacle, and the third support board can slide in the receptacle; and wherein the third support board comprises an arc-shaped board segment and a straight board segment that are fixedly connected, the arc-shaped board segment is located between the second support board and the straight board segment, the second support board is rotatively connected to the arc-shaped board segment, the arc-shaped board segment can cover the rotating shaft mechanism, and at least a part of the straight board segment is accommodated in the receptacle.

19. The electronic device of claim 18, wherein the support assembly further comprises a host support kit, the host support kit is fixedly connected to the connecting piece and is fixedly connected to an end part that is of the first support board and that faces the connecting piece, and the host support kit is located on a side that is of the first support board and that faces the keyboard body.

20. The electronic device of claim 15, wherein the connection rod assembly comprises a first connection rod and a second connection rod, the first connection rod is located between the connecting piece and the second connection rod, the second connection rod is located between the first fastening piece and the second fastening piece, the main shaft penetrates the second connection rod, and the main shaft and the second connection rod are fastened relative to each other in the radial direction of the main shaft; and one end of the first connection rod is rotatively connected to the connecting piece, and the other end of the first connection rod is rotatively connected to the second connection rod; and one end that is of a rotating shaft rotatively connected to the first connection rod and the second connection rod is located in the first sliding slot, and the other end of the rotating shaft is located in the second sliding slot.

* * * * *